(12) United States Patent
Davis et al.

(10) Patent No.: US 10,169,339 B2
(45) Date of Patent: Jan. 1, 2019

(54) CONTEXT-SENSITIVE QUERY ENRICHMENT

(75) Inventors: Marc E. Davis, San Francisco, CA (US); Matthew G. Dyor, Bellevue, WA (US); William Gates, Redmond, WA (US); Xuedong Huang, Bellevue, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Qi Lu, Bellevue, WA (US); Mark A. Malamud, Seattle, WA (US); Nathan P. Myhrvold, Bellevue, WA (US); Satya Nadella, Clyde Hill, WA (US); Daniel Reed, Redmond, WA (US); Harry Shum, Medina, WA (US); Clarence T. Tegreene, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 747 days.

(21) Appl. No.: 13/373,834

(22) Filed: Nov. 30, 2011

(65) Prior Publication Data

US 2013/0135332 A1    May 30, 2013

Related U.S. Application Data

(63) Continuation-in-part of application No. 13/317,988, filed on Oct. 31, 2011, and a continuation-in-part of application No. 13/317,989, filed on Oct. 31, 2011, now abandoned, and a continuation-in-part of application No. 13/317,984, filed on Oct. 31, 2011, and a continuation-in-part of application No. 13/317,990, filed on Oct. 31, 2011, and a continuation-in-part of application No. 13/317,991, filed on Oct. 31, 2011, and a continuation-in-part of application No. 13/373,833, filed on Nov. 30, 2011, now Pat. No. 9,569,439, and a continuation-in-part of (Continued)

(51) Int. Cl.
*G06F 17/30*    (2006.01)

(52) U.S. Cl.
CPC .................................. *G06F 17/30* (2013.01)

(58) Field of Classification Search
USPC .......................................................... 345/589
See application file for complete search history.

(56) References Cited

U.S. PATENT DOCUMENTS

| 5,544,050 A | 8/1996 | Abe et al. |
| 5,970,483 A | 10/1999 | Evans |

(Continued)

FOREIGN PATENT DOCUMENTS

WO    WO/2011/148484    12/2011

OTHER PUBLICATIONS

Janssen, Cory; "Network Interface Device"; Techopedia; Jan. 3, 2012; 1 page; located at http://www.techopedia.com/definition/26085/network-interface-device.

(Continued)

*Primary Examiner* — Tize Ma

(57) ABSTRACT

Structures and protocols are presented for facilitating a search partly based on a movement status of a search-capable device or on a position of a person's limb or on an association with another search-capable device.

26 Claims, 26 Drawing Sheets

Related U.S. Application Data application No. 13/373,830, filed on Nov. 30, 2011, and a continuation-in-part of application No. 13/373,825, filed on Nov. 30, 2011, now Pat. No. 8,959,082.

(56) References Cited

U.S. PATENT DOCUMENTS

| | | |
|---|---|---|
| 6,005,978 A | 12/1999 | Garakani |
| 6,029,124 A | 2/2000 | Gillick et al. |
| 6,047,290 A | 4/2000 | Kennedy et al. |
| 6,061,593 A | 5/2000 | Fischell et al. |
| 6,094,510 A | 7/2000 | Yaguchi et al. |
| 6,134,014 A | 10/2000 | Tzu et al. |
| 6,161,084 A | 12/2000 | Messerly et al. |
| 6,167,398 A | 12/2000 | Wyard et al. |
| 6,175,664 B1 | 1/2001 | Nakashima |
| 6,201,476 B1 | 3/2001 | Depeursinge et al. |
| 6,215,825 B1 | 4/2001 | Melen |
| 6,236,884 B1 | 5/2001 | Hunter et al. |
| 6,236,885 B1 | 5/2001 | Hunter et al. |
| 6,249,603 B1 | 6/2001 | Rucklidge |
| 6,252,506 B1 | 6/2001 | Hsieh et al. |
| 6,269,335 B1 | 7/2001 | Ittycheriah et al. |
| 6,301,609 B1 | 10/2001 | Aravamudan et al. |
| 6,330,369 B1 | 12/2001 | Cornog et al. |
| 6,330,610 B1 | 12/2001 | Docter et al. |
| 6,336,117 B1 | 1/2002 | Massarani |
| 6,389,387 B1 | 5/2002 | Poznanski et al. |
| 6,393,293 B1 | 5/2002 | Saewert et al. |
| 6,400,304 B1 | 6/2002 | Chubbs, III |
| 6,406,372 B1 | 6/2002 | Turmell et al. |
| 6,424,729 B1 | 7/2002 | Soon |
| 6,430,307 B1 | 8/2002 | Souma et al. |
| 6,437,561 B1 | 8/2002 | Bartingale et al. |
| 6,473,824 B1 | 10/2002 | Kreissig et al. |
| 6,480,819 B1 | 11/2002 | Boman et al. |
| 6,539,353 B1 | 3/2003 | Jiang et al. |
| 6,542,813 B1 | 4/2003 | Kovacs |
| 6,654,783 B1 | 11/2003 | Hubbard |
| 6,674,361 B2 | 1/2004 | Cernusca et al. |
| 6,678,793 B1 | 1/2004 | Doyle |
| 6,692,449 B1 | 2/2004 | Brown |
| 6,700,604 B1 | 3/2004 | Murata et al. |
| 6,704,671 B1 | 3/2004 | Umminger, III |
| 6,711,562 B1 | 3/2004 | Ross et al. |
| 6,714,929 B1 | 3/2004 | Micaelian et al. |
| 6,718,365 B1 | 4/2004 | Dutta |
| 6,730,926 B2 | 5/2004 | Boillot et al. |
| 6,731,984 B2 | 5/2004 | Cho et al. |
| 6,750,818 B2 | 6/2004 | Thomas et al. |
| 6,785,670 B1 | 8/2004 | Chiang et al. |
| 6,798,867 B1 | 9/2004 | Zirngibl et al. |
| 6,813,616 B2 | 11/2004 | Simpson et al. |
| 6,831,993 B2 | 12/2004 | Lemelson et al. |
| 6,865,575 B1 | 3/2005 | Smith et al. |
| 6,894,716 B1 | 5/2005 | Harrington |
| 6,901,473 B2 | 5/2005 | Klissner |
| 6,904,437 B2 | 6/2005 | Stout, III |
| 6,934,699 B1 | 8/2005 | Haas et al. |
| 6,957,229 B1 | 10/2005 | Dyor |
| 6,965,698 B2 | 11/2005 | Martinez-Uriegas et al. |
| 6,968,083 B2 | 11/2005 | Williams et al. |
| 6,970,879 B1 | 11/2005 | Gilmour |
| 6,983,310 B2 | 1/2006 | Rouse et al. |
| 6,985,206 B2 | 1/2006 | Anderson et al. |
| 7,007,294 B1 | 2/2006 | Kurapati |
| 7,020,591 B1 | 3/2006 | Wei et al. |
| 7,029,031 B2 | 4/2006 | Moisel et al. |
| 7,054,476 B2 | 5/2006 | Oosawa et al. |
| 7,054,855 B2 | 5/2006 | Basso et al. |
| 7,062,073 B1 | 6/2006 | Tumey et al. |
| 7,072,963 B2 | 7/2006 | Anderson et al. |
| 7,082,365 B2 | 7/2006 | Sheha et al. |
| 7,092,566 B2 | 8/2006 | Krumm |
| 7,103,327 B2 | 9/2006 | Pan |
| 7,107,536 B1 | 9/2006 | Dowling |
| 7,119,814 B2 | 10/2006 | Meron et al. |
| 7,127,493 B1 | 10/2006 | Gautier |
| 7,133,971 B2 | 11/2006 | Matick et al. |
| 7,162,470 B2 | 1/2007 | Sharma et al. |
| 7,171,358 B2 | 1/2007 | Whittaker et al. |
| 7,177,948 B1 | 2/2007 | Kraft et al. |
| 7,185,149 B2 | 2/2007 | Okamura |
| 7,190,263 B2 | 3/2007 | McKay et al. |
| 7,192,283 B2 | 3/2007 | Paley |
| 7,194,458 B1 | 3/2007 | Micaelian et al. |
| 7,215,968 B2 | 5/2007 | Fujiwara |
| 7,216,167 B2 | 5/2007 | Hamilton, II et al. |
| 7,225,234 B2 | 5/2007 | Naqvi |
| 7,228,240 B2 | 6/2007 | Duron et al. |
| 7,239,275 B2 | 7/2007 | Dybdal et al. |
| 7,242,462 B2 | 7/2007 | Huang |
| 7,272,558 B1 | 9/2007 | Soucy et al. |
| 7,275,049 B2 | 9/2007 | Clausner et al. |
| 7,283,973 B1 | 10/2007 | Loghmani et al. |
| 7,313,515 B2 | 12/2007 | Crouch et al. |
| 7,324,163 B2 | 1/2008 | Bacche |
| 7,333,648 B2 | 2/2008 | Edic et al. |
| 7,345,574 B2 | 3/2008 | Fitzgibbon |
| 7,346,555 B2 | 3/2008 | Rippingale et al. |
| 7,363,246 B1 | 4/2008 | Van Horn et al. |
| 7,369,680 B2 | 5/2008 | Trajkovic et al. |
| 7,386,554 B2 | 6/2008 | Ripley et al. |
| 7,386,558 B2 | 6/2008 | Larcheveque et al. |
| 7,394,011 B2 | 7/2008 | Huffman |
| 7,403,656 B2 | 7/2008 | Koga |
| 7,408,654 B1 | 8/2008 | Hardin et al. |
| 7,409,291 B2 | 8/2008 | Pasolini et al. |
| 7,415,414 B2 | 8/2008 | Azara et al. |
| 7,415,458 B2 | 8/2008 | Sauermann |
| 7,428,533 B2 | 9/2008 | Kapur et al. |
| 7,430,008 B2 | 9/2008 | Ambiru et al. |
| 7,430,555 B2 | 9/2008 | Sealand et al. |
| 7,437,364 B1 | 10/2008 | Fredricksen et al. |
| 7,441,411 B2 | 10/2008 | Gleeson et al. |
| 7,443,787 B2 | 10/2008 | Karino et al. |
| 7,444,221 B2 | 10/2008 | Yamada et al. |
| 7,451,081 B1 | 11/2008 | Gajic et al. |
| 7,454,067 B1 | 11/2008 | Pati |
| 7,460,052 B2 | 12/2008 | Zemany et al. |
| 7,467,160 B2 | 12/2008 | McIntyre |
| 7,477,909 B2 | 1/2009 | Roth |
| 7,480,941 B1 | 1/2009 | Balasubramaniam et al. |
| 7,487,138 B2 | 2/2009 | Borthakur et al. |
| 7,487,401 B2 | 2/2009 | Urmanov et al. |
| 7,493,303 B2 | 2/2009 | Newbold et al. |
| 7,515,197 B2 | 4/2009 | Suzuki |
| 7,515,942 B2 | 4/2009 | Lee |
| 7,526,123 B2 | 4/2009 | Moon et al. |
| 7,532,127 B2 | 5/2009 | Holman et al. |
| 7,539,656 B2 | 5/2009 | Fratkina et al. |
| 7,545,917 B2 | 6/2009 | Jones et al. |
| 7,548,933 B2 | 6/2009 | Krishnamurthy et al. |
| 7,555,159 B2 | 6/2009 | Pishva |
| 7,557,728 B1 | 7/2009 | Bicheno et al. |
| 7,558,922 B2 | 7/2009 | Murase |
| 7,565,139 B2 | 7/2009 | Neven, Sr. et al. |
| 7,567,200 B1 | 7/2009 | Osterweil |
| 7,570,598 B2 | 8/2009 | Burklin et al. |
| 7,580,832 B2 | 8/2009 | Allamanche et al. |
| 7,580,952 B2 | 8/2009 | Logan et al. |
| 7,590,275 B2 | 9/2009 | Clarke et al. |
| 7,593,845 B2 | 9/2009 | Ramsey |
| 7,593,982 B2 | 9/2009 | Busey |
| 7,596,568 B1 | 9/2009 | McConnell |
| 7,596,662 B2 | 9/2009 | Makineni et al. |
| 7,599,566 B2 | 10/2009 | Silverstein et al. |
| 7,599,831 B2 | 10/2009 | Ford |
| 7,599,950 B2 | 10/2009 | Walther et al. |
| 7,600,015 B2 | 10/2009 | Cugi |
| 7,602,942 B2 | 10/2009 | Bazakos et al. |
| 7,603,273 B2 | 10/2009 | Poirier |
| 7,610,166 B1 | 10/2009 | Solinsky |
| 7,610,346 B2 | 10/2009 | Otake |
| 7,617,192 B2 | 11/2009 | Libes et al. |

(56) References Cited

U.S. PATENT DOCUMENTS

| | | |
|---|---|---|
| 7,620,622 B1 | 11/2009 | Larsson et al. |
| 7,623,707 B2 | 11/2009 | Brandt |
| 7,627,577 B1 | 12/2009 | Lee et al. |
| 7,630,544 B1 | 12/2009 | Zhou |
| 7,630,806 B2 | 12/2009 | Breed |
| 7,639,396 B2 | 12/2009 | Bezryadin |
| 7,644,055 B2 | 1/2010 | Furst et al. |
| 7,647,049 B2 | 1/2010 | Engdahl et al. |
| 7,647,312 B2 | 1/2010 | Dai |
| 7,653,878 B1 | 1/2010 | Russell |
| 7,663,485 B2 | 2/2010 | Kim et al. |
| 7,664,339 B2 | 2/2010 | Turski |
| 7,668,647 B2 | 2/2010 | Barber et al. |
| 7,668,845 B1 | 2/2010 | Lomet et al. |
| 7,671,795 B2 | 3/2010 | Rofougaran |
| 7,680,324 B2 | 3/2010 | Boncyk et al. |
| 7,680,340 B2 | 3/2010 | Luo et al. |
| 7,680,781 B1 | 3/2010 | Wasserman et al. |
| 7,684,991 B2 | 3/2010 | Stohr et al. |
| 7,685,264 B2 | 3/2010 | Tumsi Dayakar et al. |
| 7,689,404 B2 | 3/2010 | Khasin |
| 7,689,446 B2 | 3/2010 | Sagar |
| 7,689,610 B2 | 3/2010 | Bansal et al. |
| 7,689,705 B1 | 3/2010 | Lester et al. |
| 7,703,691 B2 | 4/2010 | Patel et al. |
| 7,706,068 B2 | 4/2010 | Takaaki |
| 7,713,213 B2 | 5/2010 | Siejko et al. |
| 7,715,659 B2 | 5/2010 | Zhao et al. |
| 7,716,202 B2 | 5/2010 | Slackman |
| 7,716,378 B2 | 5/2010 | Chen et al. |
| 7,720,436 B2 | 5/2010 | Hamynen et al. |
| 7,729,534 B2 | 6/2010 | Maeda |
| 7,733,233 B2 | 6/2010 | O'Shea et al. |
| 7,734,062 B2 | 6/2010 | Kato et al. |
| 7,734,562 B1 | 6/2010 | Hairman |
| 7,743,051 B1 | 6/2010 | Kashyap et al. |
| 7,743,099 B2 | 6/2010 | Szeto |
| 7,747,246 B2 | 6/2010 | Zellner et al. |
| 7,761,480 B2 | 7/2010 | Toledano et al. |
| 7,769,740 B2 | 8/2010 | Martinez et al. |
| 7,770,209 B2 | 8/2010 | Billingsley et al. |
| 7,773,812 B2 | 8/2010 | Hanus et al. |
| 7,774,062 B2 | 8/2010 | Kim et al. |
| 7,774,713 B2 | 8/2010 | Mital et al. |
| 7,775,329 B2 | 8/2010 | Eckenstein et al. |
| 7,778,483 B2 | 8/2010 | Messina et al. |
| 7,778,792 B2 | 8/2010 | Huang et al. |
| 7,778,816 B2 | 8/2010 | Reynar |
| 7,787,692 B2 | 8/2010 | Noguchi et al. |
| 7,787,693 B2 | 8/2010 | Siegemund |
| 7,796,029 B2 | 9/2010 | Ma et al. |
| 7,802,057 B2 | 9/2010 | Iyer et al. |
| 7,804,786 B2 | 9/2010 | Carlson et al. |
| 7,804,981 B2 | 9/2010 | Viggiano et al. |
| 7,805,004 B2 | 9/2010 | Han et al. |
| 7,809,559 B2 | 10/2010 | Kushner et al. |
| 7,809,563 B2 | 10/2010 | Lee |
| 7,809,722 B2 | 10/2010 | Gokturk et al. |
| 7,818,170 B2 | 10/2010 | Cheng |
| 7,818,729 B1 | 10/2010 | Plum et al. |
| 7,819,823 B2 | 10/2010 | Lehrman et al. |
| 7,831,559 B1 | 11/2010 | Mohan et al. |
| 7,840,557 B1 | 11/2010 | Smith et al. |
| 7,840,580 B2 | 11/2010 | Kudo |
| 7,844,048 B2 | 11/2010 | Pessoa et al. |
| 7,844,581 B2 | 11/2010 | Dubnicki et al. |
| 7,844,594 B1 | 11/2010 | Holt et al. |
| 7,844,722 B2 | 11/2010 | Woodward et al. |
| 7,849,065 B2 | 12/2010 | Kamani et al. |
| 7,849,079 B2 | 12/2010 | Chandrasekar et al. |
| 7,849,090 B2 | 12/2010 | Sweeney |
| 7,849,139 B2 | 12/2010 | Wolfson et al. |
| 7,852,993 B2 | 12/2010 | Ju et al. |
| 7,853,420 B2 | 12/2010 | Birmiwal et al. |
| 7,853,445 B2 | 12/2010 | Bachenko et al. |
| 7,853,586 B1 | 12/2010 | Patel et al. |
| 7,853,626 B2 | 12/2010 | Jung et al. |
| 7,856,137 B2 | 12/2010 | Yonezawa et al. |
| 7,856,142 B2 | 12/2010 | Ferman et al. |
| 7,856,289 B2 | 12/2010 | Schanin et al. |
| 7,860,281 B2 | 12/2010 | Pfister et al. |
| 7,860,887 B2 | 12/2010 | Cohen et al. |
| 7,865,018 B2 | 1/2011 | Abdulkader et al. |
| 7,865,181 B1 | 1/2011 | Macaluso |
| 7,865,187 B2 | 1/2011 | Ramer et al. |
| 7,865,355 B2 | 1/2011 | Xu et al. |
| 7,865,494 B2 | 1/2011 | Best et al. |
| 7,865,516 B2 | 1/2011 | Becker et al. |
| 7,870,117 B1 | 1/2011 | Rennison |
| 7,873,189 B2 | 1/2011 | Jee et al. |
| 7,873,356 B2 | 1/2011 | Flynt et al. |
| 7,873,616 B2 | 1/2011 | Schickel-Zuber et al. |
| 7,873,620 B2 | 1/2011 | Ozzie et al. |
| 7,880,608 B2 | 2/2011 | Richards et al. |
| 7,885,904 B2 | 2/2011 | Aravamudan et al. |
| 7,889,913 B2 | 2/2011 | Wells |
| 7,894,812 B1 | 2/2011 | Durig et al. |
| 7,895,221 B2 | 2/2011 | Colledge et al. |
| 7,895,230 B2 | 2/2011 | Sylthe et al. |
| 7,899,677 B2 | 3/2011 | Kuo et al. |
| 7,903,880 B2 | 3/2011 | Wyatt et al. |
| 7,908,518 B2 | 3/2011 | West, Jr. et al. |
| 7,911,482 B1 | 3/2011 | Mariano et al. |
| 7,912,201 B2 | 3/2011 | Martin et al. |
| 7,912,288 B2 | 3/2011 | Winn et al. |
| 7,912,832 B2 | 3/2011 | Krieg et al. |
| 7,916,066 B1 | 3/2011 | Osterweil |
| 7,917,357 B2 | 3/2011 | Florencio et al. |
| 7,917,392 B2 | 3/2011 | Gupta et al. |
| 7,917,458 B2 | 3/2011 | Dalton |
| 7,917,840 B2 | 3/2011 | Newman et al. |
| 7,920,678 B2 | 4/2011 | Cooper et al. |
| 7,921,154 B2 | 4/2011 | Ballou |
| 7,924,271 B2 | 4/2011 | Christie et al. |
| 7,925,058 B2 | 4/2011 | Lee et al. |
| 7,930,324 B2 | 4/2011 | Kenyon |
| 7,934,267 B2 | 5/2011 | Nordstrom et al. |
| 7,941,124 B2 | 5/2011 | Adamczyk et al. |
| 7,941,505 B2 | 5/2011 | Jaye |
| 7,945,099 B2 | 5/2011 | Gokturk et al. |
| 7,945,546 B2 | 5/2011 | Bliss et al. |
| 7,945,571 B2 | 5/2011 | Wanker |
| 7,949,089 B2 | 5/2011 | Dafni et al. |
| 7,949,191 B1 | 5/2011 | Ramkumar et al. |
| 7,954,137 B2 | 5/2011 | Schuba |
| 7,957,555 B2 | 6/2011 | Ioffe |
| 7,957,966 B2 | 6/2011 | Takeuchi |
| 7,962,283 B2 | 6/2011 | Zhang et al. |
| 7,962,500 B2 | 6/2011 | van Zwol et al. |
| 7,966,304 B2 | 6/2011 | Bennett et al. |
| 7,970,660 B2 | 6/2011 | Bezos et al. |
| 7,970,735 B2 | 6/2011 | D'Hers et al. |
| 7,973,767 B2 | 7/2011 | Pedrazzini et al. |
| 7,974,493 B2 | 7/2011 | Senftner et al. |
| 7,974,843 B2 | 7/2011 | Schneider |
| 7,974,849 B1 | 7/2011 | Begole et al. |
| 7,974,974 B2 | 7/2011 | Tankovich et al. |
| 7,977,103 B2 | 7/2011 | Martin et al. |
| 7,978,084 B2 | 7/2011 | Dixon et al. |
| 7,978,139 B2 | 7/2011 | Robinson et al. |
| 7,979,457 B1 | 7/2011 | Garman |
| 7,979,461 B2 | 7/2011 | Libes et al. |
| 7,979,585 B2 | 7/2011 | Chen et al. |
| 7,983,611 B2 | 7/2011 | Rao |
| 7,983,872 B2 | 7/2011 | Makino et al. |
| 7,984,006 B2 | 7/2011 | Price |
| 7,984,032 B2 | 7/2011 | Thione et al. |
| 7,986,828 B2 | 7/2011 | Rao et al. |
| 7,986,843 B2 | 7/2011 | Chaudhury et al. |
| 7,987,189 B2 | 7/2011 | Anderson et al. |
| 7,987,490 B2 | 7/2011 | Ansari et al. |
| 7,990,550 B2 | 8/2011 | Aebischer et al. |
| 7,995,240 B2 | 8/2011 | Ikeno et al. |
| 7,996,487 B2 | 8/2011 | Snyder |

(56) References Cited

U.S. PATENT DOCUMENTS

| | | |
|---|---|---|
| 7,996,519 B1 | 8/2011 | Brown et al. |
| 8,000,528 B2 | 8/2011 | Ming et al. |
| 8,001,108 B2 | 8/2011 | Jung et al. |
| 8,005,263 B2 | 8/2011 | Fujimura et al. |
| 8,005,310 B2 | 8/2011 | Frei |
| 8,005,666 B2 | 8/2011 | Goto et al. |
| 8,005,672 B2 | 8/2011 | Vierthaler et al. |
| 8,005,875 B2 | 8/2011 | Hickey et al. |
| 8,005,906 B2 | 8/2011 | Hayashi et al. |
| 8,007,110 B2 | 8/2011 | Dunn et al. |
| 8,009,193 B2 | 8/2011 | Zhou et al. |
| 8,009,914 B2 | 8/2011 | Napper |
| 8,009,928 B1 | 8/2011 | Manmatha et al. |
| 8,010,528 B2 | 8/2011 | Nastacio et al. |
| 8,010,736 B2 | 8/2011 | Park et al. |
| 8,013,890 B2 | 9/2011 | Ohtake et al. |
| 8,014,562 B2 | 9/2011 | Rhoads et al. |
| 8,015,006 B2 | 9/2011 | Kennewick et al. |
| 8,015,065 B2 | 9/2011 | Davies |
| 8,018,439 B2 | 9/2011 | LaPointe et al. |
| 8,019,132 B2 | 9/2011 | Hara |
| 8,023,012 B2 | 9/2011 | Irie |
| 8,023,157 B2 | 9/2011 | Takahashi et al. |
| 8,023,485 B2 | 9/2011 | Shi et al. |
| 8,024,324 B2 | 9/2011 | Amitay et al. |
| 8,024,329 B1 | 9/2011 | Rennison |
| 8,024,335 B2 | 9/2011 | Anthony et al. |
| 8,026,850 B2 | 9/2011 | Seong et al. |
| 8,027,974 B2 | 9/2011 | Gibbs |
| 8,027,999 B2 | 9/2011 | Coffman et al. |
| 8,031,596 B2 | 10/2011 | Onfroy et al. |
| 8,032,480 B2 | 10/2011 | Pinckney et al. |
| 8,032,508 B2 | 10/2011 | Martinez et al. |
| 8,032,518 B2 | 10/2011 | Fox et al. |
| 8,032,535 B2 | 10/2011 | Strehl et al. |
| 8,035,600 B2 | 10/2011 | Hsu et al. |
| 8,036,735 B2 | 10/2011 | Cazares et al. |
| 8,036,937 B2 | 10/2011 | Tang et al. |
| 8,037,010 B2 | 10/2011 | Jaros et al. |
| 8,037,046 B2 | 10/2011 | Udezue et al. |
| 8,037,070 B2 | 10/2011 | Maghoul |
| 8,037,071 B2 | 10/2011 | Venkataraman et al. |
| 8,040,361 B2 | 10/2011 | Bachelder et al. |
| 8,041,035 B2 | 10/2011 | Miller |
| 8,041,074 B2 | 10/2011 | Rhoads et al. |
| 8,041,092 B2 | 10/2011 | Inoue |
| 8,041,426 B2 | 10/2011 | Fogoros et al. |
| 8,041,570 B2 | 10/2011 | Mirkovic et al. |
| 8,041,658 B2 | 10/2011 | Singh et al. |
| 8,041,715 B2 | 10/2011 | Gnanamani et al. |
| 8,044,798 B2 | 10/2011 | Icove et al. |
| 8,044,968 B2 | 10/2011 | Kanai et al. |
| 8,045,805 B2 | 10/2011 | Ramsay et al. |
| 8,045,822 B2 | 10/2011 | Cellier |
| 8,046,346 B2 | 10/2011 | Nagle |
| 8,046,371 B2 | 10/2011 | O'Clair et al. |
| 8,255,836 B1 | 8/2012 | Gildfind |
| 8,281,074 B2 | 10/2012 | Jeddeloh |
| 8,395,955 B2 | 3/2013 | Oh et al. |
| 8,463,772 B1 | 6/2013 | Aminzade et al. |
| 8,583,870 B2 | 11/2013 | Jeddeloh |
| 8,638,985 B2 | 1/2014 | Shotton et al. |
| 8,719,251 B1* | 5/2014 | English .............. G06F 17/30873 |
| | | 707/713 |
| 8,898,173 B1 | 11/2014 | Badoiu |
| 8,984,147 B1 | 3/2015 | Kret et al. |
| 2003/0028889 A1 | 2/2003 | McCoskey et al. |
| 2004/0260701 A1* | 12/2004 | Lehikoinen ......... G06F 17/3089 |
| 2005/0031225 A1* | 2/2005 | Sellers et al. ................ 382/275 |
| 2005/0254526 A1* | 11/2005 | Wang et al. ................. 370/503 |
| 2005/0259035 A1 | 11/2005 | Iwaki et al. |
| 2006/0047425 A1 | 3/2006 | Fukumi et al. |
| 2006/0173753 A1 | 8/2006 | Padmanabhan et al. |
| 2006/0184273 A1 | 8/2006 | Sawada et al. |
| 2007/0003914 A1 | 1/2007 | Yang |
| 2008/0077880 A1 | 3/2008 | Oygard |
| 2008/0104649 A1 | 5/2008 | Naaman et al. |
| 2008/0114737 A1* | 5/2008 | Neely et al. ....................... 707/3 |
| 2008/0132252 A1* | 6/2008 | Altman .............. G06Q 30/0207 |
| | | 455/457 |
| 2008/0162454 A1* | 7/2008 | Lundell et al. ................... 707/5 |
| 2008/0172357 A1 | 7/2008 | Rechis et al. |
| 2008/0218603 A1 | 9/2008 | Oishi |
| 2009/0005021 A1 | 1/2009 | Forstall et al. |
| 2009/0005071 A1 | 1/2009 | Forstall et al. |
| 2009/0005072 A1 | 1/2009 | Forstall et al. |
| 2009/0005981 A1 | 1/2009 | Forstall et al. |
| 2009/0006336 A1 | 1/2009 | Forstall et al. |
| 2009/0012940 A1 | 1/2009 | Ives et al. |
| 2009/0061840 A1 | 3/2009 | Fleischman et al. |
| 2009/0169060 A1 | 7/2009 | Faenger et al. |
| 2009/0176517 A1 | 7/2009 | Christie et al. |
| 2009/0178010 A1 | 7/2009 | Chaudhri |
| 2009/0271374 A1 | 10/2009 | Korn et al. |
| 2009/0300553 A1 | 12/2009 | Pettigrew et al. |
| 2009/0327263 A1* | 12/2009 | Maghoul ........................... 707/5 |
| 2010/0004004 A1 | 1/2010 | Browne-Swinburne et al. |
| 2010/0011299 A1* | 1/2010 | Brodersen et al. ........... 715/740 |
| 2010/0082604 A1 | 4/2010 | Gutt et al. |
| 2010/0082649 A1 | 4/2010 | Gutt et al. |
| 2010/0093399 A1 | 4/2010 | Kim et al. |
| 2010/0153428 A1 | 6/2010 | Schechter et al. |
| 2010/0156676 A1 | 6/2010 | Mooring et al. |
| 2010/0199232 A1 | 8/2010 | Mistry et al. |
| 2010/0234094 A1 | 9/2010 | Gagner et al. |
| 2010/0304730 A1 | 12/2010 | Huang et al. |
| 2010/0318999 A1 | 12/2010 | Zhao et al. |
| 2011/0034121 A1 | 2/2011 | Ng et al. |
| 2011/0035406 A1* | 2/2011 | Petrou et al. .................. 707/769 |
| 2011/0051665 A1 | 3/2011 | Huang |
| 2011/0098056 A1 | 4/2011 | Rhoads et al. |
| 2011/0099157 A1 | 4/2011 | LeBeau et al. |
| 2011/0106418 A1 | 5/2011 | van der Merwe |
| 2011/0119298 A1* | 5/2011 | Arrasvuori ......... G06F 17/30867 |
| | | 707/769 |
| 2011/0149120 A1 | 6/2011 | Kubota |
| 2011/0153653 A1* | 6/2011 | King et al. ................... 707/769 |
| 2011/0188756 A1* | 8/2011 | Lee et al. ...................... 382/185 |
| 2011/0196864 A1 | 8/2011 | Mason et al. |
| 2011/0210915 A1 | 9/2011 | Shotton et al. |
| 2011/0238811 A1 | 9/2011 | Hawkins |
| 2011/0288962 A1 | 11/2011 | Rankin, Jr. et al. |
| 2011/0304541 A1 | 12/2011 | Dalal |
| 2012/0027256 A1* | 2/2012 | Kiyohara .......... G06F 17/30029 |
| | | 382/103 |
| 2012/0036153 A1 | 2/2012 | Lee et al. |
| 2012/0039539 A1* | 2/2012 | Boiman ................. G11B 27/28 |
| | | 382/195 |
| 2012/0075168 A1 | 3/2012 | Osterhout et al. |
| 2012/0092357 A1 | 4/2012 | Wang et al. |
| 2012/0109654 A1 | 5/2012 | Nurminen et al. |
| 2012/0127072 A1 | 5/2012 | Kim |
| 2012/0150598 A1* | 6/2012 | Griggs .................... G06Q 30/06 |
| | | 705/14.16 |
| 2012/0179671 A1* | 7/2012 | Turner et al. ................. 707/723 |
| 2012/0192083 A1 | 7/2012 | Eng et al. |
| 2012/0294520 A1 | 11/2012 | Mei et al. |
| 2012/0299838 A1 | 11/2012 | Flachbart et al. |
| 2013/0050260 A1 | 2/2013 | Reitan |
| 2013/0083003 A1 | 4/2013 | Perez et al. |

OTHER PUBLICATIONS

LeCun et al.; "Gradient-Based Learning Applied to Document Recognition"; Proceedings of the IEEE; Nov. 1998; pp. 1-46.

Martel Electronics Sales Inc.; "GPS Interface device"; Dec. 20, 2009; printed on Feb. 21, 2014; 1 page; located at http://martelelectronics.com/Merchant2/4.24/00000001/catalog/p627_GPS_Interface_device.html.

Office Depot; "HP Envy 700-056 Desktop Computer With AMD A10 Quad-Core Accelerated Processor"; Sep. 3, 2013; printed on Feb. 21, 2014; pp. 1-4; located at http://www.officedepot.com/a/products/848252/HP-Envy-700-056-Desktop-Computer/.

(56) References Cited

OTHER PUBLICATIONS

REM Enterprise; "Glossary of Terms Interface (Device)"; Dec. 22, 2009; 2010; 1 page; located at http://www.rementerprise.co.uk/glossary/1/letteri.

Adhikari, Richard; "Yahoo's Axis Strikes Alliance Between Desktop and Mobile"; TechNewsWorld; bearing a date of May 24, 2012; pp. 1-3; located at: http://www.technewsworld.com/rsstory/75207.html; ECT News Network, Inc.

Microsoft; "Paint Tools"; Oct. 17, 2009; 4 pages; located at https://web.archive.org/web/20091017114057/http://windows.microsoft.com/en-us/windows-vista/Paint-tools.

McKillop, "How to sync your bookmarks, history, saved passwords and more—using Google Browser Sync", Sep. 17, 2006, pp. 1-10.

Ragavan; "Setting up Firefox Sync Just Got a Lot Easier"; Mozilla Cloud Services; bearing a date of Dec. 22, 2010; pp. 1-5; located at: https://blog.mozilia.org/services/2010/12/22/easy-setup-for-firefox-sync/.

Google Mobile Blog; "Your mobile and desktop search history now in sync": Sep. 30, 2009; 2 pages (as provided by examiner); located at: http://googlemobile.blogspot.com/2009/09/your-mobiie-and-desktop-search-history.html.

\* cited by examiner

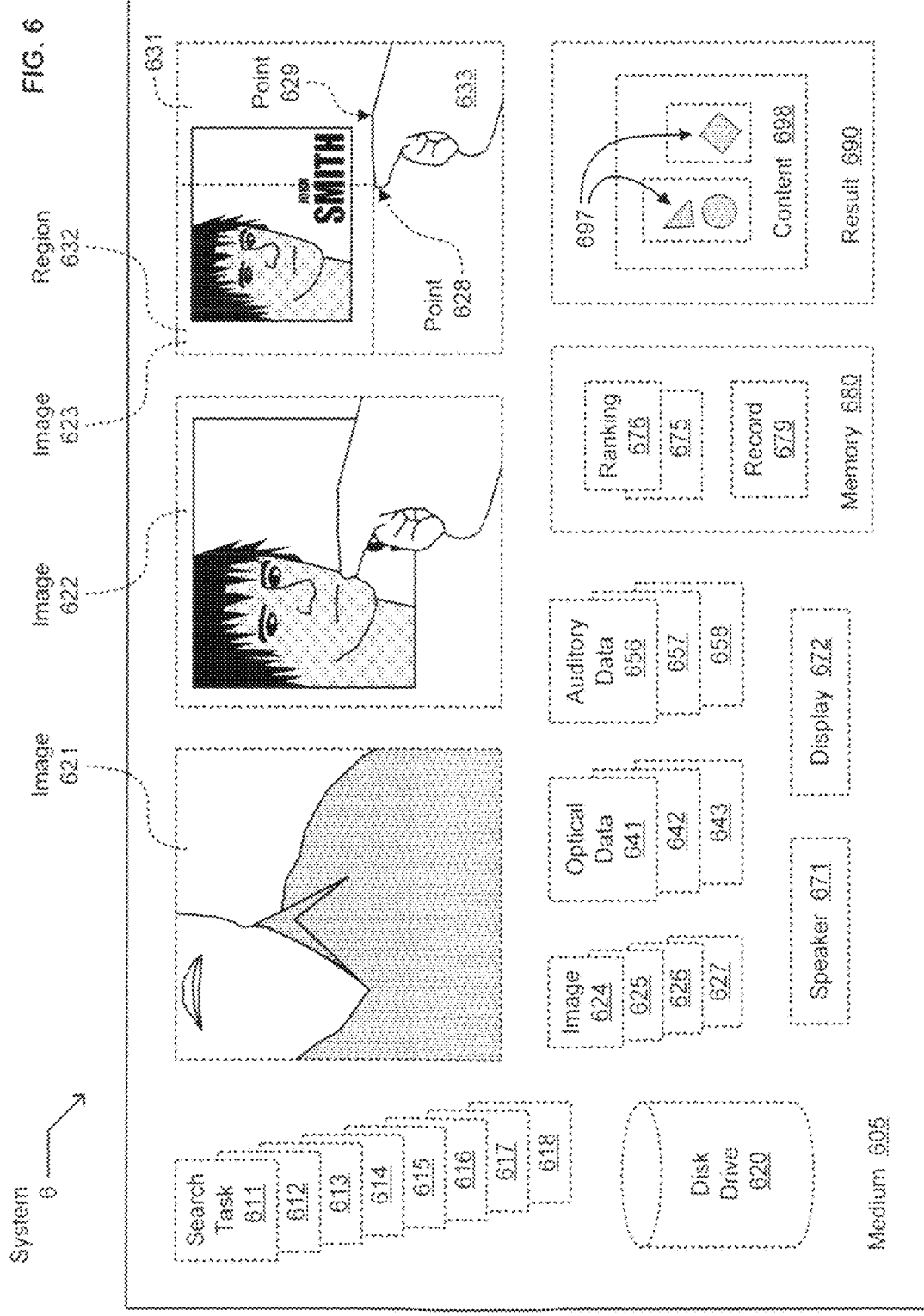

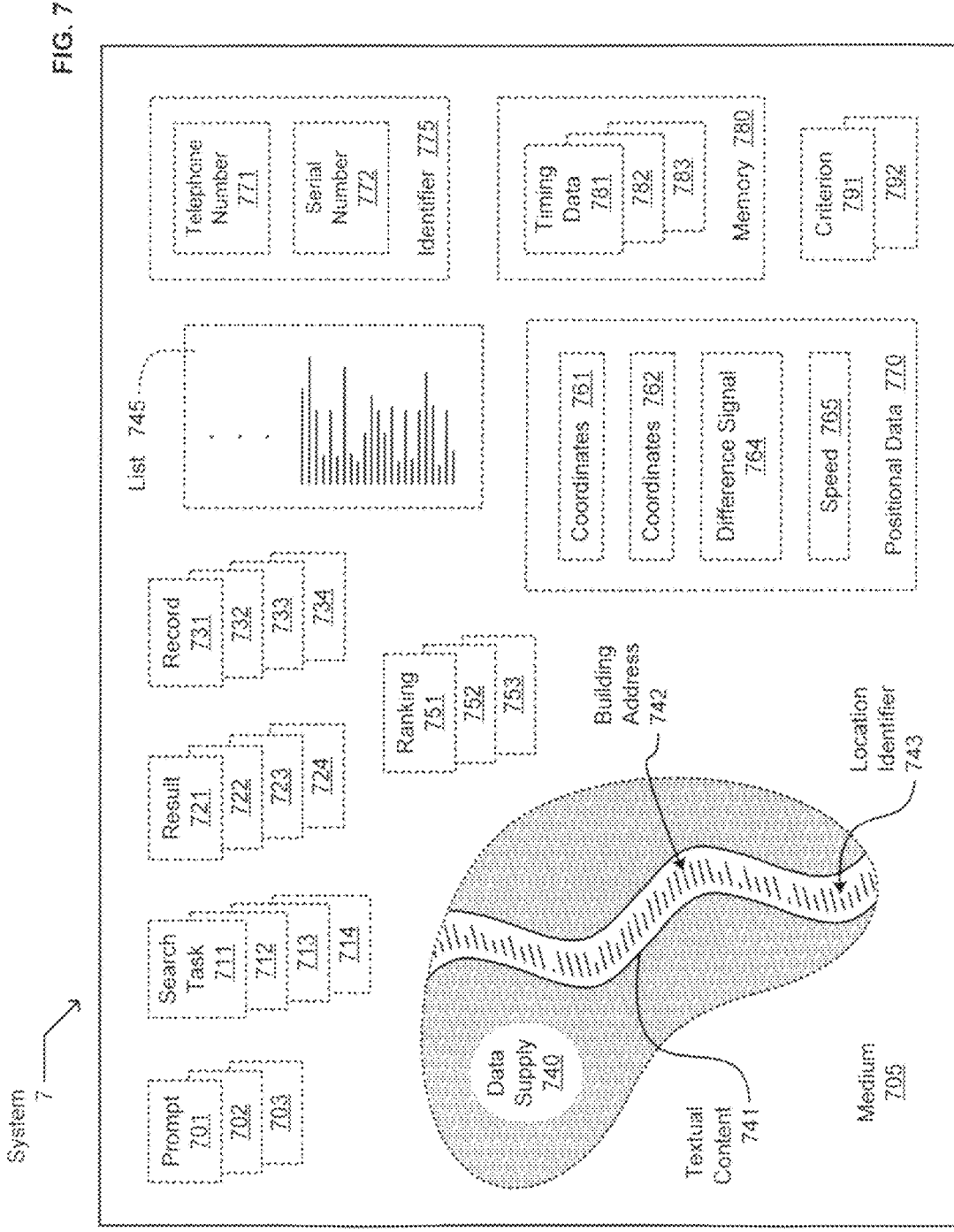

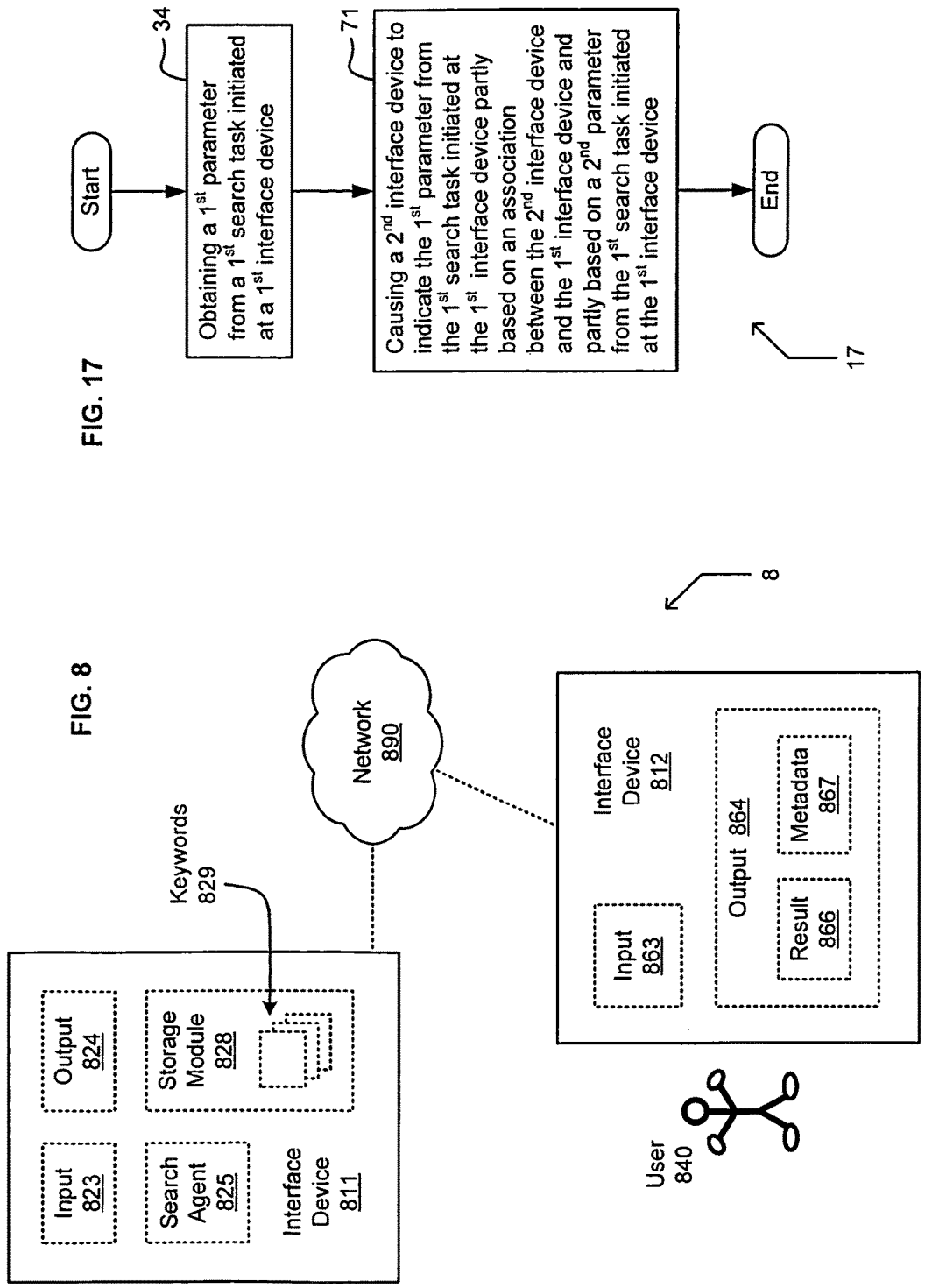

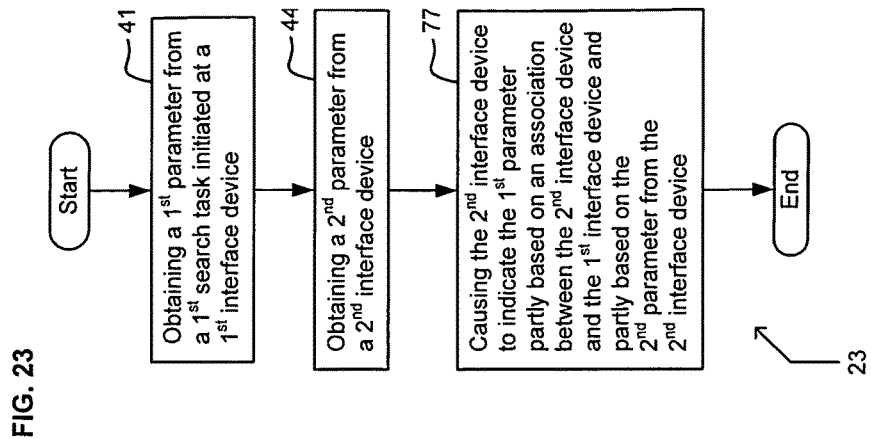
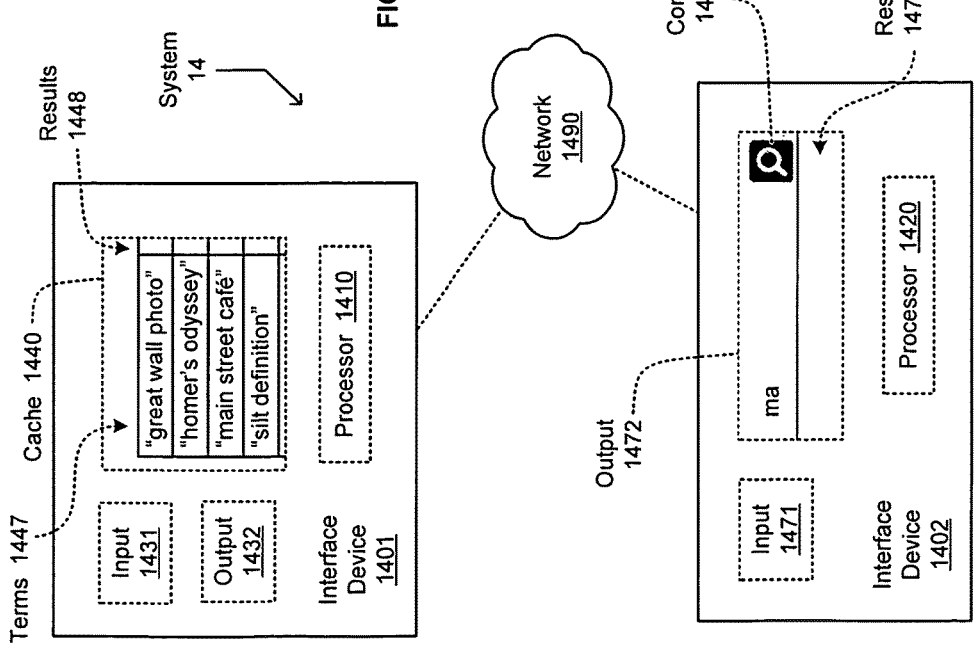

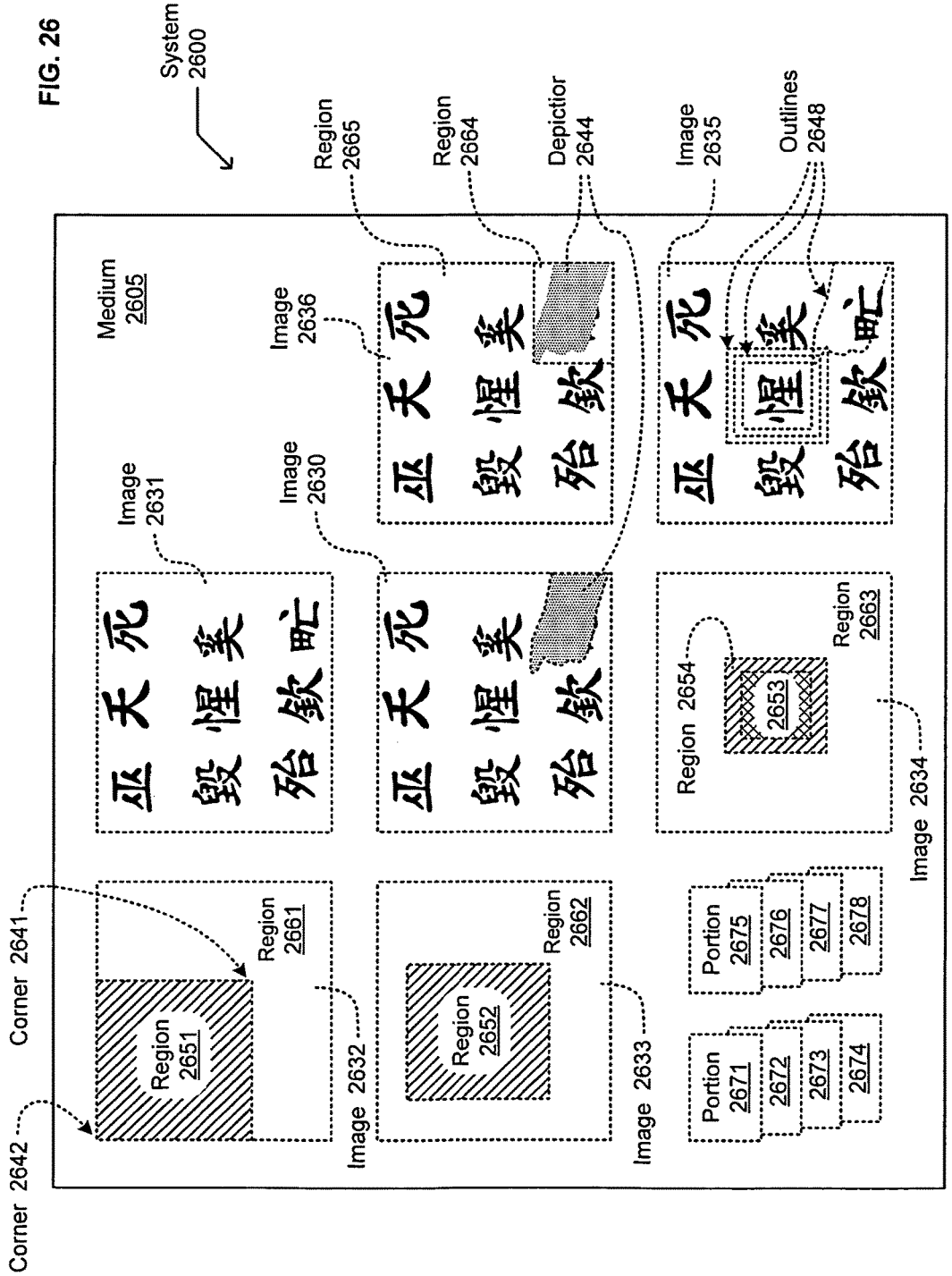

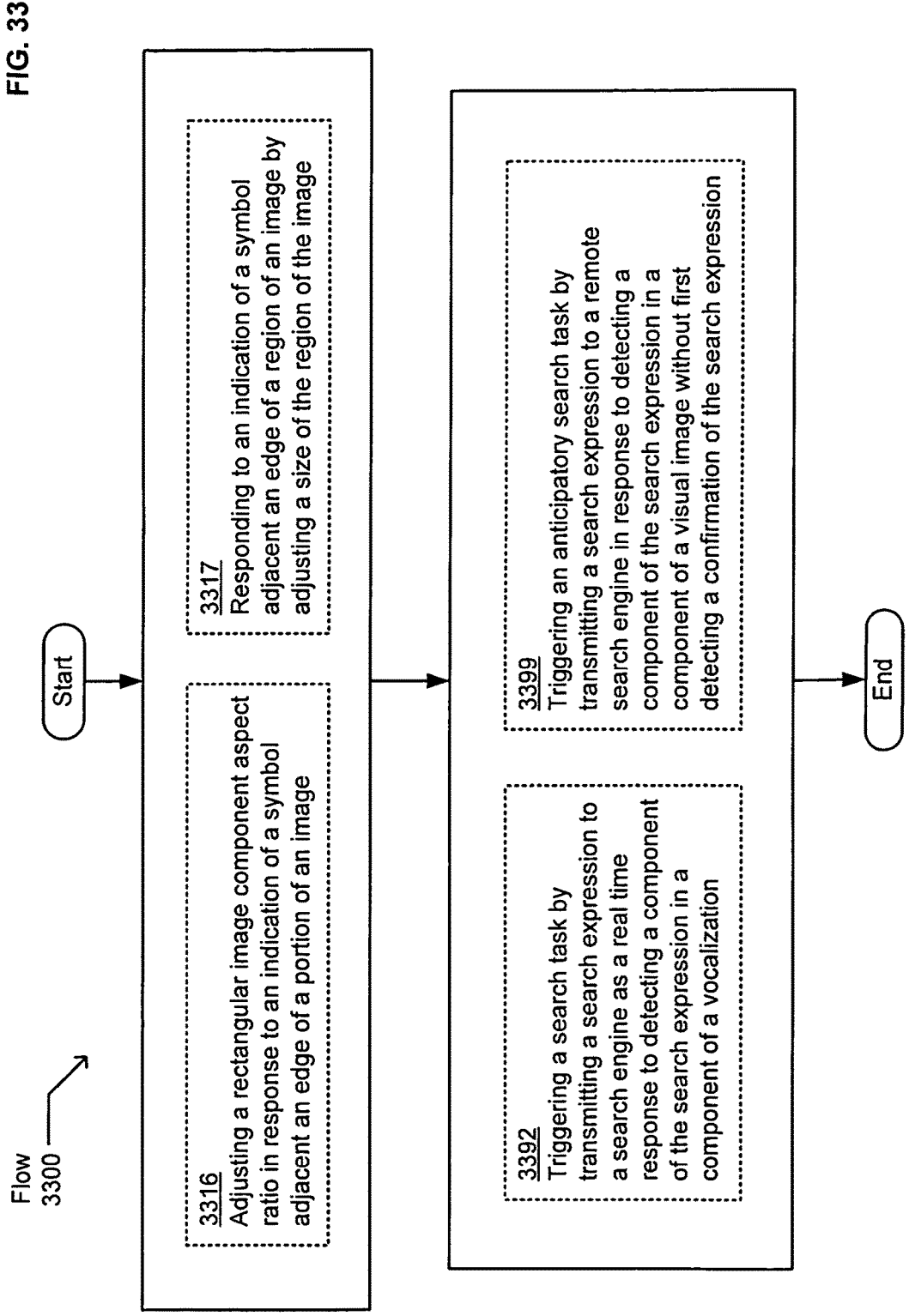

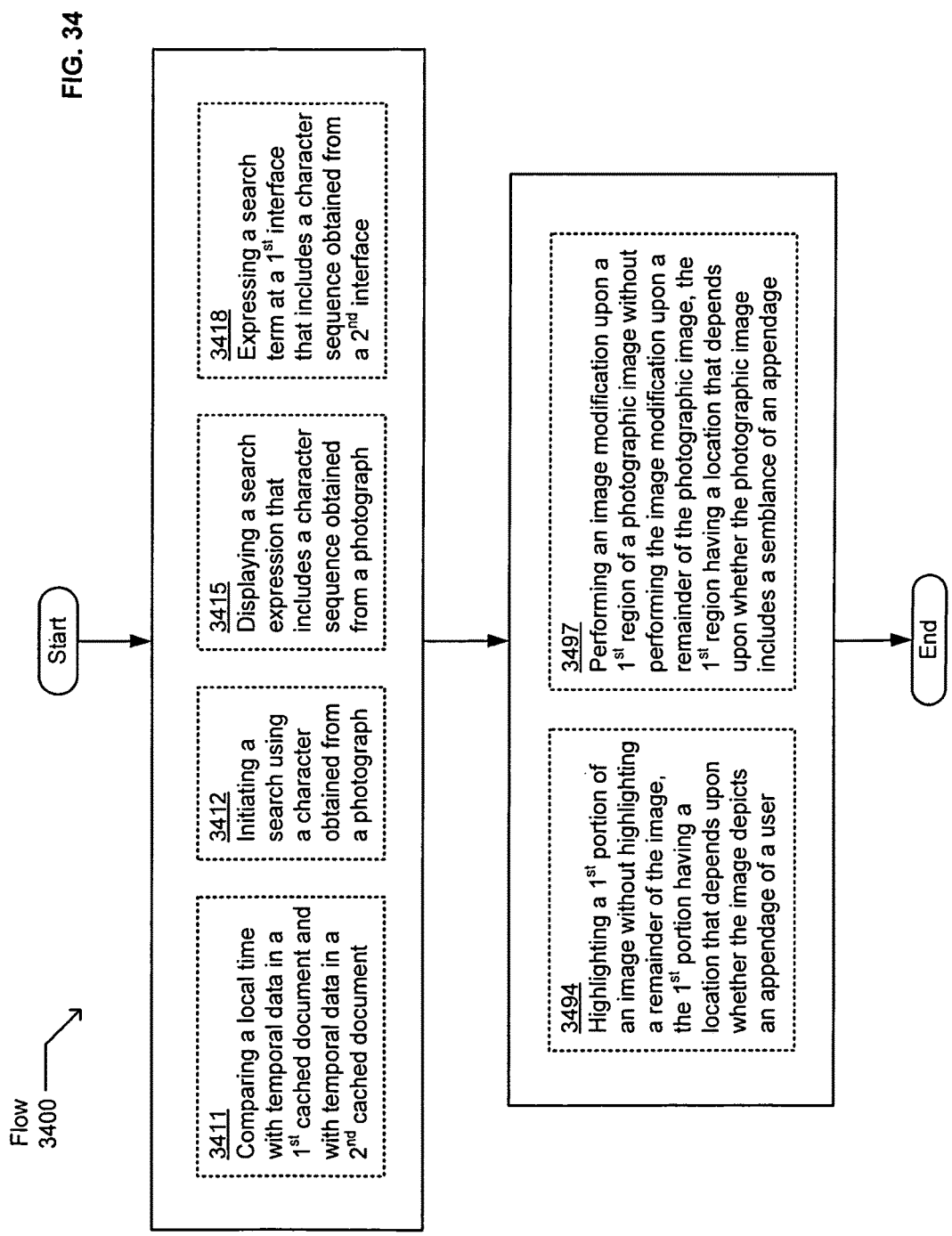

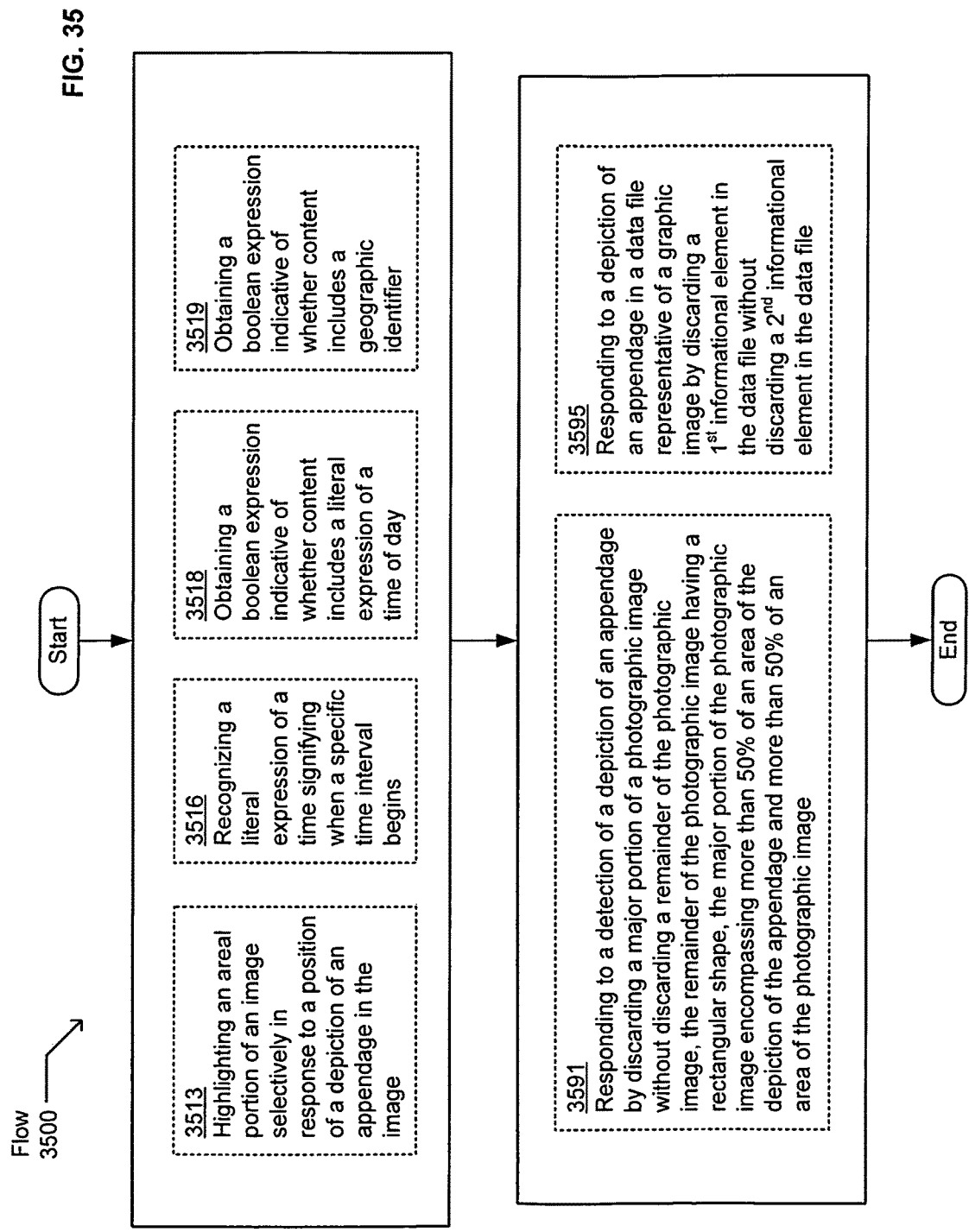

CONTEXT-SENSITIVE QUERY ENRICHMENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. Nos. 13/317,988, 13/317,989, 13/317,984, 13/317,990, and 13/317,991, each entitled CONTEXT-SENSITIVE QUERY ENRICHMENT, naming Marc E. Davis; Matthew G. Dyor; William Gates; Xuedong Huang; Roderick A. Hyde; Edward K.Y. Jung; Jordin T. Kare; Royce A. Levien; Qi Lu; Mark A. Malamud; Nathan P. Myhrvold; Satya Nadella; Daniel Reed; Harry Shum; Clarence T. Tegreene; and Lowell L. Wood, Jr. as inventors, filed on 31 Oct. 2011, each of which is currently or is an application of which is entitled to the benefit of the filing date. For purposes of the USPTO extra-statutory requirements, the present application also constitutes a continuation-in-part of U. S. patent application Ser. Nos. 13/373,833, 13/373,830 and 13/373,825 each entitled CONTEXT-SENSITIVE QUERY ENRICHMENT, naming Marc E. Davis; Matthew G. Dyor; William Gates; Xuedong Huang; Roderick A. Hyde; Edward K.Y. Jung; Jordin T. Kare; Royce A. Levien; Qi Lu; Mark A. Malamud; Nathan P. Myhrvold; Satya Nadella; Daniel Reed; Harry Shum; Clarence T. Tegreene; and Lowell L. Wood, Jr. as inventors, filed 30 Nov. 2011, each of which is currently an application of which is entitled to the benefit of the filing date.

For purposes of the USPTO extra-statutory requirements, the present application claims benefit of priority of U. S. patent application Ser. Nos. 13/317,988, 13/317,989, 13/317,984, 13/317,990, and 13/317,991, each entitled CONTEXT-SENSITIVE QUERY ENRICHMENT, naming Marc E. Davis; Matthew G. Dyor; William Gates; Xuedong Huang; Roderick A. Hyde; Edward K.Y. Jung; Jordin T. Kare; Royce A. Levien; Qi Lu; Mark A. Malamud; Nathan P. Myhrvold; Satya Nadella; Daniel Reed; Harry Shum; Clarence T. Tegreene; and Lowell L. Wood, Jr. as inventors, filed on 31 Oct. 2011, each of which was filed within the twelve months preceding the filing date of the present application or is an application of which a currently copending application is entitled to the benefit of the filing date. For purposes of the USPTO extra-statutory requirements, the present application also claims benefit of priority of U. S. patent application Ser. Nos. 13/373,833, 13/373, 830, and 13/373,825, each entitled CONTEXT-SENSITIVE QUERY ENRICHMENT, naming Marc E. Davis; Matthew G. Dyor; William Gates; Xuedong Huang; Roderick A. Hyde; Edward K.Y. Jung; Jordin T. Kare; Royce A. Levien; Qi Lu; Mark A. Malamud; Nathan P. Myhrvold; Satya Nadella; Daniel Reed; Harry Shum; Clarence T. Tegreene; and Lowell L. Wood, Jr. as inventors, filed 30Nov. 2011, each of which was filed within the twelve months preceding the filing date of the present application or is an application of which is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

An embodiment provides a method. In one implementation, the method includes but is not limited to obtaining a first parameter from a first search task initiated at a first interface device and causing a second interface device to indicate the first parameter from the first search task initiated at the first interface device partly based on an association between the second interface device and the first interface device and partly based on a second parameter from the first search task initiated at the first interface device. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for obtaining a first parameter from a first search task initiated at a first interface device and circuitry for causing a second interface device to indicate the first parameter from the first search task initiated at the first interface device partly based on an association between the second interface device and the first interface device and partly based on a second parameter from the first search task initiated at the first interface device. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining a first parameter from a first search task initiated at a first interface device and causing a second interface device to indicate the first parameter from the first search task initiated at the first interface device partly based on an association between the second interface device and the first interface device and partly based on a second parameter from the first search task initiated at the first interface device. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining a first parameter from a first search task initiated at a first interface device and causing a second interface device to indicate the first parameter from the first search task initiated at the first interface device partly based on an association between the second interface device and the first interface device and partly based on a second parameter from the first search task initiated at the first interface device. In addition to the foregoing, other system aspects are described in the claims, drawings, and text forming a part of the present disclosure.

An embodiment provides a method. In one implementation, the method includes but is not limited to recognizing a position of a first limb of a person in relation to a facial region of the person and to a three-dimensional region indicated by the first limb of the person, the three-dimensional region including a first informational element and transmitting a search result relating to the first informational element and partly based on first auditory data from a vicinity of the person and partly based on the position of the first limb of the person in relation to the facial region of the person and to the three-dimensional region indicated by the first limb of the person. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for recognizing a position of a first limb of a person in relation to a facial region of the person and to a three-dimensional region indicated by the first limb of the person, the three-dimensional region including a first informational element and circuitry for transmitting a search result relating to the first informational element and partly based on first auditory data from a vicinity of the person and partly based on the position of the first limb of the person in relation to the facial region of the person and to the three-dimensional region indicated by the first limb of the person. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to recognizing a position of a first limb of a person in relation to a facial region of the person and to a three-dimensional region indicated by the first limb of the person, the three-dimensional region including a first informational element and transmitting a search result relating to the first informational element and partly based on first auditory data from a vicinity of the person and partly based on the position of the first limb of the person in relation to the facial region of the person and to the three-dimensional region indicated by the first limb of the person. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for recognizing a position of a first limb of a person in relation to a facial region of the person and to a three-dimensional region indicated by the first limb of the person, the three-dimensional region including a first informational element and transmitting a search result relating to the first informational element and partly based on first auditory data from a vicinity of the person and partly based on the position of the first limb of the person in relation to the facial region of the person and to the three-dimensional region indicated by the first limb of the person. In addition to the foregoing, other system aspects are described in the claims, drawings, and text forming a part of the present disclosure.

An embodiment provides a method. In one implementation, the method includes but is not limited to recognizing a position of a first limb of a person in relation to a facial region of the person and to a three-dimensional region indicated by the first limb of the person, the three-dimensional region including a first informational element and transmitting a search result partly based on the person corroborating the first informational element as a component of a search criterion and partly based on the position of the first limb of the person in relation to the facial region of the person and to the three-dimensional region indicated by the first limb of the person, the search result having arisen from a usage of the first informational element as a component of the search criterion. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for recognizing a position of a first limb of a person in relation to a facial region of the person and to a three-dimensional region indicated by the first limb of the person, the three-dimensional region including a first informational element and circuitry for transmitting a search result partly based on the person corroborating the first informational element as a component of a search criterion and partly based on the position of the first limb of the person in relation to the facial region of the person and to the three-dimensional region indicated by the first limb of the person, the search result having arisen from a usage of the first informational element as a component of the search criterion. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to recognizing a position of a first limb of a person in relation to a facial region of the person and to a three-dimensional region indicated by the first limb of the person, the three-dimensional region including a first informational element and transmitting a search result partly based on the person corroborating the first informational element as a component of a search criterion and partly based on the position of the first limb of the person in relation to the facial region of the person and to the three-dimensional region indicated by the first limb of the person, the search result having arisen from a usage of the first informational element as a component of the search criterion. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for recognizing a position of a first limb of a person in relation to a facial region of the person and to a three-dimensional region indicated by the first limb of the person, the three-dimensional region including a first informational element and transmitting a search result partly based on the person corroborating the first informational element as a component of a search criterion and partly based on the position of the first limb of the person in relation to the facial region of the person and to the three-dimensional region indicated by the first limb of the person, the search result having arisen from a usage of the first informational element as a component of the search criterion. In addition to the foregoing, other system aspects are described in the claims, drawings, and text forming a part of the present disclosure.

An embodiment provides a method. In one implementation, the method includes but is not limited to recognizing a position of a first limb of a person in relation to a first interface device input configured to be supported by the person and to a three-dimensional region indicated by the first limb of the person, the three-dimensional region including a first informational element and transmitting a search result relating to the first informational element and partly based on first auditory data from a vicinity of the person and partly based on the position of the first limb of the person in relation to the three-dimensional region indicated by the first limb of the person. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for recognizing a position of a first limb of a person in relation to a first interface device input configured to be supported by the person and to a three-dimensional region indicated by the first limb of the person, the three-dimensional region including a first informational element and circuitry for transmitting a search result relating to the first informational element and partly based on first auditory data from a vicinity of the person and partly based on the position of the first limb of the person in relation to the three-dimensional region indicated by the first limb of the person. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to recognizing a position of a first limb of a person in relation to a first interface device input configured to be supported by the person and to a three-dimensional region indicated by the first limb of the person, the three-dimensional region including a first informational element and transmitting a search result relating to the first informational element and partly based on first auditory data from a vicinity of the person and partly based on the position of the first limb of the person in relation to the three-dimensional region indicated by the first limb of the person. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for recognizing a position of a first limb of a person in relation to a first interface device input configured to be supported by the person and to a three-dimensional region indicated by the first limb of the person, the three-dimensional region including a first informational element and transmitting a search result relating to the first informational element and partly based on first auditory data from a vicinity of the person and partly based on the position of the first limb of the person in relation to the three-dimensional region indicated by the first limb of the person. In addition to the foregoing, other system aspects are described in the claims, drawings, and text forming a part of the present disclosure.

An embodiment provides a method. In one implementation, the method includes but is not limited to recognizing a position of a first limb of a person in relation to a three-dimensional region indicated by the first limb of the person and to a first interface device input configured to be supported by the person, the three-dimensional region including a first informational element and transmitting a search result partly based on the person corroborating the first informational element as a component of a search criterion and partly based on the position of the first limb of the person in relation to the three-dimensional region indicated by the first limb of the person and to the first interface device input configured to be supported by the person, the search result having arisen from a usage of the first informational element as a component of the search criterion. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for recognizing a position of a first limb of a person in relation to a three-dimensional region indicated by the first limb of the person and to a first interface device input configured to be supported by the person, the three-dimensional region including a first informational element and circuitry for transmitting a search result partly based on the person corroborating the first informational element as a component of a search criterion and partly based on the position of the first limb of the person in relation to the three-dimensional region indicated by the first limb of the person and to the first interface device input configured to be supported by the person, the search result having arisen from a usage of the first informational element as a component of the search criterion. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to recognizing a position of a first limb of a person in relation to a three-dimensional region indicated by the first limb of the person and to a first interface device input configured to be supported by the person, the three-dimensional region including a first informational element and transmitting a search result partly based on the person corroborating the first informational element as a component of a search criterion and partly based on the position of the first limb of the person in relation to the three-dimensional region indicated by the first limb of the person and to the first interface device input configured to be supported by the person, the search result having arisen from a usage of the first informational element as a component of the search criterion. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for recognizing a position of a first limb of a person in relation to a three-dimensional region indicated by the first limb of the person and to a first interface device input configured to be supported by the person, the three-dimensional region including a first informational element and transmitting a search result partly based on the person corroborating the first informational element as a component of a search criterion and partly based on the position of the first limb of the person in relation to the three-dimensional region indicated by the first limb of the person and to the first interface device input configured to be supported by the person, the search result having arisen from a usage of the first informational element as a component of the search criterion. In addition to the foregoing, other system aspects are described in the claims, drawings, and text forming a part of the present disclosure.

An embodiment provides a method. In one implementation, the method includes but is not limited to causing a first geographic identifier recognition criterion to be applied to first content and to second content and indicating via a first interface device a preference either for the first content or for the second content, the preference being partly based on a movement status of the first interface device and partly based on a result of the first geographic identifier recognition criterion being applied to the first content and to the second content. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for causing a first geographic identifier recognition criterion to be applied to first content and to second content and circuitry for indicating via a first interface device a preference either for the first content or for the second content, the preference being partly based on a movement status of the first interface device and partly based on a result of the first geographic identifier recognition criterion being applied to the first content and to the second content. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to causing a first geographic identifier recognition criterion to be applied to first content and to second content and indicating via a first interface device a preference either for the first content or for the second content, the preference being partly based on a movement status of the first interface device and partly based on a result of the first geographic identifier recognition criterion being applied to the first content and to the second content. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for causing a first geographic identifier recognition criterion to be applied to first content and to second content and indicating via a first interface device a preference either for the first content or for the second content, the preference being partly based on a movement status of the first interface device and partly based on a result of the first geographic identifier recognition criterion being applied to the first content and to the second content. In addition to the foregoing, other system aspects are described in the claims, drawings, and text forming a part of the present disclosure.

An embodiment provides a method. In one implementation, the method includes but is not limited to obtaining a first parameter from a first search task initiated at a first interface device; obtaining a second parameter from a second interface device; and causing the second interface device to indicate the first parameter from the first search task initiated at the first interface device partly based on an association between the second interface device and the first interface device and partly based on the second parameter from the second interface device. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for obtaining a first parameter from a first search task initiated at a first interface device; circuitry for obtaining a second parameter from a second interface device; and circuitry for causing the second interface device to indicate the first parameter from the first search task initiated at the first interface device partly based on an association between the second interface device and the first interface device and partly based on the second parameter from the second interface device. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining a first parameter from a first search task initiated at a first interface device; obtaining a second parameter from a second interface device; and causing the second interface device to indicate the first parameter from the first search task initiated at the first interface device partly based on an association between the second interface device and the first interface device and partly based on the second parameter from the second interface device. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining a first parameter from a first search task initiated at a first interface device; obtaining a second parameter from a second interface device; and causing the second interface device to indicate the first parameter from the first search task initiated at the first interface device partly based on an association between the second interface device and the first interface device and partly based on the second parameter from the second interface device. In addition to the foregoing, other system aspects are described in the claims, drawings, and text forming a part of the present disclosure.

An embodiment provides a method. In one implementation, the method includes but is not limited to obtaining a first parameter from a first search task initiated at a first interface device and causing a second interface device to indicate the first parameter from the first search task initiated at the first interface device partly based on an association between the second interface device and the first interface device and partly based on a difference between a first prior location of the second interface device and a second prior location of the second interface device. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for obtaining a first parameter from a first search task initiated at a first interface device and circuitry for causing a second interface device to indicate the first parameter from the first search task initiated at the first interface device partly based on an association between the second interface device and the first interface device and partly based on a difference between a first prior location of the second interface device and a second prior location of the second interface device. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining a first parameter from a first search task initiated at a first interface device and causing a second interface device to indicate the first parameter from the first search task initiated at the first interface device partly based on an association between the second interface device and the first interface device and partly based on a difference between a first prior location of the second interface device and a second prior location of the second interface device. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining a first parameter from a first search task initiated at a first interface device and causing a second interface device to indicate the first parameter from the first search task initiated at the first interface device partly based on an association between the second interface device and the first interface device and partly based on a difference between a first prior location of the second interface device and a second prior location of the second interface device. In addition to the foregoing, other system aspects are described in the claims, drawings, and text forming a part of the present disclosure.

An embodiment provides a method. In one implementation, the method includes but is not limited to obtaining an indication of a movement status of a first interface device; causing a first time-of-day recognition criterion to be applied to first content and to second content; and indicating via the first interface device a preference either for the first content or for the second content partly based on the indication of the movement status of the first interface device and partly based on a result of the first time-of-day recognition criterion being applied to the first content and to the second content. In addition to the foregoing, other method aspects are described in the claims, drawings, and text forming a part of the present disclosure.

In one or more various aspects, related machines, compositions of matter, or manufactures of systems may include virtually any combination permissible under 35 U.S.C. § 101 of hardware, software, and/or firmware configured to effect the herein-referenced method aspects depending upon the design choices of the system designer.

An embodiment provides a system. In one implementation, the system includes but is not limited to circuitry for obtaining an indication of a movement status of a first interface device; circuitry for causing a first time-of-day recognition criterion to be applied to first content and to second content; and circuitry for indicating via the first interface device a preference either for the first content or for the second content partly based on the indication of the movement status of the first interface device and partly based on a result of the first time-of-day recognition criterion being applied to the first content and to the second content. In addition to the foregoing, other system aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to obtaining an indication of a movement status of a first interface device; causing a first time-of-day recognition criterion to be applied to first content and to second content; and indicating via the first interface device a preference either for the first content or for the second content partly based on the indication of the movement status of the first interface device and partly based on a result of the first time-of-day recognition criterion being applied to the first content and to the second content. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device configure the computing device for obtaining an indication of a movement status of a first interface device; causing a first time-of-day recognition criterion to be applied to first content and to second content; and indicating via the first interface device a preference either for the first content or for the second content partly based on the indication of the movement status of the first interface device and partly based on a result of the first time-of-day recognition criterion being applied to the first content and to the second content. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth below.

BRIEF DESCRIPTION OF THE FIGURES

FIGS. 6-7 depict exemplary environments featuring data-handling media.

FIG. 8 depicts an exemplary environment featuring interface devices that may be operably coupled together via a network.

FIGS. 14-15 depict exemplary environments featuring one or more devices that may facilitate a search partly based an association with another device.

FIG. 17 depicts a high-level logic flow of an operational process described with reference to FIG. 8.

FIG. 23 depicts a high-level logic flow of an operational process described with reference to FIG. 14.

FIG. 26 depicts an exemplary environment featuring data-handling media.

FIGS. 31-35 each depict intensive and extensive operations that may be performed in conjunction with one or more high-level logic flows shown in FIGS. 17-25.

DETAILED DESCRIPTION

Figure 1:
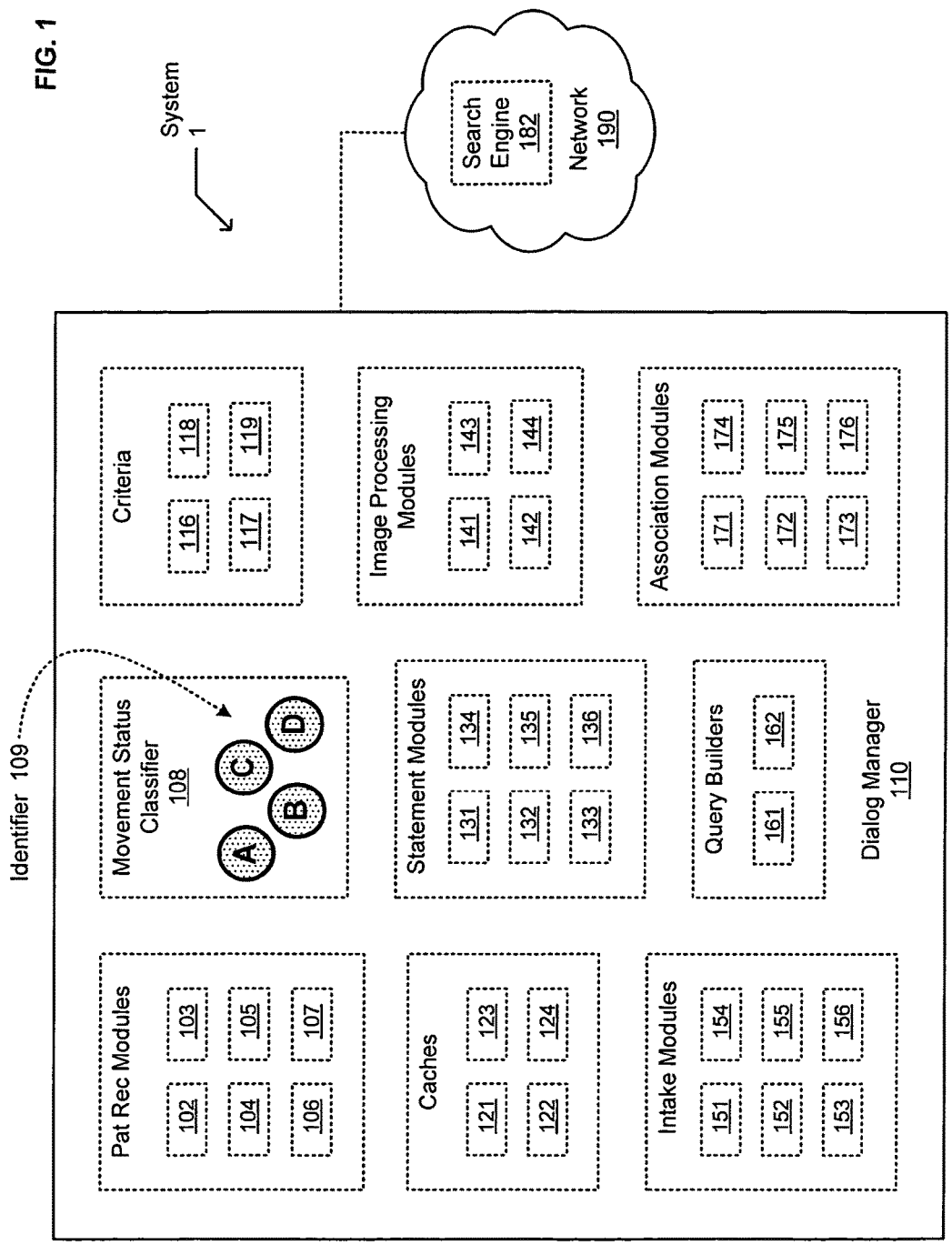
FIG. 1 depicts an exemplary environment in the context of a dialog manager.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Referring now to FIG. 1, there is shown a system 1 in which one or more technologies may be implemented. A dialog manager 110 is operable to interact with one or more instances of a search engine 182 in a local or remote network 190. Dialog manager 110 may (optionally) include one or more instances of pattern recognition modules 102, 103, 104, 105, 106, 107 or movement status classifiers 108 in various combinations as exemplified below. In some variants, such movement status classifiers 108 may use global positioning system (GPS) data or other such inputs to generate one or more status identifiers 109 that signal, for example, whether or how fast a device is moving or whether or how fast it has moved recently. In some variants, as described below, dialog manager 110 may generate or apply one or more criteria 116, 117, 118, 119 or may use one or more caches 121, 122, 123, 124. Dialog managers 110 may likewise include one or more instances of statement modules 131, 132, 133, 134, 135, 136; image processing modules 141, 142, 143, 144; intake modules 151, 152, 153, 154, 155, 156; query builders 161, 162; or association modules 171, 172, 173, 174, 175, 176. As exemplified herein, a "module" may include special-purpose hardware, general-purpose hardware configured with special-purpose software, or other circuitry configured to perform one or more functions recited below. Also in some contexts such "association modules" may be configured to establish an association (between two devices, e.g.) in response to common interactions (a backup from one device to the other, both logging into a password-access account, or sharing the same printer or router or other peripheral, e.g.). Moreover respective embodiments of dialog manager 110 may implement substantially any combination thereof, as exemplified in data distillation protocols described below.

Figure 2:
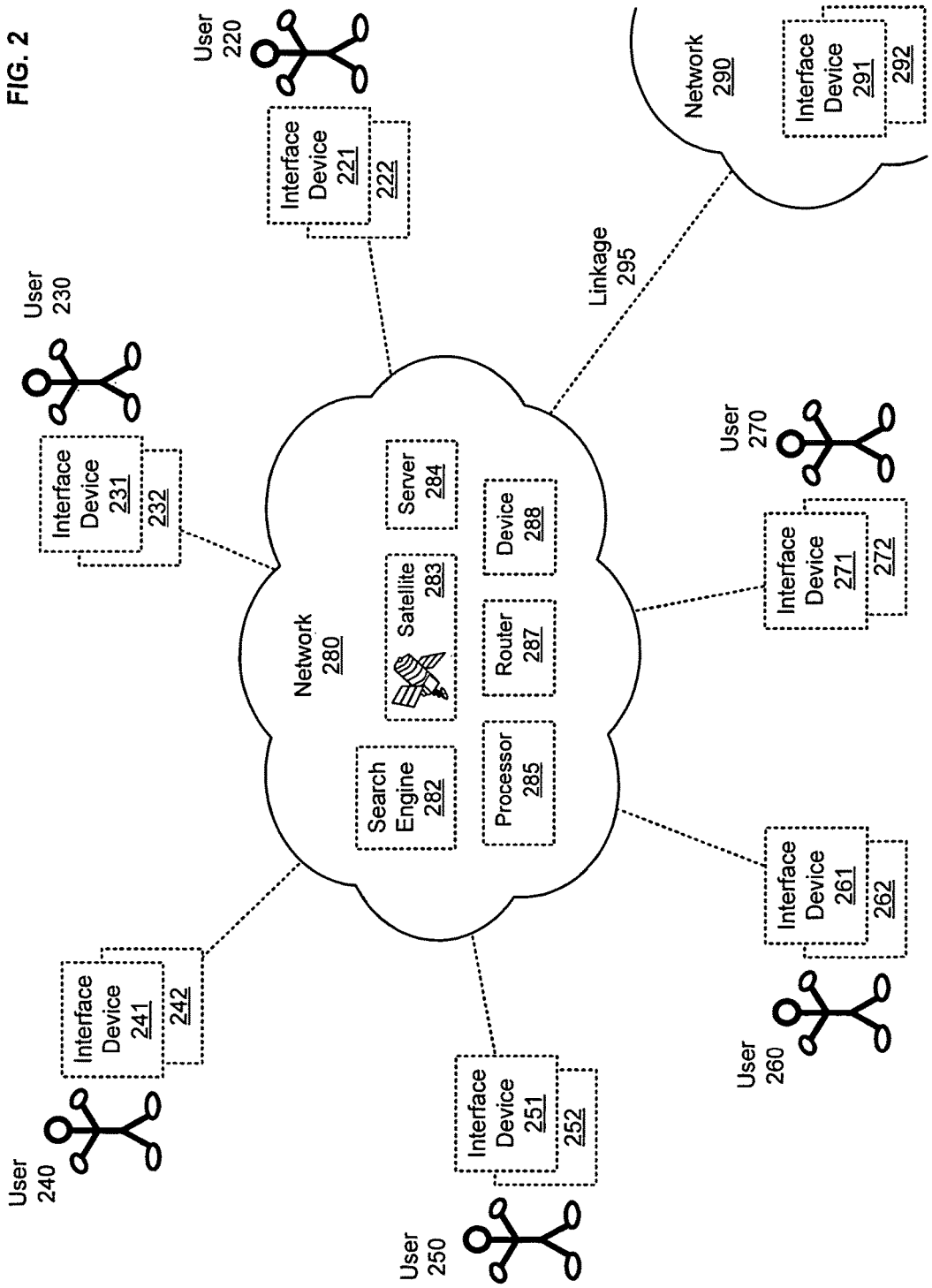
FIG. 2 depicts an exemplary environment featuring networks accessible to multiple users via multiple interface devices.

With reference now to FIG. 2, shown is an example of a network 280 that may serve as a context for introducing one or more processes, systems or other articles described herein. In some instances network 280 may include one or more search engines 282, satellites 283, servers 284, processors 285, routers 287, or other devices 288. In some contexts, one or more interface devices 221, 222 owned or operated by user 220 may interact through network 280 (e.g. with one or more other interface devices or networks 190, 290 as described herein). One or more such associated interface devices 221, 222 may be mobile devices, in some contexts, or may function in cooperation (as a network subsystem, e.g.) even when remote from one another. Alternatively or additionally, one or more other interface devices 231, 232 owned or operated by user 230 may likewise interact locally or remotely with or through one another or other interface devices (through network 280, e.g.). One or more other interface devices 241, 242 owned or operated by user 240 may (optionally) likewise interact with or through one another or other interface devices. One or more other interface devices 251, 252 owned or operated by user 250 may likewise interact with or through one another or other interface devices. One or more other interface devices 261, 262 owned or operated by user 260 may likewise interact with or through one another or other interface devices. One or more other interface devices 271, 272 owned or operated by user 270 may likewise interact with or through one another or other interface devices. Such interactions may be useful, for example, in a context in which device 288 is configured to facilitate communication.

In some contexts, such interface devices (of FIG. 2, e.g.) may include or otherwise communicate with one or more instances of dialog manager 110 and may include one or more instances of data outputs or other implementations of machines, articles of manufacture, or compositions of matter that include circuitry or other logic as described below. In some contexts, such implementations may be held or transmitted by conduits, storage devices, memories, other holding devices, or other circuitry for handling data or software (in a satellite 283, server 284, or router 287, e.g.) as described herein. In various embodiments, one or more instances of implementation components or implementation output data may each be expressed within any aspect or combination of software, firmware, or hardware as signals, data, designs, logic, instructions, or other such special-purpose expression or implementation. Such interface devices (of FIG. 2, e.g.) may likewise include one or more instances of lenses, transmitters, receivers, integrated circuits, antennas, output devices, reflectors, or input devices for handling data or communicating with local users or with network 290 via linkage 295, for example.

Those skilled in the art will recognize that some list items may also function as other list items. In the above-listed types of media, for example, some instances of interface devices may include conduits or may also function as storage devices that are also holding devices. One or more transmitters may likewise include input devices or bidirectional user interfaces, in many implementations of interface devices 221, 222, 231, 232, 241, 242, 251, 252, 261, 262, 271, 272, 291, 292. Each such listed term should not be narrowed by any implication from other terms in the same list but should instead be understood in its broadest reasonable interpretation as understood by those skilled in the art.

Figure 3:
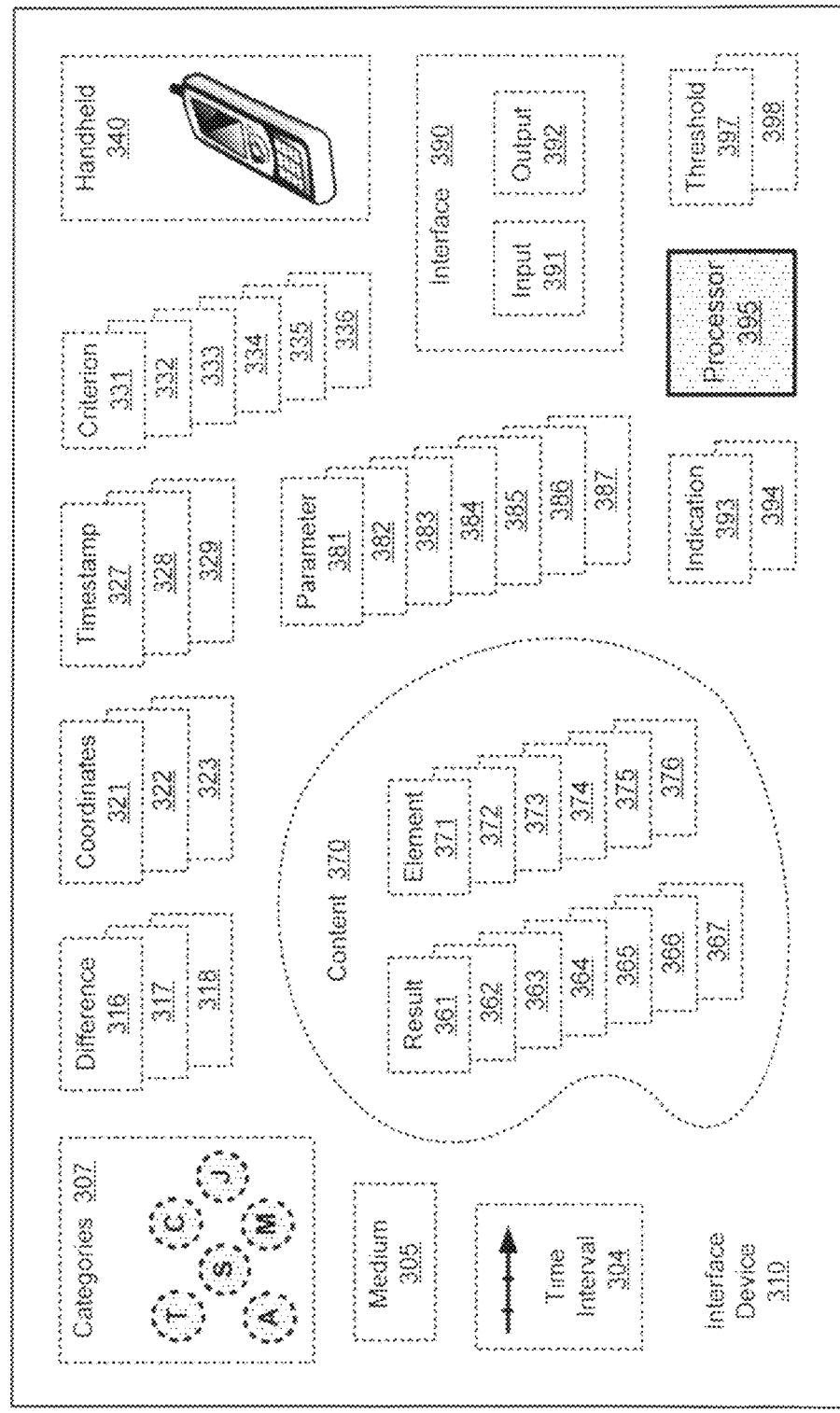
FIG. 3 depicts an exemplary environment featuring several components of an interface device.

With reference now to FIG. 3, shown is an example of a system 3 in which one or more technologies may be implemented. In some contexts, one or more interface devices depicted in FIG. 2 may implement interface device 310. Such devices may include one or more data handling media 305 configured to bear or manipulate one or more time intervals 304; categories 307; differences 316, 317, 318; coordinates 321, 322, 323; timestamps 327, 328, 329; criteria 331, 332, 333, 334, 335, 336; or other parameters 381, 382, 383, 384, 385, 386, 387 (conventionally expressed digitally, e.g.). In some contexts, moreover, media 305 may be configured to bear one or more results 361, 362, 363, 364, 365, 366, 367 or other elements 371, 372, 373, 374, 375, 376 of content 370 or distillations thereof. Moreover interface device 310 may comprise a handheld 340 or other interface 390 (having one or more touchscreens or other inputs 391 or outputs 392 as exemplified below. Alternatively or additionally, such interface devices (of FIG. 2, e.g.) may (optionally) include one or more processors 395 configured to interact with interface 390 and to manipulate one or more indications 393, 394 or implement one or more thresholds 397, 398 as described below.

In some implementations, one or more such elements 371-376 or results 361-367 may include or depend upon an apparent role of a user (of FIG. 2, e.g.) or other such contextual information useful for enriching a structured interaction or other query formation protocol as exemplified below. Two or more positions or differences 317, 318 may have timestamps 327, 328 associated therewith to support an inference that interface device 310 has been with a user (of FIG. 2, e.g.) who has been shopping (if moving into a shopping district, e.g.) representable as "S"; with a user 230 who has been teaching or taking classes (if moving around a school, e.g.) representable as "T"; with a user 240 who has been traveling by a motorized vehicle (if one or more differences 318 exceeds a speed-indicative threshold 397 over a given time interval 304, e.g.) representable as "M"; with a user 250 who has been traveling by air (if an average speed exceeds a higher speed-indicative threshold 398, e.g.) representable as "A"; or with a user who just changed activities (if one or more differences 316, 317 are detected right after a long series of non-movement indications (parameters indicating non-difference, e.g.) representable as "J". Even without such specific characterizations, however, one or more such categories 307 indicative of positional differences or speeds may be used as a useful taxonomy with which to study which search and ranking modes were most successful for each of several categories 307 (as used by movement status classifier 108, e.g.).

Figure 4:
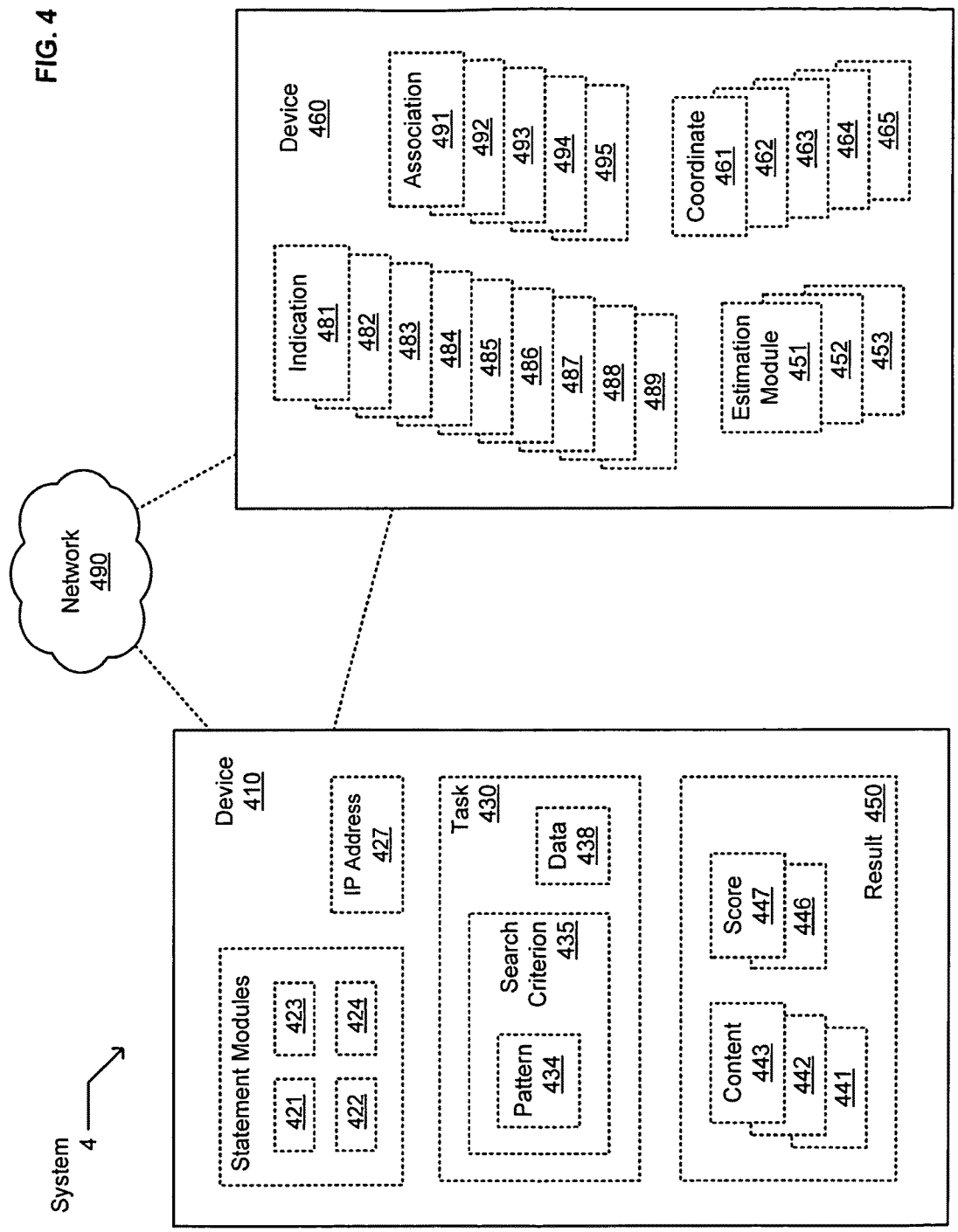
FIG. 4 depicts an exemplary environment featuring devices that may be operably coupled together either directly or via a network.

With reference now to FIG. 4, shown is an example of a system 4 (network subsystem, e.g.) in which one or more technologies may be implemented. One or more devices 410, 460 (implementing respective interface devices of FIG. 2, e.g.) are configured to permit communication in one or both directions, either directly (via a direct wireless or mechanical linkage, e.g.) or via one or more networks 190, 290, 490 described herein. A "primary" device 410 may have an interne protocol (IP) address or may include one or more statement modules 421, 422, 423, 424. One or more processors 395 therein may be configured (with special-purpose software, e.g.) to initiate or (in some variants) to perform a search or other task 430 and to present one or more results 450 therefrom. Each task 430 may be invoked with one or more patterns 434 or other search criteria 435 which may result in an aggregation of data 438. Alternatively or additionally, some instances of tasks 430 (a processor-implemented configuration, e.g.) may generate one or more timestamps 327-329, operational definitions, operating parameters 381-387, or other such task-specific data 438 that may (in some variants) be presented to a user as a result 450 of the task 430. A "secondary" device 460 may include (on a medium 305 therein, e.g.) one or more instances of associations 491, 492, 493, 494, 495 or other indications 481, 482, 483, 484, 485, 486, 487, 488, 489 (digitally expressed, e.g.) that may be received at one or both devices 410, 460 as described below. In some contexts, for example, such expressions may include one or more coordinates 461, 462, 463, 464, 465 generated by a GPS, image processing module, or other estimation module 451, 452, 453 as described below or known in the art.

Figure 5:
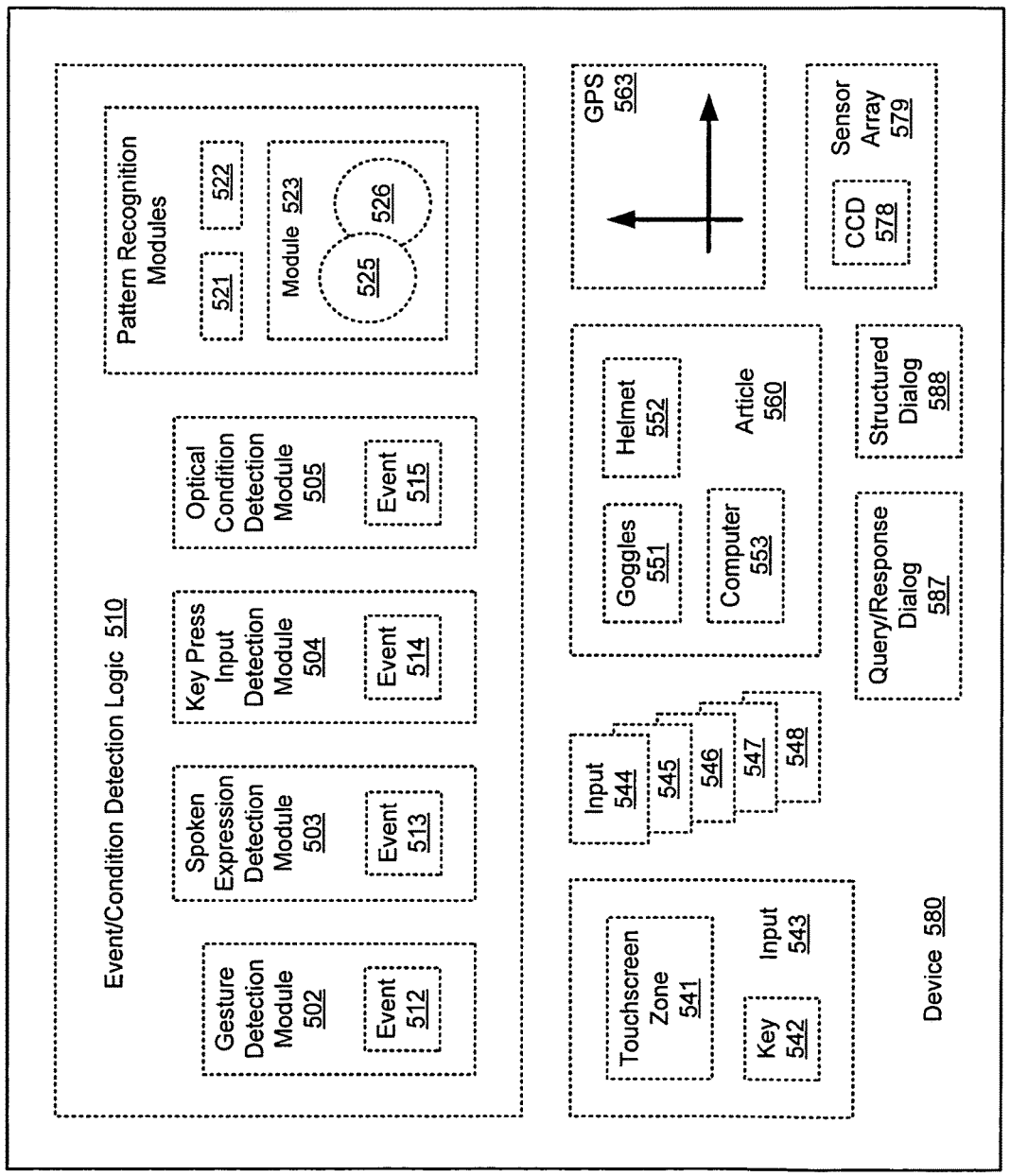
FIG. 5 depicts an exemplary environment featuring event/condition detection logic and other components of a wearable article or other portable device.

With reference now to FIG. 5, shown is an example of a system 5 (network subsystem, e.g.) in which one or more technologies may be implemented. Device 580 may be implemented one or more of the above-described devices and may (optionally) include various event/condition detection logic 510. One or more modules may be configured to monitor inputs 543, 544, 545, 546, 547, 548 from sensors (as described below, e.g.) for various device-detectable events 512, 513, 514, 515: sign language expressions or other communicative gestures involving movements of a user's hand or head (detectable by gesture detection module 502, e.g.); spoken words or other auditory phenomena (detectable by spoken expression detection module 503, e.g.); events at touchscreen zones 541, events at keys 542, buttons, or similar local user input devices (detectable by key press input detection module 504, e.g.); conditions manifested in a photograph or similar optical data (detectable by optical condition detection module 505, e.g.); or other such device-detectable events or conditions or other criteria 525, 526 described below (detectable by one or more comparators or other pattern recognition modules 521, 522, 523, e.g.). In some contexts, "local" is used herein to include a room, facility, or other vicinity in which one or more users (of FIG. 2, e.g.) operate or are observed by a device 580 as described herein. In some contexts, device 580 may comprise goggles 551, a helmet 552, a computer 553, or other such wearable or portable articles 560. As explained below, device 580 may further include a global positioning system (GPS) 563; a charge-coupled device (CCD) 578 or other sensor array 579; or other such configurations of sensors. In some variants, moreover, device 580 may be configured to conduct one or more query/response dialogs 587, structured dialogs 588, or other such protocols that can be invoked for obtaining real-time user selections or other particular parameters such as those mentioned in reference to implementations described herein.

In light of teachings herein, numerous existing techniques may be applied for configuring special-purpose circuitry or other structures effective for conducting a context-specific structured dialog or other user interaction as described herein without undue experimentation. See, e.g., U.S. Pat. No. 8,024,329 ("Using inverted indexes for contextual personalized information retrieval"); U.S. Pat. No. 7,970,735 ("Cross varying dimension support for analysis services engine"); U.S. Pat. No. 7,920,678 ("Personal virtual assistant"); U.S. Pat. No. 7,870,117 ("Constructing a search query to execute a contextual personalized search of a knowledge base"); U.S. Pat. No. 7,761,480 ("Information access using ontologies"); U.S. Pat. No. 7,743,051 ("Methods, systems, and user interface for e-mail search and retrieval"); U.S. Pat. No. 7,593,982 ("Method, system, and computer program product for saving a search result within a global computer network"); U.S. Pat. No. 7,363,246 ("System and method for enhancing buyer and seller interaction during a group-buying sale"); U.S. Pat. No. 7,177,948 ("Method and apparatus for enhancing online searching sale"); U.S. Pat. No. 6,798,867 ("System and method for the creation and automatic deployment of personalized, dynamic and interactive voice services, with real-time database queries"); U.S. Pub. No. 2011/0081053 ("Methods and systems for occlusion tolerant face recognition"); U.S. Pub. No. 2008/0159622 ("Target object recognition in images and video").

With reference now to FIG. 6, shown is an example of a system 6 comprising one or more solid media 605. Such media 605 may include one or more disk drives 620 or memories 680 that may contain one or more images 621, 622, 623, 624, 625, 626, 627 or other optical data 641, 642, 643; auditory data 656, 657, 658; content 697, 698 of a data repository or search result 690; or rankings 675, 676 or records 679 pertaining to such content. Implementing a dynamic memory, for example, such media may bear one or more digitally-embodied search tasks 611, 612, 613, 614,

615, 616, 617, 618. Alternatively or additionally, such media 605 may also include one or more speakers 671 or displays 672 (configured to play or display such data from one or more statement modules 131-136, e.g.). Alternatively or additionally, one or more modules described herein may access such media to perform various functions as exemplified below, such as for identifying points 628, 629 or defining and manipulating regions 631, 632, 633 in or other components of an image 623.

With reference now to FIG. 7, shown is an example of a system 7 comprising one or more additional media 705, optionally comprising an instance of media 605. Such media (implementing a memory 780, e.g.) may bear one or more prompts 701, 702, 703; search tasks 711, 712, 713, 714; results 721, 722, 723, 724; records 731, 732, 733, 734; data supplies 740; lists 745; rankings 751, 752, 753; positional data 770; telephone numbers 771, serial numbers 772, or other identifiers 775; or timing data 781, 782, 783. In some contexts, for example, a streaming or other data supply 740 may include one or more building addresses 742 or other location identifiers 743 in textual content 741. Alternatively or additionally, such positional data may include one or more coordinates 761, 762; difference signals 764; or speeds 765 (in digital expressions, e.g.).

Several variants described herein refer to device-detectable "implementations" such as one or more instances of computer-readable code, transistor or latch connectivity layouts or other geometric expressions of logical elements, firmware or software expressions of transfer functions implementing computational specifications, digital expressions of truth tables, or the like. Such instances can, in some implementations, include source code or other human-readable portions. Alternatively or additionally, functions of implementations described herein may constitute one or more device-detectable outputs such as decisions, manifestations, side effects, results, coding or other expressions, displayable images, data files, data associations, statistical correlations, streaming signals, intensity levels, frequencies or other measurable attributes, packets or other encoded expressions, or the like from invoking or monitoring the implementation as described herein.

In some embodiments, a "state" of a component may comprise "available" or some other such state-descriptive labels, an event count or other such memory values, a partial depletion or other such physical property of a supply device, a voltage, or any other such conditions or attributes that may change between two or more possible values irrespective of device location. Such states may be received directly as a measurement or other detection, in some variants, and/or may be inferred from a component's behavior over time. A distributed or other composite system may comprise vector-valued device states, moreover, which may affect dispensations or departures in various ways as exemplified herein.

"Apparent," "selective," "conditional," "indicative," "normal," "present," "coincident," "related," "partly," "responsive," "distilled," "useless," "remote," "in a vicinity," or other such descriptors herein are used in their normal yes-or-no sense, not as terms of degree, unless context dictates otherwise. In light of the present disclosure those skilled in the art will understand from context what is meant by "vicinity," by being "in" or "at" a detection region, by "remote," and by other such positional descriptors used herein. "For" is not used to articulate a mere intended purpose in phrases like "circuitry for" or "instruction for," moreover, but is used normally, in descriptively identifying special purpose circuitry or code.

The term "three-dimensional region" is used herein to describe spaces of at least about 1 millimeter in thickness—not generally including regions of photographic media (display screens or posters, e.g.), which are generally regarded as "two-dimensional regions."

Some descriptions herein refer to a "data distillation." Such distillations can include an average, estimate, range, or other computation at least partly distilling a set of data. They can likewise include an indexing, sorting, summarization, distributed sampling, or other process having a purpose or effect of showing some aspect of the data more concisely or effectively than a conventional display or archiving of the entire data. Selecting a last portion of a data set can constitute a distillation, for example, in a context in which the data's utility apparently increases (medians or other cumulative computations, e.g.). Removing duplicative data or indexing available data are useful ways of "distilling" data so that it becomes manageable even while retaining some of its meaning. Those skilled in the art will recognize many useful modes of distilling data in light of the state of the art and of teachings herein.

In some embodiments, "signaling" something can include identifying, contacting, requesting, selecting, or indicating the thing. In some cases a signaled thing is susceptible to fewer than all of these aspects, of course, such as a task definition that cannot be "contacted."

In some embodiments, "status indicative" data can reflect a trend or other time-dependent phenomenon indicating some aspect of a subject's condition. Alternatively or additionally, a status indicative data set can include portions that have no bearing upon such status. Although some types of distillations can require authority or substantial expertise (e.g. making a final decision upon a risky procedure or other course of treatment), many other types of distillations can readily be implemented without undue experimentation in light of teachings herein.

In some embodiments, one or more applicable "criteria" can include maxima or other comparison values applied to durations, counts, lengths, widths, frequencies, signal magnitudes or phases, digital values, or other aspects of data characterization. In some contexts, such criteria can be applied by determining when or how often a recognizable pattern can be found: a text string, a quantity, a cough-like sound, an arrhythmia, a visible dilation, a failure to respond, a non-change, an allergic response, a symptom relating to an apparent condition of the user, or the like.

In some embodiments, "causing" events can include triggering, producing or otherwise directly or indirectly bringing the events to pass. This can include causing the events remotely, concurrently, partially, or otherwise as a "cause in fact," whether or not a more immediate cause also exists.

Some descriptions herein refer to a first event or condition having "coincided" with a second event or condition. As used herein, two events or conditions "coincide" if they are spatially coextensive or overlapping (between two devices, e.g.) and if they are roughly contemporaneous (within a few hours, e.g.).

Some descriptions herein refer to an "indication whether" an event has occurred. An indication is "positive" if it indicates that the event has occurred, irrespective of its numerical sign or lack thereof. Whether positive or negative, such indications may be weak (i.e. slightly probative), definitive, or many levels in between. In some cases the "indication" may include a portion that is indeterminate, such as an irrelevant portion of a useful photograph.

With reference now to FIG. 8, shown is an example of a system 8 (network subsystem, e.g.) in which one or more technologies may be implemented. Two or more interface devices 811, 812 owned or operated by user 840 (implementing respective interface devices of FIG. 2, e.g.) are configured to communicate with each other locally or remotely via one or more networks 190, 290, 890 described herein. Interface device 811 (implementing a workstation or other interface device 292 remote from user 840, e.g.) may include one or more instances of inputs 823, outputs 824, search agents 825, or storage modules 828 containing one or more results 361-367 or other data 438 (keywords 829, e.g.) associated with user 840 (with prior search tasks 611-618 initiated by user 840 via interface device 811, e.g.). A handheld 340 or other interface device 812 (implementing article 560, e.g.) may include one or more inputs 863 or outputs 864 accessible by user 840. In various flows described herein (such as those depicted below with reference to FIGS. 17-25), output 864 is configured to present one or more search results 866, metadata 867, or other such data to user 840 in real time, such data having been informed by the keywords 829 or other contents of storage module 828 by virtue of an association between such interface devices 811, 812.

With reference now to FIG. 17, shown is a high-level logic flow 17 of an operational process. Intensive operation 34 describes obtaining a first parameter from a first search task initiated at a first interface device (e.g. intake module 151 retrieving or otherwise receiving one or more topic keywords 829, results 690 of prior searches, or other search-related parameters 381 that have been entered or displayed via one or more remote interface devices 811). This can occur, for example, in a context in which one or more users 840 used an input 823 of interface device 811 to initiate a task 430 (a search initiated via search agent 825, e.g.), in which the intake module(s) 151 reside in interface 812 or network 890, in which interface device 310 includes medium 605; and in which intake module 151 or storage module 828 aggregates such search-related information. Alternatively or additionally, intake module 151 may be configured to retrieve one or more such parameters 381 remotely from a storage module 828 or other medium 605 configured to aggregate such search-related information (within interface device 811 or network 890, e.g.).

In light of teachings herein, numerous existing techniques may be applied for configuring special-purpose circuitry or other structures effective for logging and caching search terms and results as described herein without undue experimentation. See, e.g., U.S. Pat. No. 8,010,736 ("Nonvolatile semiconductor memory device for supporting high speed search in cache memory"); U.S. Pat. No. 8,005,906 ("Contextual mobile local search based on social network vitality information"); U.S. Pat. No. 7,986,843 ("Digital image archiving and retrieval in a mobile device system"); U.S. Pat. No. 7,966,304 ("Enabling searching on abbreviated search terms via messaging"); U.S. Pat. No. 7,917,840 ("Dynamic aggregation and display of contextually relevant content"); U.S. Pat. No. 7,895,230 ("Method of finding a search string in a document for viewing on a mobile communication device"); U.S. Pat. No. 7,840,557 ("Search engine cache control"); U.S. Pat. No. 7,558,922 ("Apparatus and method for quick retrieval of search data by pre-fetching actual data corresponding to search candidate into cache memory"); U.S. Pat. No. 6,711,562 ("Cache sensitive search (CSS) tree indexing system and method").

Extensive operation 71 of flow 17 describes causing a second interface device to indicate the first parameter from the first search task initiated at the first interface device partly based on an association between the second interface device and the first interface device and partly based on a second parameter from the first search task initiated at the first interface device (e.g. statement module 133 causing output device 864 to play or display parameter 381 with other data 438 arising from an instance of task 430). This can occur, for example, in a context in which association module 173 records or otherwise manifests an association 491 among two or more interface devices 310, 811, 812 owned or used by the same person (user 840, e.g.); in which parameter 381 is a search result 866 or metadata 867 arising from one or more search engines 182, 282 performing task 430; in which device 410 implements one or more interface devices 310, 811; in which one or more instances of dialog manager 110 reside in network 890 or interface device 812; and in which the second interface device would otherwise have to obtain the first parameter in some other way (by initiating another performance of task 430, e.g.). In some variants, moreover, query builder 161 also performs operation 71 by retrieving result 866 or metadata 867 (from interface device 811, e.g.) in response to user 840 signaling a search task at input 863. Alternatively or additionally, one or more instances of the "first" parameter may include other informational elements 371-374 as described herein. As exemplified herein, a fingerprint or other element is "informational" if it can be evaluated (as matching or not, e.g.) by comparison with one or more comparands (elements of the same general type, e.g.).

In light of teachings herein, numerous existing techniques may be applied for configuring special-purpose circuitry or other structures effective for implementing search capabilities on a portable device using various search criteria as described herein without undue experimentation. See, e.g., U.S. Pat. No. 8,005,906 ("Contextual mobile local search based on social network vitality information"); U.S. Pat. No. 7,945,546 ("Local search and mapping for mobile devices"); U.S. Pat. No. 7,921,154 ("System and method of live data search on a mobile device"); U.S. Pat. No. 7,873,620 ("Desktop search from mobile device"); U.S. Pat. No. 7,873,356 ("Search interface for mobile devices"); U.S. Pat. No. 7,865,187 ("Managing sponsored content based on usage history"); U.S. Pat. No. 7,865,181 ("Searching for mobile content"); U.S. Pat. No. 7,617,192 ("Method and system for capability content search with mobile computing devices"); U.S. Pat. No. 7,565,139 ("Image-based search engine for mobile phones with camera"); U.S. Pat. No. 7,515,942 ("Method and device for telephone number search in a mobile terminal"); U.S. Pat. No. 6,983,310 ("System and method for providing search capabilities on a wireless device").

Figure 9:
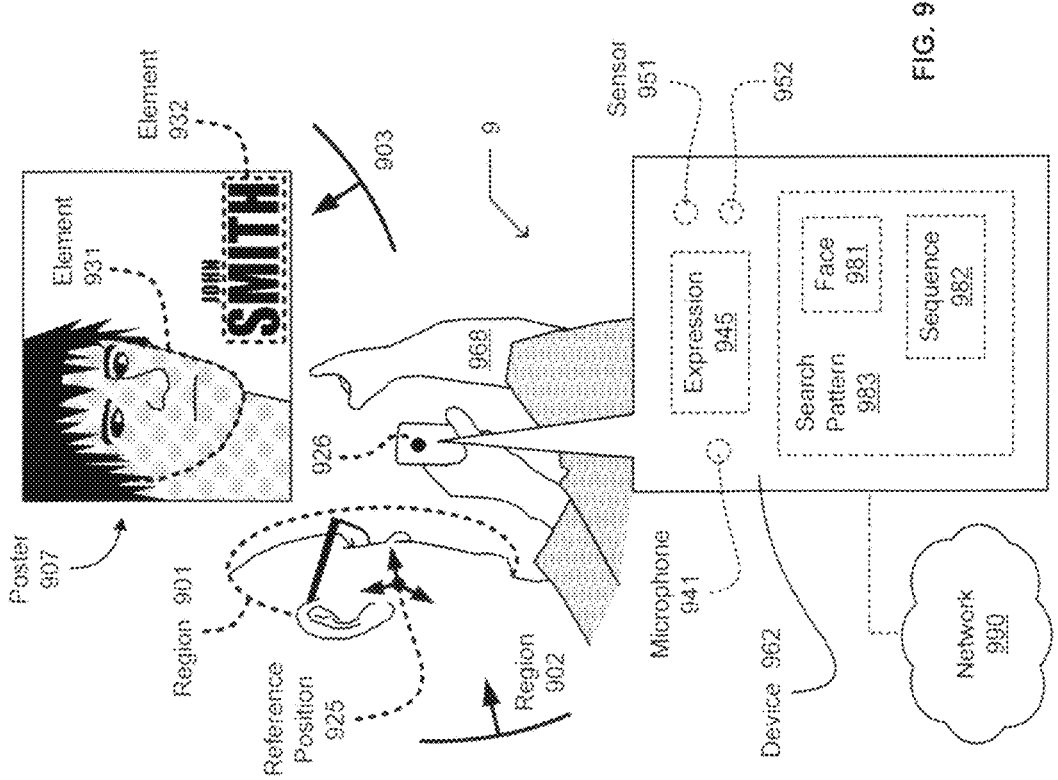
FIGS. 9-12 depict exemplary environments featuring one or more devices that may facilitate a search partly based on a position of a person's limb.

With reference now to FIG. 9, shown is an example of a system 9 (network subsystem, e.g.) in which one or more technologies may be implemented. Device 962 implements one or more interface devices as depicted above, also being configured to permit a user (depicted in FIG. 2, e.g.) to carry or otherwise support the device 962 while extending one or more of his fingers or arms 968 into a region where it can be detected (optically, e.g.) by the device 962. Moreover the user can effectively use one or more such limbs (fingers or hands, e.g.) to indicate a three-dimensional region 903 containing one or more elements 931, 932 of interest to the user (on a poster 907 within sight of the user's facial region 901, e.g.). In some implementations device 962 also includes one or more microphones 941 or other sensors 951, 952 operable to capture one or more expressions 945 (in sounds in region 902, e.g.). Alternatively or additionally, one or more networks 190, 290, 990 are operably coupled with device 962 so that a face 981, character sequence 982, or other search pattern 983 (expressed digitally, e.g.) can be downloaded or recognized (e.g. in optical data from one or more sensors 951, 952). In some contexts, as described below, this permits one or more modules described herein (implementing one or more instances of dialog manager 110 in device 962 or network 990, e.g.) to estimate a location of one or more regions, limbs, visible elements, or other such entities relative to one or more reference positions 925, 926.

Figure 18:
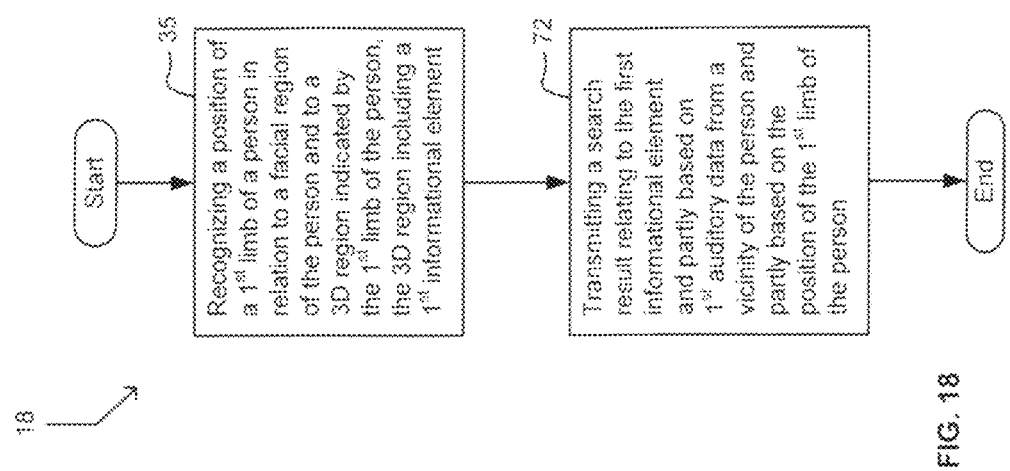
FIG. 18 depicts a high-level logic flow of an operational process described with reference to FIG. 9.

With reference now to FIG. 18, shown is a high-level logic flow 18 of an operational process. Intensive operation 35 describes recognizing a position of a first limb of a person in relation to a facial region of the person and to a three-dimensional region indicated by the first limb of the person, the three-dimensional region including a first informational element (e.g. estimation module 451 assigning two or more coordinates 461, 462 signaling a location of the person's finger, hand, or arm 968 in relation to a stationary or other frame of reference that can also signal respective locations of a facial region 901 of the person and a 3D region 903 that includes one or more informational elements 931, 932). This can occur, for example, in a context in which network 990 includes device 410; in which device 460 implements device 962; in which the person is user 260; in which the 3D region 903 is farther than the arm 968 (in relation to the facial region 901 of the person); and in which estimation module 451 uses standard positioning coordinates (GPS with altitude, e.g.) or some other frame of reference in relation to which facial region 901 and 3D region 903 can be mathematically expressed. In some variants, for example, a handheld device 962 may include a first optical sensor 951 configured to capture first optical data 641 (image 621, e.g.) positionally related to one or more reference positions 925, 926 (located in device 962 or facial region 901 or some other frame of reference, e.g.) and a second optical sensor 952 configured to capture second optical data 642 (image 622, e.g.) positionally related to the same reference position(s) 925, 926 contemporaneously therewith (within a few seconds, e.g.). This can occur, for example, in a context in which "first" optical data 641 indicates an approximate position of the facial region 901 of the person (in relation to device 962, e.g.) and in which "second" optical data 642 indicates an approximate position of one or more elements 931, 932 in a 3D region toward which the person gestures (with a finger or arm 968, e.g.). In some variants, such an estimation module can be configured to perform operation 35 using optical data 643 (image 623, e.g.) obtained from only a single optical sensor 952. This can occur, for example, in a context in which device 962 is configured to be worn or held in facial region 901, establishing a reference position in the facial region. More generally, a limb position is known "in relation to" another entity (an item or region, e.g.) if each is assigned a specific location (expressed in coordinates or a natural language expression, e.g.) in a frame of reference common to both.

In light of teachings herein, numerous existing techniques may be applied for configuring special-purpose circuitry or other structures effective for determining how one or more portions of a person's body are positioned as described herein without undue experimentation. See, e.g., U.S. Pat. No. 7,978,084 ("Body position monitoring system"); U.S. Pat. No. 7,949,089 ("Apparatus and method for tracking feature's position in human body"); U.S. Pat. No. 7,934,267 ("Articles of apparel providing enhanced body position feedback"); U.S. Pat. No. 7,916,066 ("Method and apparatus for a body position monitor and fall detector using radar"); U.S. Pat. No. 7,889,913 ("Automatic compositing of 3D objects in a still frame or series of frames"); U.S. Pat. No. 7,630,806 ("System and method for detecting and protecting pedestrians"); U.S. Pat. No. 7,029,031 ("Method and device for detecting the position and the posture of a human body"); U.S. Pat. No. 6,692,449 ("Methods and system for assessing limb position sense during movement").

Extensive operation 72 describes transmitting a search result relating to the first informational element and partly based on first auditory data from a vicinity of the person and partly based on the position of the first limb of the person in relation to the facial region of the person and to the three-dimensional region indicated by the first limb of the person (e.g. statement module 423 transmitting a result 690 of a search task 616 resulting from a search pattern 983 that includes a face 981 or character sequence 982 obtained from visible elements 931, 932 of the user's environment in response to auditory data 656 from the same environment and to the region 903 indicated by the finger, hand, or arm 968). This can occur, for example, in a context in which the user's vicinity (region 902, e.g.) defines "the environment," in which auditory data 656 and one or more visible elements 931, 932 are both captured (respectively via microphone 941 and optical sensor 951, e.g.) in the same device 962; in which the indicated region 903 or auditory data 656 may each trigger an exclusion or inclusion of one or more candidate elements; and in which search pattern 983 would otherwise have to be constructed by a more laborious process. In some contexts, for example, auditory data 656 may include a corroboratory expression 945 relating to one element (e.g. an utterance of "face" or "Smith" or "guy" or "who"). Alternatively or additionally, in some contexts, auditory data 656 may include timing data 781 signaling that an audible event was detected while the user 260 apparently looked at the "first" informational element.

In light of teachings herein, numerous existing techniques may be applied for configuring special-purpose circuitry or other structures effective for comparing a face or other informational element with a database of similar items as described herein without undue experimentation. See, e.g., U.S. Pat. No. 8,000,528 ("Method and apparatus for authenticating printed documents using multi-level image comparison based on document characteristics"); U.S. Pat. No. 7,949,191 ("Method and system for searching for information on a network in response to an image query sent by a user from a mobile communications device"); U.S. Pat. No. 7,908,518 ("Method, system and computer program product for failure analysis implementing automated comparison of multiple reference models"); U.S. Pat. No. 7,856,137 ("Apparatus and method for verifying image by comparison with template image"); U.S. Pat. No. 7,831,559 ("Concept-based trends and exceptions tracking"); U.S. Pat. No. 7,787,693 ("Text detection on mobile communications devices"); U.S. Pat. No. 7,644,055 ("Rule-based database object matching with comparison certainty"); U.S. Pat. No. 7,443,787 ("Cluster system, cluster member, and failure recovery method and program thereof"); U.S. Pat. No. 6,424,729 ("Optical fingerprint security verification using separate target and reference planes and a uniqueness comparison scheme"); U.S. Pat. No. 6,167,398 ("Information retrieval system and method that generates weighted comparison results to analyze the degree of dissimilarity between a reference corpus and a candidate document"); U.S. Pat. No. 6,134,014 ("Apparatus and method of inspecting phase shift masks using comparison of a mask die image to the mask image database").

Figure 10:
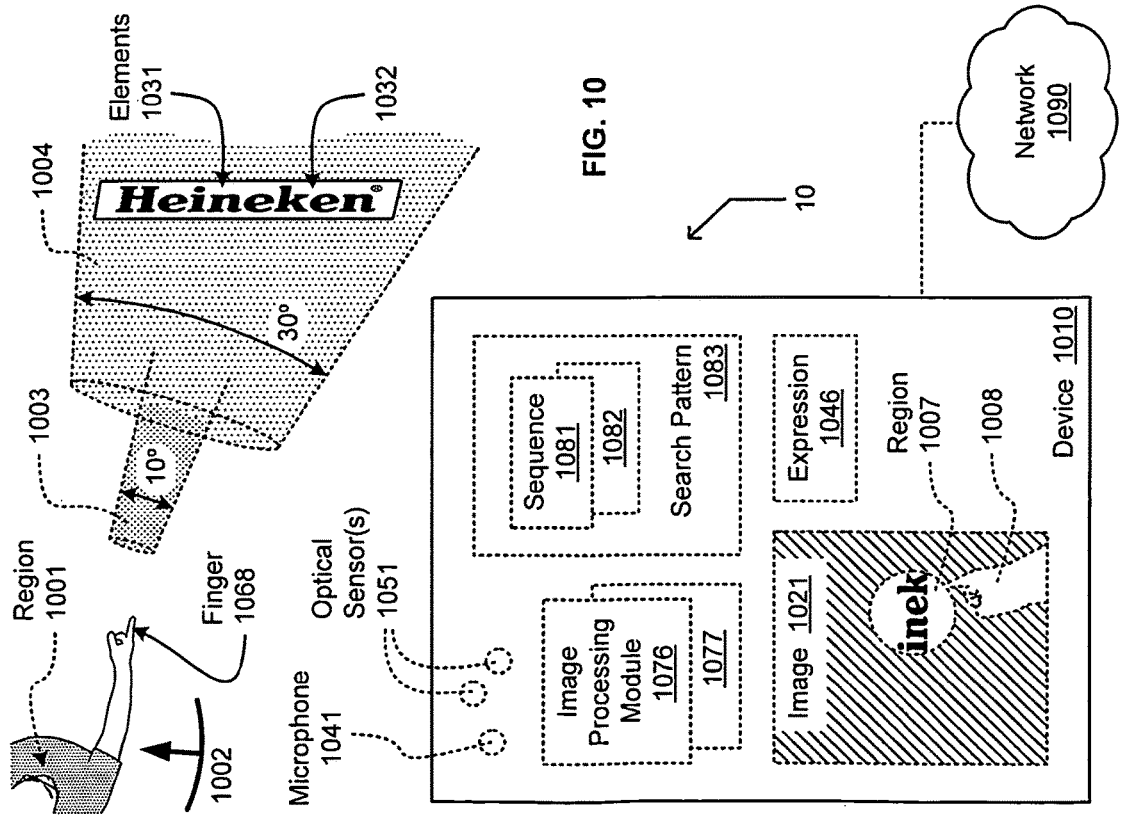

With reference now to FIG. 10, shown is an example of a system 10 (network subsystem, e.g.) in which one or more technologies may be implemented. Device 1010 implements one or more interface devices as depicted above, also being configured to detect one or more hands or fingers 1068 of a user (depicted in FIG. 2, e.g.) extending in or into a region where it can be detected by the device 1010 and to observe a vicinity of the user (region 1002, e.g.). This can occur, for example, in a context in which device 1010 comprises a handheld 340, goggles 551, or other such article 560 configured to be positioned within the user's facial region 1001 (having a viewfinder, e.g.) without needing to be supported with two hands. This may leave one or more limbs free, for example, to indicate one or more three-dimensional regions 1003, 1004 containing one or more elements 1031, 1032 of interest to the user in a manner that can be detected or corroborated (via one or more microphones 1041 or optical sensors 1051, e.g.) as described herein. In some contexts, moreover, device 1010 or network 1090 may include one or more image processing modules 1076, 1077 or other modules (implementing dialog manager 110, e.g.) configured to process one or more regions 1007, 1008 of an image 1021; sequences 1081, 1082 comprising a search pattern 1083; or other such expressions 1046 as described below.

Figure 19:
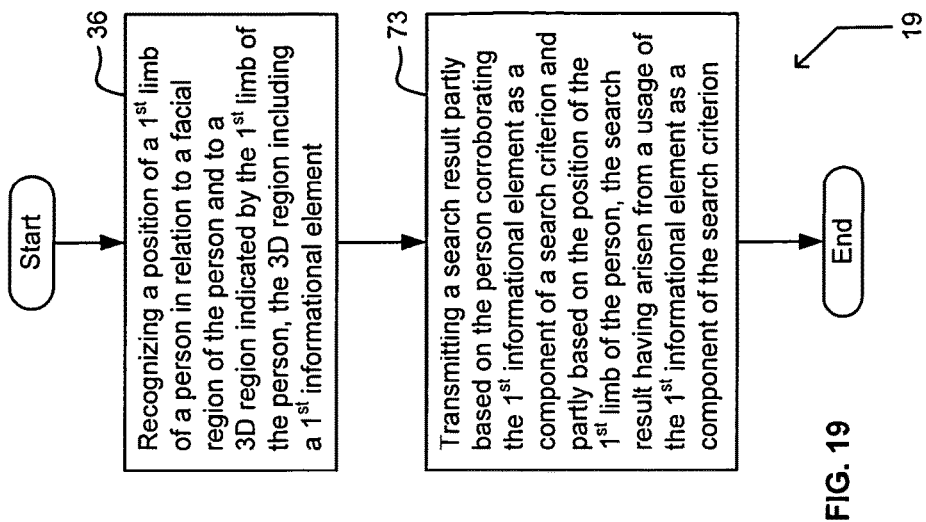
FIG. 19 depicts a high-level logic flow of an operational process described with reference to FIG. 10.

With reference now to FIG. 19, shown is a high-level logic flow 19 of an operational process. Intensive operation 36 describes recognizing a position of a first limb of a person in relation to a facial region of the person and to a three-dimensional region indicated by the first limb of the person, the three-dimensional region including a first informational element (e.g. image processing module 1076 recognizing a region 1008 of image 1021 depicting a position of a finger 1068, arm, or other limb in relation to another region 1007 of image 1021 that effectively defines a three dimensional region 1003 indicated by the limb). This can occur, for example, in a context in which region 1003 includes several informational elements (four letters and the character sequence "inek," e.g.), in which image 1021 is captured via one or more optical sensors 1051 positioned in facial region 1001 (on glasses, e.g.) or in a position to capture a high-resolution reflection from facial region 1001 (by imaging an eye or eyeglass lens in region 1001, e.g.); and in which image 1021 directly or indirectly depicts region 1003 and other image components "in relation to a facial region" by having been captured from the such sensor(s). In some variants, for example, the three-dimensional region 1003 substantially comprises a conic section (up to 10 degrees wide, as shown) extending (rightward, as shown) into space and positioned farther than the first limb of the person to the facial region 1001 of the person (apart from the limb as shown, e.g.). Moreover if an informational element ("i" or "k," e.g.) extends too near an edge of the visual field (within the outermost 3-5% of region 1007, e.g.), in some contexts, an image processing module 1077 configured to process a larger visual field (depicting a region 1004 up to 30 degrees wide, e.g.) may be invoked. This can occur, for example, in a context in which an effective search for a lesser sequence 1081 or other symbol (the character sequence "inek," e.g.) would consume more resources than an effective search for a more complete sequence 1082 (the proper noun "Heineken," e.g.) such as where an alternate mode of search ("whole word," e.g.) would become effective.

In light of teachings herein, numerous existing techniques may be applied for configuring special-purpose circuitry or other structures effective for recognizing faces or other three-dimensional structures as described herein without undue experimentation. See, e.g., U.S. Pat. No. 7,925,058 ("Iris recognition system and method using multifocus image sequence"); U.S. Pat. No. 7,873,189 ("Face recognition by dividing an image and evaluating a similarity vector with a support vector machine"); U.S. Pat. No. 7,860,281 ("Method for the automatic recognition of an object in an image"); U.S. Pat. No. 7,778,483 ("Digital image processing method having an exposure correction based on recognition of areas corresponding to the skin of the photographed subject"); U.S. Pat. No. 7,706,068 ("Image three-dimensional recognition apparatus"); U.S. Pat. No. 7,664,339 ("Image processing method for object recognition and dynamic scene understanding"); U.S. Pat. No. 7,345,574 ("Image recognition facilitated movable barrier operations method and apparatus"); U.S. Pat. No. 7,239,275 ("Methods and systems for tracking signals with diverse polarization properties"); U.S. Pat. No. 7,092,566 ("Object recognition system and process for identifying people and objects in an image of a scene"); U.S. Pat. No. 7,062,073 ("Animated toy utilizing artificial intelligence and facial image recognition"); U.S. Pat. No. 6,831,993 ("Vehicle security systems and methods employing facial recognition using a reflected image").

Extensive operation 73 describes transmitting a search result partly based on the person corroborating the first informational element as a component of a search criterion and partly based on the position of the first limb of the person in relation to the facial region of the person and to the three-dimensional region indicated by the first limb of the person, the search result having arisen from a usage of the first informational element as a component of the search criterion (e.g. statement module 131 transmitting a search result 721 from search engine 182 to user 230 in response to user 230 signaling an acceptance of "inek" or "Heinekin" and to search engine 182 generating such a search result 721). This can occur, for example, in a context in which image processing module 1076 performs operation 36 as described above; in which user 230 corroborates the first informational element 371 by accepting the search criterion 117 (a search pattern 1083 that includes a character sequence 1081, 1082 that is then passed to search engine 182, e.g.); in which one or more interface devices 310, 1010 comprise dialog manager 110; and in which user 230 would otherwise have to refine or recall an expression of the search criterion 117. Alternatively or additionally, user 230 may manifest such corroboration by invoking a control or by responding to one or more user prompts (in response to a prompt 701 like "press or say 'one' to commence the search," e.g.).

In light of teachings herein, numerous existing techniques may be applied for configuring special-purpose circuitry or other structures effective for querying a user and recognizing a reply as described herein without undue experimentation. See, e.g., U.S. Pat. No. 8,041,570 ("Dialogue management using scripts"); U.S. Pat. No. 8,015,006 ("Systems and methods for processing natural language speech utterances with context-specific domain agents"); U.S. Pat. No. 8,005,263 ("Hand sign recognition using label assignment"); U.S. Pat. No. 7,996,519 ("Detecting content and user response to content"); U.S. Pat. No. 7,983,611 ("Mobile device that presents interactive media and processes user response"); U.S. Pat. No. 7,912,201 ("Directory assistance dialog with configuration switches to switch from automated speech recognition to operator-assisted dialog"); U.S. Pat. No. 7,778,816 ("Method and system for applying input mode bias"); U.S. Pat. No. 7,415,414 ("Systems and methods for determining and using interaction models"); U.S. Pat. No. 7,346,555 ("Method and apparatus for client-in-charge business transaction processing"); U.S. Pat. No. 7,313,515 ("Systems and methods for detecting entailment and contradiction").

Figure 11:
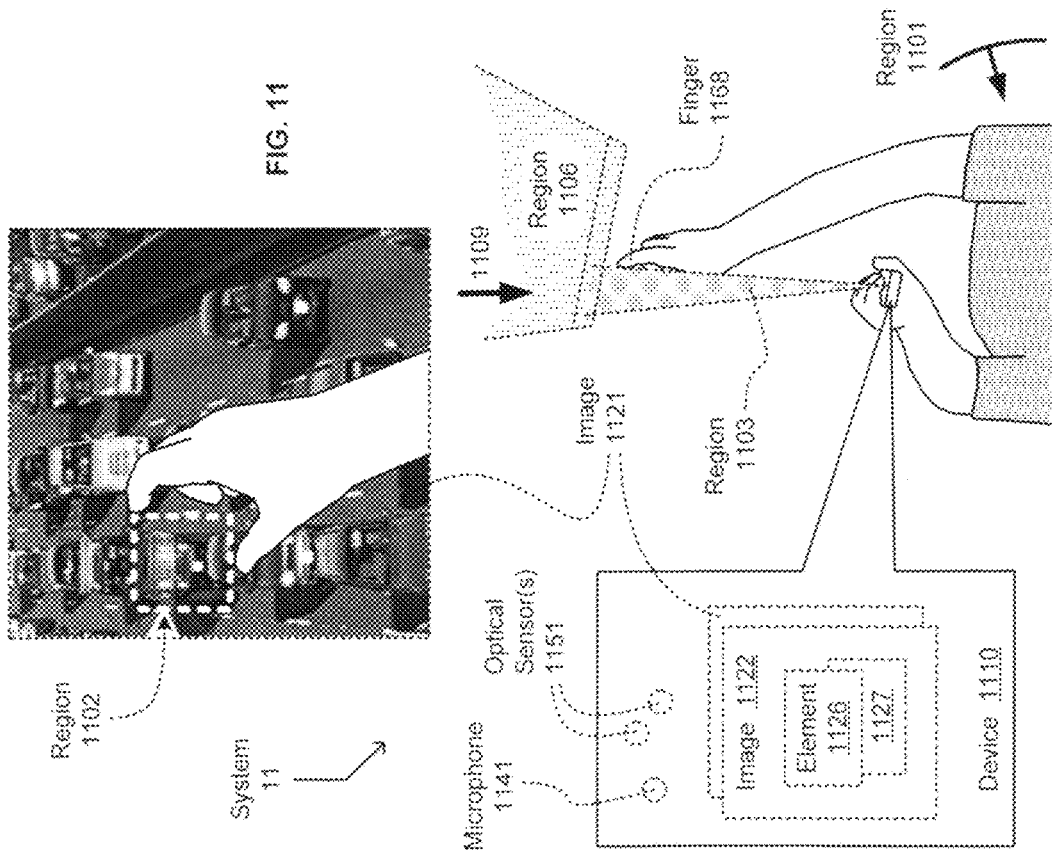

With reference now to FIG. 11, shown is an example of a system 11 (network subsystem, e.g.) in which one or more technologies may be implemented. Device 1110 implements one or more interface devices as depicted above, also being configured to detect one or more hands or fingers 1168 of a user (depicted in FIG. 2, e.g.) extending in, into, or toward a region 1103, 1106 so that it can be detected via one or more optical sensors 1151 of the device 1110 as indicating such a region. As shown, energy 1109 passes through such regions 1103, 1106 so that a vehicle or other entity therein may be depicted and recognized. In some contexts, such a three-dimensional region 1103 may be defined as an elongate space depicted by a (rectangular or other) two-dimensional region 1102 of one or more images 1121, 1122 (digital photographs, e.g.). This can occur, for example, in a context in which device 1110 is configured so that one or more informational elements 1126, 1127 (words or other character sequences, e.g.) are visible within a region 1102 that is highlighted in an image 1121 (by a dashed white outline or other brightness modulation, e.g.) as depicted in real time on a display 672 visible to the user. Moreover a two-dimensional region 1102 that defines the three-dimensional region 1103 may be a function of two or more limbs (a thumb and forefinger, e.g.) in some variants, so that a highlighted selection region 1102 may effectively be manipulated (in size, position, or aspect ratio, e.g.) by subtle movements of the user's limbs. Alternatively or additionally, one or more microphones 1141 may be configured to detect auditory data 656-658 in a vicinity of the user (region 1101, e.g.).

Figure 20:
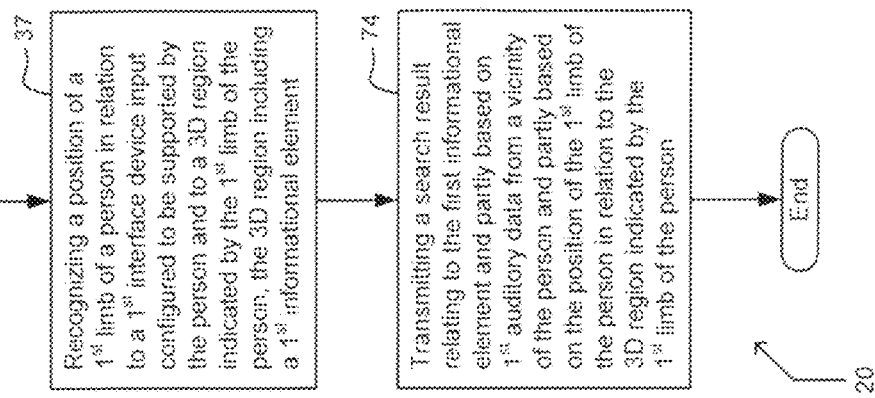
FIG. 20 depicts a high-level logic flow of an operational process described with reference to FIG. 11.

With reference now to FIG. 20, shown is a high-level logic flow 20 of an operational process. Intensive operation 37 describes recognizing a position of a first limb of a person in relation to a first interface device input configured to be supported by the person and to a three-dimensional region indicated by the first limb of the person, the three-dimensional region including a first informational element (e.g. image processing module 144 recognizing a leftmost position of finger 1168 of user 220 in an image 1121 obtained via one or more optical sensors 1151 of an interface device 1110 held by user 220). This can occur, for example, in a context in which image 1121 expresses the position of the finger 1168 and right thumb of user 220 in relation to a three-dimensional region 1106 toward which the finger 1168 is generally signaling (as are the right thumb and arm of user 220 as shown in image 1102, e.g.); in which region 1106 is a cropped rectangular pyramid (having C4v symmetry, e.g.) farther than the first limb to the first interface device and extending (upward, as shown) into space; in which region 1106 includes a first informational element 1126 (a vehicle or its appearance, e.g.); and in which device 1110 includes a display 672 via which user 220 can observe a variant of image 1121 highlighting a portion thereof (with a dashed white square, e.g.). In some contexts, for example, energy 1109 from a vehicle may contain one or more informational elements 1127 (a grill or headlight shape, logo, or character sequence, e.g.) that might later be recognized from one or more images 1121, 1122 of the vehicle.

In a context in which operation 37 has been performed in relation to an initial region, moreover, an image processing module 144 may (optionally) include another instance of image processing module 144. The latter instance may be configured to recognize a position of finger 1168 and right thumb in relation to a region 1103 defined by a position of a two-dimensional region 1102 (as a virtual or real rectangular pyramid extending upward as shown from an apex at the optical sensor, e.g.), the two-dimensional region 1102 being manipulable (in size and position, e.g.) by repositioning a finger 1168 and right thumb of user 220. This can occur, for example, in a context in which the "first" informational element of this latter instance of operation 37 may be the license plate number (character sequence, e.g.) visible within the two-dimensional region 1102 indicated by the finger 1168 and right thumb and in which capturing and processing all device-detectable elements in a wider image 1121 would require excessive amounts of storage space or processing time.

In light of teachings herein, numerous existing techniques may be applied for configuring special-purpose circuitry or other structures effective for modeling a position of a human subject relative to other objects as described herein without undue experimentation. See, e.g., U.S. Pat. No. 8,007,110 ("Projector system employing depth perception to detect speaker position and gestures"); U.S. Pat. No. 7,770,209 ("Method and system to detect human interaction with a computer"); U.S. Pat. No. 7,733,233 ("Methods and systems for monitoring position and movement of human beings"); U.S. Pat. No. 7,567,200 ("Method and apparatus for body position monitor and fall detect ion using radar"); U.S. Pat. No. 7,029,031 ("Method and device for detecting the position and the posture of a human body"); U.S. Pat. No. 6,252,506 ("Device for finding a position of a human").

Extensive operation 74 describes transmitting a search result relating to the first informational element and partly based on first auditory data from a vicinity of the person and partly based on the position of the first limb of the person in relation to the three-dimensional region indicated by the first limb of the person (e.g. statement module 136 transmitting a search result 362 relating to one or more elements 374, 1127 indicated by finger 1168 and selected or processed in response one or more parameters 382 received via microphone 1141 as auditory data 657, 658). This can occur, for example, in a context in which auditory data 657 includes one or more utterances manifesting a search criterion 334 (e.g. "license plate"); in which a position or movement of a finger 1168 or arm of user 220 defines a selection region containing one or more of the elements 374, 1127 (2D region 1102 or 3D region 1103, e.g.); in which interface device 310 implements dialog manager 110 and device 1110; in which the search result 362 manifests an execution of a search task 611 using at least these parameters (e.g. on search engine 182 with a search term like <<'LICENSE PLATE' and 'WAS HIS'>>); and in which such specific element selection would otherwise require significantly more user interaction. In some variants, for example, statement module 136 may cause one or more devices 222, 1110 assigned to user 220 to display an owner's name or other registration information associated with that license plate. As exemplified herein, a "search term" is generally a term of art that identifies a character sequence, phrase, or pattern match expression usable in a boolean search or weighted search.

In light of teachings herein, numerous existing techniques may be applied for configuring special-purpose circuitry or other structures effective for recognizing voiced and other auditory signals as described herein, or an absence thereof, without undue experimentation. See, e.g., U.S. Pat. No. 8,036,735 ("System for evaluating performance of an implantable medical device"); U.S. Pat. No. 8,014,562 ("Signal processing of audio and video data, including deriving identifying information"); U.S. Pat. No. 8,005,672 ("Circuit arrangement and method for detecting and improving a speech component in an audio signal"); U.S. Pat. No.

7,957,966 ("Apparatus, method, and program for sound quality correction based on identification of a speech signal and a music signal from an input audio signal"); U.S. Pat. No. 7,899,677 ("Adapting masking thresholds for encoding a low frequency transient signal in audio data"); U.S. Pat. No. 7,856,289 ("Method and apparatus for conserving power consumed by a vending machine utilizing audio signal detection"); U.S. Pat. No. 7,809,559 ("Method and apparatus for removing from an audio signal periodic noise pulses representable as signals combined by convolution"); U.S. Pat. No. 7,580,832 ("Apparatus and method for robust classification of audio signals, and method for establishing and operating an audio-signal database, as well as computer program"); U.S. Pat. No. 7,557,728 ("Using audio to detect changes to the performance of an application").

Figure 12:
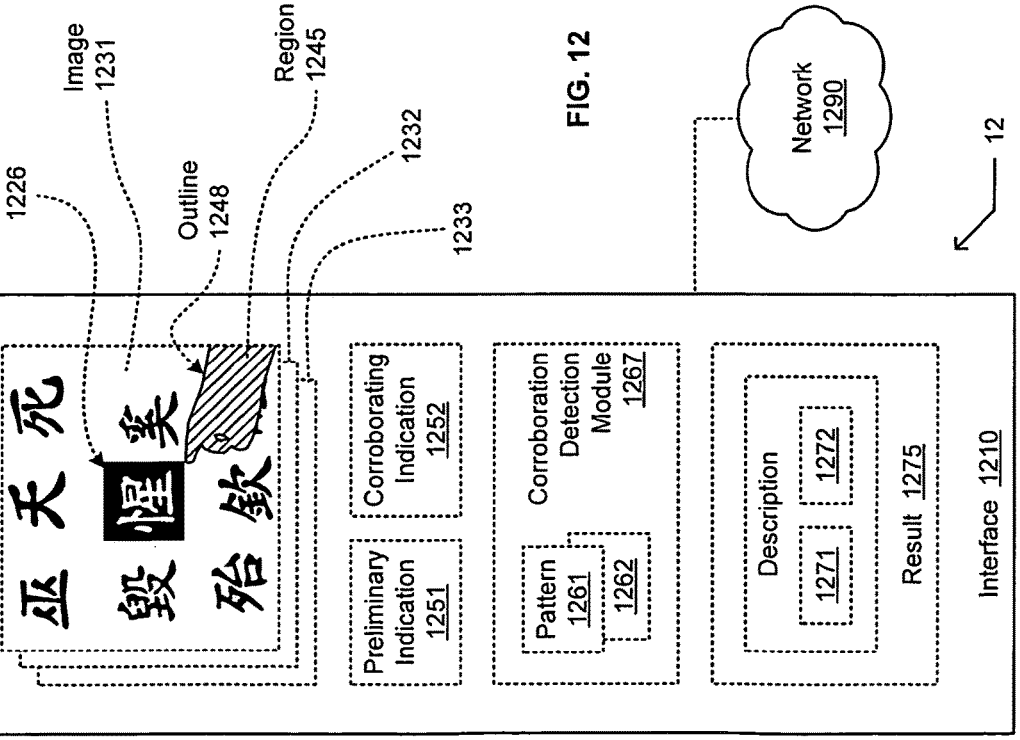

With reference now to FIG. 12, shown is an example of a system 12 (network subsystem, e.g.) in which one or more technologies may be implemented. One or more interface devices as depicted above may implement interface 1210, also being operably coupled with one or more networks 190, 290, 1290 as described above. Interface 1210 may include one or more media 605, 705 bearing raw or processed images 1231, 1232, 1233, which may depict one or more elements 1226 of interest to a user (shown in FIG. 2, e.g.) whose appendage is depicted in a region 1245 having a device-detectable or highlighted outline 1248. Such media may likewise include one or more instances of preliminary indications 1251, corroborating indications 1252, components 1271, 1272 of description, or other results 1275 as described below. Interface 1210 may further include one or more instances of a corroboration detection module 1267 configured to detect one or more patterns 1261, 1262 (in optical data 641-643, auditory data 656-658, or other input 543-548, e.g.) selectively indicative of events signaling a user corroborating a preliminary indication 1251.

Figure 21:
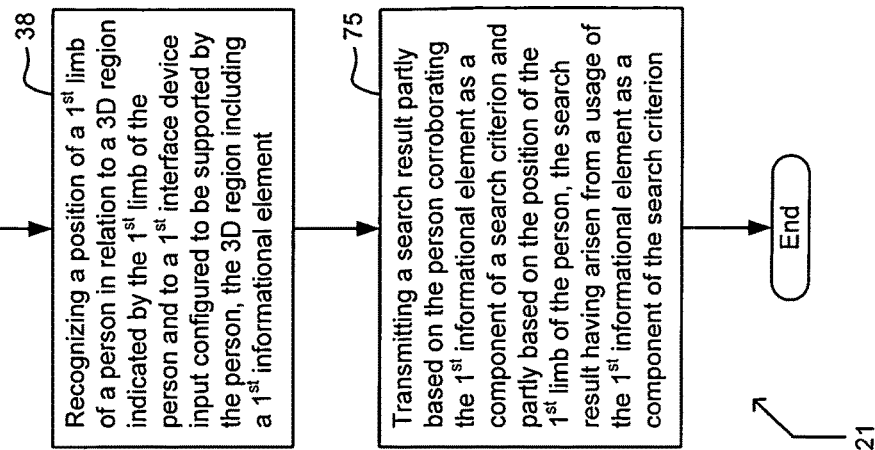
FIG. 21 depicts a high-level logic flow of an operational process described with reference to FIG. 12.

With reference now to FIG. 21, shown is a high-level logic flow 21 of an operational process. Intensive operation 38 describes recognizing a position of a first limb of a person in relation to a three-dimensional region indicated by the first limb of the person and to a first interface device input configured to be supported by the person, the three-dimensional region including a first informational element (e.g. image processing module 143 recognizing a limb depicted in a photograph or other image 626 captured by an input 544 of interface device 241). This can occur, for example, in a context in which the limb (a hand, e.g.) belongs to a user 240 who is carrying or wearing the interface device (a handheld phone or camera, goggles 551, a helmet 552, or laptop computer 553, e.g.); in which the limb indicates one or more 3-dimensional regions 903, 1003, 1103 (as contrasted with indicating only a 2-dimensional screen display, e.g.); in which input 544 includes a charge-coupled device 578 or other sensor array 579 configured to capture image 626; in which the 3-dimensional region contains one or more visible elements 1126, 1226 (a pictograph, symbol sequence, structure, or facial image, e.g.); and in which one or more interface devices as described herein include interface 1210 and dialog manager 110. In some variants, for example, image processing module 143 can recognize a region 1245 of image 626 representative of a limb of user 240 by detecting a boundary (at outline 1248, e.g.) between a skin tone and other colors so that region 1245 or outline 1248 can be depicted vividly (highlighted in magenta on black and white, e.g.) in a displayed screen state (an image 1231 displayed to a user 240 of device 241, e.g.). Alternatively or additionally, the screen state may display other optical data 643 (so that region 1245 is replaced in the image with an earlier-obtained component image of the region not occluded by the hand, for example, so that the limb appears transparent, e.g.).

In light of teachings herein, numerous existing techniques may be applied for configuring special-purpose circuitry or other structures effective for recognizing ideographs, textual expressions, and other linguistic content as described herein without undue experimentation. See, e.g., U.S. Pat. No. 8,009,914 ("Handwritten character recognition"); U.S. Pat. No. 7,974,843 ("Operating method for an automated language recognizer intended for the speaker-independent language recognition of words in different languages and automated language recognizer"); U.S. Pat. No. 7,865,355 ("Fast text character set recognition"); U.S. Pat. No. 7,865,018 ("Personalized implicit and explicit character shape adaptation and recognition"); U.S. Pat. No. 7,853,445 ("Method and system for the automatic recognition of deceptive language"); U.S. Pat. No. 7,805,004 ("Radical set determination for HMM based east asian character recognition"); U.S. Pat. No. 7,729,534 ("Image-processing device and image-processing method for extracting a recognition-target area including a character from a target image"); U.S. Pat. No. 7,689,404 ("Method of multilingual speech recognition by reduction to single-language recognizer engine components"); U.S. Pat. No. 7,403,656 ("Method and apparatus for recognition of character string in scene image"); U.S. Pat. No. 6,968,083 ("Pen-based handwritten character recognition and storage system").

Extensive operation 75 describes transmitting a search result partly based on the person corroborating the first informational element as a component of a search criterion and partly based on the position of the first limb of the person in relation to the three-dimensional region indicated by the first limb of the person and to the first interface device input configured to be supported by the person, the search result having arisen from a usage of the first informational element as a component of the search criterion (e.g. statement module 135 transmitting one or more components 1271, 1272 of a description or other search result 1275 in response to a preliminary indication 1251 of the user's intention to select one or more elements 1226 and in response to a corroborating indication 1252 confirming that preliminary indication). This can occur, for example, in a context in which the position of the first limb of user 240 (in relation to the region and input, e.g.) as detected by image processing module 143 serves as the preliminary indication 1251; in which corroboration detection module 1267 signals the corroborating indication 1252 selectively upon a detection of one or more key press events 514, spoken confirmation events 513, gestures, or other such patterns 1261, 1262; in which medium 605 resides in one or more networks 190, 280, 490 890, 1090, 1290 described above; and in which such element designation would otherwise necessitate the use of a stylus, mouse, or other more cumbersome pointing device. In one such pattern 1261, for example, user 240 can validate an intended search criterion 435 or element 1226 by pressing a key 542 or touchscreen zone 541 that depicts "go" or "search" or a symbol to that effect (a magnifying glass, e.g.) while such criterion or element is displayed or highlighted. Alternatively or additionally, one or more search engines 182, 282 or statement modules 135 may be configured to respond to one or more other confirmatory patterns 1262 indicating the user's intent to transmit a search result 1275 as described herein. As exemplified herein, a "search engine" is generally a term of art describing a device-executable program that searches documents or other data for search terms or other instances matching one or more a priori criteria.

In light of teachings herein, numerous existing techniques may be applied for configuring special-purpose circuitry or other structures effective for detecting key press events or spoken or other confirmations, or other such manifestations of user input as described herein without undue experimentation. See, e.g., U.S. Pat. No. 8,009,193 ("Unusual event detection via collaborative video mining"); U.S. Pat. No. 7,973,767 ("Manual pointing device for a computer system with inertial click-event detection and corresponding click-event detection method"); U.S. Pat. No. 7,924,271 ("Detecting gestures on multi-event sensitive devices"); U.S. Pat. No. 7,844,048 ("Selective tone event detector and method therefor"); U.S. Pat. No. 7,819,823 ("System and method for detecting the onset of an obstructive sleep apnea event"); U.S. Pat. No. 7,818,729 ("Automated safe secure techniques for eliminating undefined behavior in computer software"); U.S. Pat. No. 7,796,029 ("Event detection system using electronic tracking devices and video devices"); U.S. Pat. No. 7,713,213 ("Physiological event detection systems and methods"); U.S. Pat. No. 7,369,680 ("Method and apparatus for detecting an event based on patterns of behavior"); U.S. Pat. No. 6,201,476 ("Device for monitoring the activity of a person and/or detecting a fall, in particular with a view to providing help in the event of an incident hazardous to life or limb").

Figure 13:
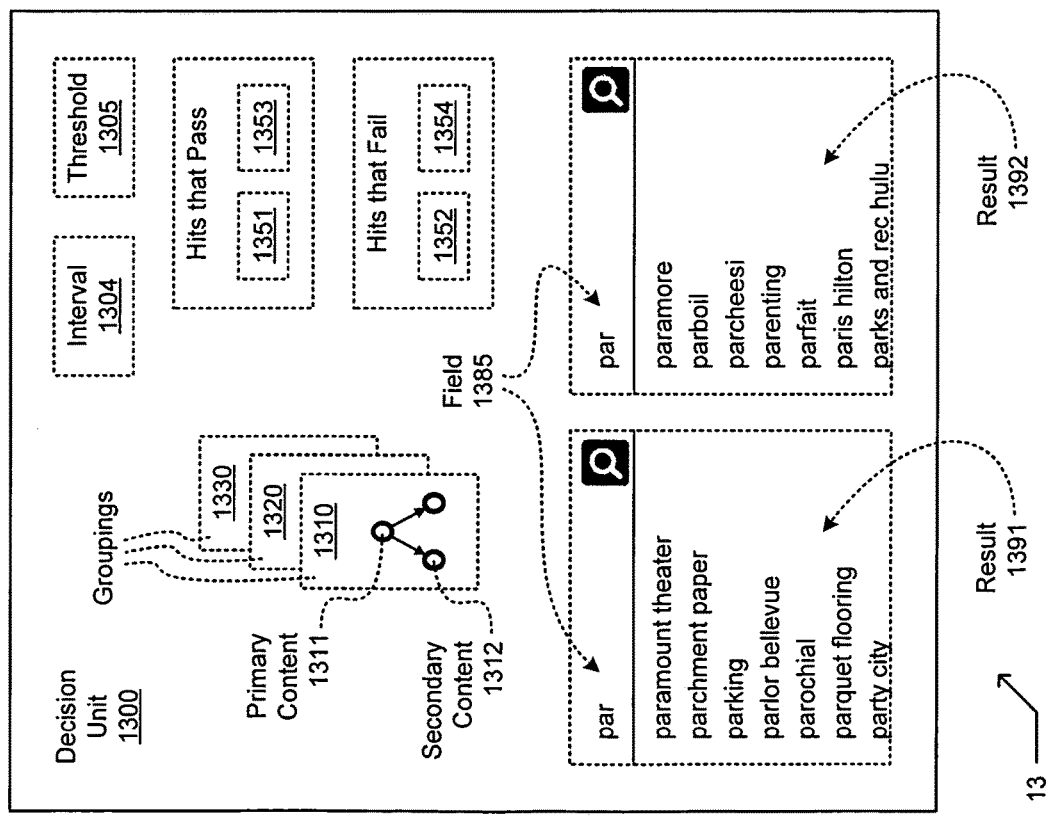
FIG. 13 depicts an exemplary environment featuring a device that may facilitate a search partly based its movement status.

With reference now to FIG. 13, shown is an example of a system 13 (network subsystem, e.g.) in which one or more technologies may be implemented. One or more interface devices implementing dialog manager 110 may, for example, include or otherwise interact with decision unit 1300. In some contexts, for example, decision unit 1300 may include one or more media 605, 705 bearing one or more intervals 1304 or thresholds 1305 (expressed digitally, e.g.) as well as one or more content groupings 1310, 1320, 1330 (comprising primary content 1311 and optionally comprising secondary content 1312, e.g.). In some contexts, for example, content comprising results from one or more search engines 182, 282 may undergo supplemental filtering designating components thereof as one or more hits that pass 1351, 1353 or one or more hits that fail 1352, 1354. This can occur, for example, in a context in which a preliminary or primary search operation (e.g. at search engine 182, 282) applies one or more search criteria 331-336 satisfied by one or more results 361-367; in which a "hit" is defined as a content item passing such criteria initially; and in which some such hits may subsequently pass or fail secondary or supplemental content filtering as described below. In respective contexts, a search term (e.g. "par") that a user keys into a field 1385 via a mobile interface device 310 may trigger an anticipatory search task, for example, that will yield either a first result 1391 or a second result 1392 as a binary response that depends upon a movement status identifier 109 associated with the mobile interface device 310 (having been provided to decision unit 1300 with a search request or in response to a query, e.g.).

Figure 22:
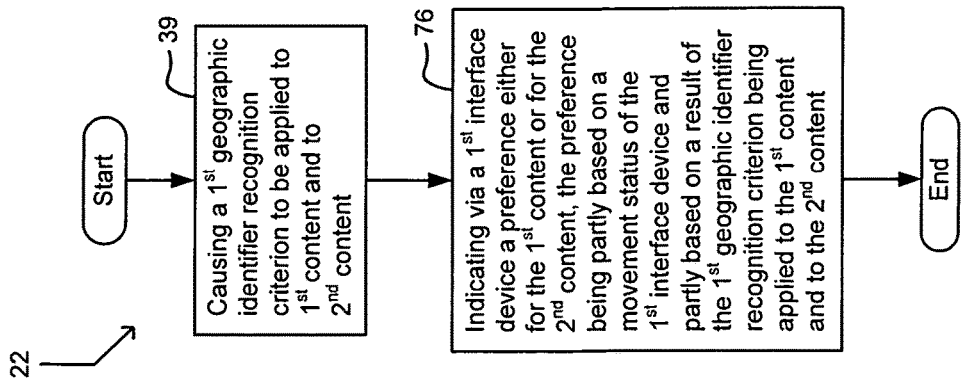
FIG. 22 depicts a high-level logic flow of an operational process described with reference to FIG. 13.

With reference now to FIG. 22, shown is a high-level logic flow 22 of an operational process. Intensive operation 39 describes causing a first geographic identifier recognition criterion to be applied to first content and to second content (e.g. pattern recognition module 106 determining whether any identified place-name indications 487 are present in content 441 or content 442). This can occur, for example, in a context in which one or more interface devices 310, 410 are operably coupled with network 190, in which network 190 includes medium 705 and decision unit 1300; in which such content comprises a preliminary search result 723 or other data supply 740; in which indication 487 is a text string identifying a type of physical roadway (e.g. "Blvd" or "Hwy."); and in which indication 487 is a text string identifying another geographic feature or other location type (e.g. "River" or "Ctr."). In some variants, pattern recognition module 104 may implement another pattern-matching criterion 331 (using wildcards or other semantic operators, e.g.) effective for distinguishing GPS coordinates 761 or a building address 742 from other textual content 741, for example, or recognizing a location identifier 743 among other textual content 741 using a comprehensive list 745 of regional terms (city and street names, e.g.).

In light of teachings herein, numerous existing techniques may be applied for configuring special-purpose circuitry or other structures effective for indexing and analyzing multi-level content as described herein without undue experimentation. See, e.g., U.S. Pat. No. 8,041,074 ("Content indexing and searching using content identifiers and associated metadata"); U.S. Pat. No. 8,027,999 ("Systems, methods and computer program products for indexing, searching and visualizing media content"); U.S. Pat. No. 7,912,832 ("Link generation system to allow indexing of dynamically generated server site content"); U.S. Pat. No. 7,849,065 ("Heterogeneous content indexing and searching"); U.S. Pat. No. 7,668,845 ("C-tree for multi-attribute indexing"); U.S. Pat. No. 7,487,138 ("System and method for chunk-based indexing of file system content"); U.S. Pat. No. 7,386,558 ("Methods and systems for filtering an Extensible Application Markup Language (XAML) file to facilitate indexing of the logical content contained therein"); U.S. Pat. No. 7,103,327 ("Single side band transmitter having reduced DC offset"); U.S. Pat. No. 6,654,783 ("Network site content indexing method and associated system"); U.S. Pat. No. 6,389,387 ("Method and apparatus for multi-language indexing").

Extensive operation 76 describes indicating via a first interface device a preference either for the first content or for the second content, the preference being partly based on a movement status of the first interface device and partly based on a result of the first geographic identifier recognition criterion being applied to the first content and to the second content (e.g. statement module 422 selectively listing or prioritizing content 441 via interface device 251 if device 251 has a movement status identifier 109 indicating that device 251 has moved recently). This can occur, for example, in a context in which statement module 422 would otherwise list or prioritize other content 442 instead; in which device 410 comprises an interface device 251; in which network 490 includes one or more search engines 182, 282; in which user 250 can configure movement status classifier 108 with a suitable temporal threshold 1305 (of a minute or an hour or a day, e.g.) for determining whether interface device 251 has moved "recently"; and in which such a threshold is used in determining what movement status identifier 109 will result from a given interval 1304 of non-movement (expressed in seconds or hours, e.g.). In a context in which user 250 has entered "par" into a search term field 1385, for example, statement module 422 may be configured to output a "first" preliminary search result 1391 optimized for users who have moved recently (prioritizing content 441, e.g.) if the interval 1304 is less than the threshold 1305 and otherwise to output a "second" preliminary search result 1392 (prioritizing content 442, e.g.) that is not optimized for users who have moved recently (users who are nominally stationary, e.g.). Alternatively or additionally, search engine 182 may (optionally) implement one or more instances of pattern recognition modules 102-107 so that a search result 333 therefrom manifests respective rankings 751, 752 that weigh geography-related hits 1351, 1353 (passing criterion 331, e.g.) more favorably than other hits 1352, 1354 (not passing criterion 331, e.g.). In a context in which result 450 includes content groupings 1310, 1320, for example, each may receive a corresponding relevance score 446, 447 that is increased by an increment (of 2-8% or more, e.g.) selectively in response to an indication 481 that primary content 1311 thereof passes one or more geographic recognition criteria 333 as described herein. In some variants, moreover, each such content grouping (or primary content 1311 thereof, e.g.) may receive a corresponding relevance score 446, 447 that is increased by an equal or lesser increment (of 1-5% or less, e.g.) selectively in response to an indication 481 that secondary content 1312 thereof (in a subdirectory or associated data object, e.g.) passes such criteria.

In light of teachings herein, numerous existing techniques may be applied for configuring special-purpose circuitry or other structures effective for categorizing device movement as described herein without undue experimentation. See, e.g., U.S. Pat. No. 7,983,872 ("Body movement detector, body movement detection method and body movement detection program"); U.S. Pat. No. 7,945,546 ("Local search and mapping for mobile devices"); U.S. Pat. No. 7,917,392 ("System for separating mobile search traffic from web search traffic using keyword separation"); U.S. Pat. No. 7,647,049 ("Detection of high velocity movement in a telecommunication system"); U.S. Pat. No. 7,532,127 ("Motion and position measuring for buried object detection"); U.S. Pat. No. 7,460,052 ("Multiple frequency through-the-wall motion detection and ranging using a difference-based estimation technique"); U.S. Pat. No. 7,444,221 ("Vehicle backward movement detection apparatus and vehicle braking force control apparatus"); U.S. Pat. No. 7,409,291 ("Device for automatic detection of states of motion and rest, and portable electronic apparatus incorporating it"); U.S. Pat. No. 7,408,654 ("Method for measuring position, linear velocity and velocity change of an object in two-dimensional motion"); U.S. Pat. No. 7,324,163 ("Sub-carrier detection (SCD) for motion threshold logic"); U.S. Pat. No. 7,190,263 ("Utilizing a portable electronic device to detect motion").

In light of teachings herein, numerous existing techniques may be applied for configuring special-purpose circuitry or other structures effective for recognizing whether content passes semantic criteria as described herein without undue experimentation. See, e.g., U.S. Pat. No. 8,005,875 ("Automatic data transmission in response to content of electronic forms satisfying criteria"); U.S. Pat. No. 7,949,191 ("Method and system for searching for information on a network in response to an image query sent by a user from a mobile communications device"); U.S. Pat. No. 7,941,124 ("Methods of providing messages using location criteria and related systems and computer program products"); U.S. Pat. No. 7,689,705 ("Interactive delivery of media using dynamic playlist generation subject to restrictive criteria"); U.S. Pat. No. 7,668,647 ("Computer method and apparatus for filling in an entry field using geographical proximity and character criteria"); U.S. Pat. No. 7,580,952 ("Automatic digital image grouping using criteria based on image metadata and spatial information"); U.S. Pat. No. 7,394,011 ("Machine and process for generating music from user-specified criteria"); U.S. Pat. No. 7,127,493 ("Optimizing server delivery of content by selective inclusion of optional data based on optimization criteria").

With reference now to FIG. 14, shown is an example of a system 14 (network subsystem, e.g.) in which one or more technologies may be implemented. Two or more interface devices 1401, 1402 owned or operated by a single user 220 (implementing respective interface devices of FIG. 2, e.g.) are configured to communicate with each other locally or remotely via one or more networks 190, 290, 1490 described herein. Interface device 1401 (implementing a stationary or GPS-disabled device, e.g.) may include one or more processors 1410, inputs 1431, outputs 1432, or caches 121-124, 1440 as described herein. In some contexts such a cache may contain one or more search records 679, 731 (each including one or more search terms 1447 provided by user 220 and, in some instances, one or more corresponding results 1448 of searches performed on each search term). Interface device 1402 may likewise contain one or more processors 1420, inputs 1471, or outputs 1472. In some contexts, for example, output 1472 may display a search term (comprising "ma" shown on a display 672 thereof, e.g.) together with one or more controls 1475 (a button by which user 220 may trigger a search by transmitting a search term to one or more search engines 182, 282 remote from user 220, e.g.) and search results 1478 (menu selections each representative of a "hit" as described above, e.g.).

With reference now to FIG. 23, shown is a high-level logic flow 23 of an operational process. Intensive operation 41 describes obtaining a first parameter from a first search task initiated at a first interface device (e.g. intake module 153 receiving a search term, search result 364, or other such parameter 385 relating to a search task 613 initiated by user 220 via input 1431). This can occur, for example, in a context in which the "first" interface device 1401 implements device 310 and includes medium 605; and in which network 190 includes networks 280, 1490.

In light of teachings herein, numerous existing techniques may be applied for configuring special-purpose circuitry or other structures effective for retaining search results and other records resulting from user actions as described herein without undue experimentation. See, e.g., U.S. Pat. No. 7,979,457 ("Efficient search of supplier servers based on stored search results"); U.S. Pat. No. 7,865,187 ("Managing sponsored content based on usage history"); U.S. Pat. No. 7,865,181 ("Searching for mobile content"); U.S. Pat. No. 7,849,139 ("Adaptive search in mobile peer-to-peer databases"); U.S. Pat. No. 7,840,580 ("Peripheral device, search result storage method and computer program product"); U.S. Pat. No. 7,620,622 ("Method and system for indexing information and providing results for a search including objects having predetermined attributes"); U.S. Pat. No. 6,934,699 ("System and method for loading a cache with query results"); U.S. Pat. No. 6,865,575 ("Methods and apparatus for using a modified index to provide search results in response to an ambiguous search query"); U.S. Pat. No. 6,336,117 ("Content-indexing search system and method providing search results consistent with content filtering and blocking policies implemented in a blocking engine").

Intensive operation 44 describes obtaining a second parameter from a second interface device (e.g. intake module 154 receiving one or more parameters 386 via a touchscreen or other input 1471 of interface device 1402). This can occur, for example, in a context in which interface device 1402 is the "second" interface device (residing in a wearable or other portable device, e.g.); in which association module 172 associates the first and second interface devices; in which user 220 enters the "second" parameter 386 in an apparent effort to initiate a search via the "second" interface device; and in which one or more components of dialog manager 110 reside in network 1490 or in the first or second interface devices. In some contexts in which one of the interface devices 1401, 1402 include an instance of medium 705, for example, association module 172 can create a record 732 (in one of the interface devices 1401, 1402) that identifies the other interface device. Alternatively or additionally, such an association may be implemented as a record 733 in a medium 705 that is remote from both the first and the second interface devices. In one context, for example, user 220 may speak or type "ma" (as the "second" parameter, e.g.) as the first two characters of a search term.

In light of teachings herein, numerous existing techniques may be applied for configuring special-purpose circuitry or other structures effective for obtaining, characterizing, tracking, and predicting user preferences and instructions as described herein without undue experimentation. See, e.g., U.S. Pat. No. 8,041,658 ("Method, system, and computer program product for adaptively learning user preferences for smart services"); U.S. Pat. No. 8,041,426 ("Selective resynchronization therapy optimization based on user preference"); U.S. Pat. No. 7,984,006 ("Learning a user's activity preferences from GPS traces and known nearby venues"); U.S. Pat. No. 7,885,904 ("Methods and systems for selecting and presenting content on a first system based on user preferences learned on a second system"); U.S. Pat. No. 7,873,616 ("Methods of inferring user preferences using ontologies"); U.S. Pat. No. 7,865,187 ("Managing sponsored content based on usage history"); U.S. Pat. No. 7,844,722 ("Method, apparatus and program product for media identification and tracking associated user preferences"); U.S. Pat. No. 7,818,170 ("Method and apparatus for distributed voice searching"); U.S. Pat. No. 7,747,246 ("Environment independent user preference communication"); U.S. Pat. No. 7,689,446 ("Automated reservation system with transfer of user-preferences from home to guest accommodations"); U.S. Pat. No. 7,467,160 ("Method and system for managing images over a communication network using user provided instructions"); U.S. Pat. No. 7,430,008 ("Digital still camera and method of inputting user instructions using touch panel"); U.S. Pat. No. 6,406,372 ("System and method for transferring user-defined instructions between a home video game and an arcade video game").

Extensive operation 77 describes causing the second interface device to indicate the first parameter from the first search task initiated at the first interface device partly based on an association between the second interface device and the first interface device and partly based on the second parameter from the second interface device (e.g. query builder 161 transmitting "main street café" to a display or other output 1472 of the "second" interface device 1402 in response to user 220 having spelled "ma" as the first two characters of a search term, in response to one or more records 732, 733 indicating the association between the first and second interface device, and in response to a record 734 indicating that a prior search was performed using "main street café" as a search term on the "first" interface device). This can occur, for example, in a context in which the string "main street café" is the "first" parameter 385; in which "ma" is the "second" parameter; in which query builder 161 retrieves such records 731-734 from one or more caches 121, 1440 in the first or second interface devices 1401, 1402; and in which interface device 1402 or network 1490 include one or more instances of dialog manager 110. In some contexts, this mode of operation might prevent a user of the second interface device from having to memorize the first parameter. Alternatively or additionally, the "first" parameter may include one or more search results 364 of the first search task 613 (among other results 1448 cached on interface device 1401, e.g.), which may obviate or help refine a "second" search task (available to be performed on interface device 1402, e.g.).

In light of teachings herein, numerous existing techniques may be applied for configuring special-purpose circuitry or other structures effective for associating a user or a device with another user or another device as described herein without undue experimentation. See, e.g., U.S. Pat. No. 8,023,485 ("Method, system and device for realizing user identity association"); U.S. Pat. No. 7,979,585 ("System and method to associate a private user identity with a public user identity"); U.S. Pat. No. 7,970,660 ("Identifying associations between items and email-address-based user communities"); U.S. Pat. No. 7,941,505 ("System and method for associating a user with a user profile in a computer network environment"); U.S. Pat. No. 7,894,812 ("Automatic over-the-air updating of a preferred roaming list (PRL) in a multi-mode device, based on an account association between the device and a wireless local area network (WLAN) access point"); U.S. Pat. No. 7,743,099 ("Associating multiple visibility profiles with a user of real-time communication system"); U.S. Pat. No. 7,716,378 ("System and method to associate a private user identity with a public user identity"); U.S. Pat. No. 7,703,691 ("Multiple device and/or user association"); U.S. Pat. No. 7,627,577 ("System and method for maintaining an association between a distribution device and a shared end user characteristic"); U.S. Pat. No. 6,473,824 ("Dynamic association of input/output device with application programs").

Figure 15:
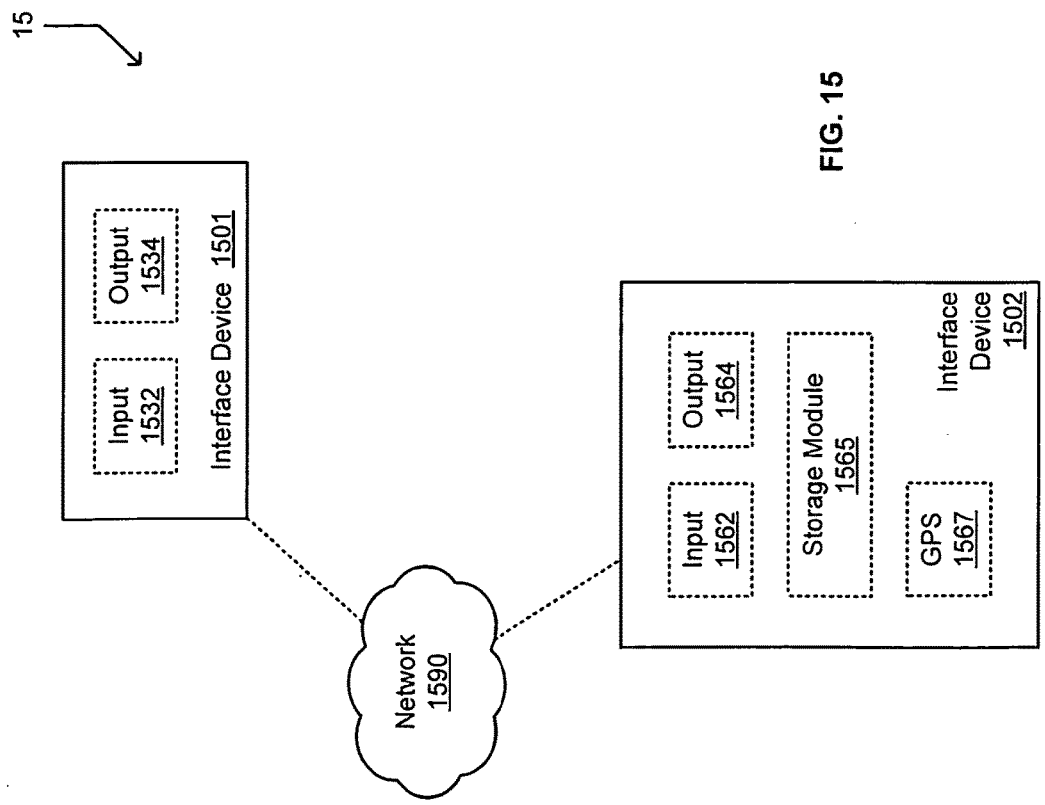

With reference now to FIG. 15, shown is an example of a system 15 (network subsystem, e.g.) in which one or more technologies may be implemented. Two or more interface devices 1401, 1402 owned or operated by a single individual (implementing respective interface devices of FIG. 2, e.g.) are configured to communicate with each other locally or remotely via one or more networks 190, 290, 1590 described herein. Interface device 1501 (implementing a stationary or GPS-disabled device, e.g.) may include one or more inputs 1532 or outputs 1534 as described herein. Interface device 1502 may likewise contain one or more inputs 1562, outputs 1564, storage modules 1565, or GPS systems 1567 and may be configured to generate or receive queries informed by prior searches (initiated at an associated device 1501, e.g.) under some circumstances as explained below.

Figure 24:
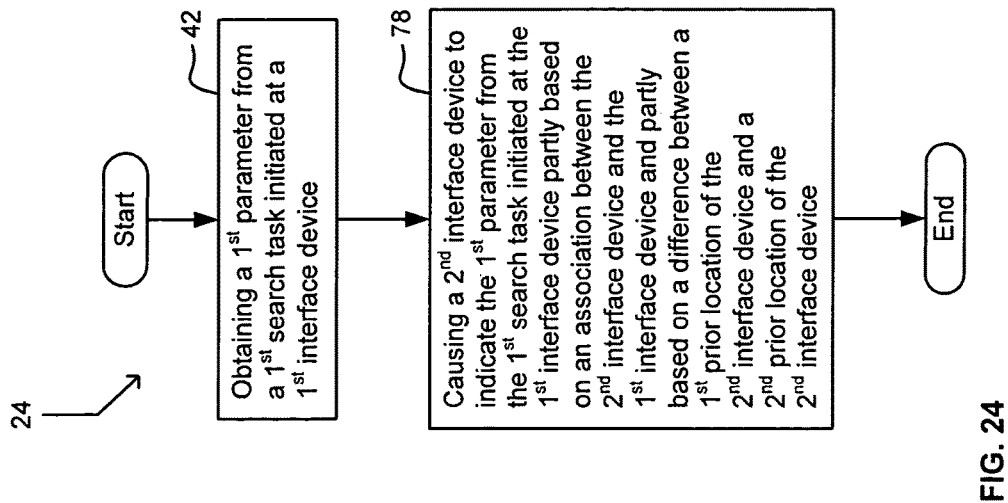
FIG. 24 depicts a high-level logic flow of an operational process described with reference to FIG. 15.

With reference now to FIG. 24, shown is a high-level logic flow 24 of an operational process. Intensive operation 42 describes obtaining a first parameter from a first search task initiated at a first interface device (e.g. intake module 152 receiving one or more parameters 385 resulting from or used in a search task 614 initiated at interface device 1501). This can occur, for example, in a context in which parameter 385 is a natural language word or phrase; in which interface device 1501 is not configured with a GPS device or other facility for tracking its geographic location; in which a nonvolatile storage module 1565 thereof (a disk drive 620, e.g.) contains a record 731 of searches performed at that location (including one or more patterns 434 defining a search criterion 433, search results 365, or other search-related data 438; and in which such search-related data 438 is typical of searches that are initiated or performed at a workstation that is not mobile. In some contexts, for example, one or more interface devices 310, 1501 (as the "first" interface device) may include one or more media 605, 705 as described herein. Alternatively or additionally, one or more instances of intake module 152 may (optionally) reside in network 1590 or interface device 1502.

In light of teachings herein, numerous existing techniques may be applied for configuring special-purpose circuitry or other structures effective for caching or otherwise retaining search terms or search results selectively as described herein without undue experimentation. See, e.g., U.S. Pat. No. 7,865,187 ("Managing sponsored content based on usage history"); U.S. Pat. No. 7,802,057 ("Priority aware selective cache allocation"); U.S. Pat. No. 7,596,662 ("Selective storage of data in levels of a cache memory"); U.S. Pat. No. 7,225,234 ("Method and system for selective advertisement display of a subset of search results"); U.S. Pat. No. 7,185,149 ("Selective storage in a cache memory device"); U.S. Pat. No. 7,133,971 ("Cache with selective least frequently used or most frequently used cache line replacement"); U.S. Pat. No. 6,678,793 ("User-based selective cache content replacement technique").

Extensive operation 78 describes causing a second interface device to indicate the first parameter from the first search task initiated at the first interface device partly based on an association between the second interface device and the first interface device and partly based on a difference between a first prior location of the second interface device and a second prior location of the second interface device (e.g. query builder 162 transmitting one or more parameters 385 to output device 1564 selectively in response to one or more associations 492, 493 between the interface devices 1501, 1502 and to one or more positional differences 316, 317 between earlier-recorded locations of interface device 1502). This can occur, for example, in a context in which parameter 385 is a pre-fetched or other search result or a keyword or other operand relating to search task 614; in which the difference 316 is established by comparing successive latitudes and longitudes (e.g. coordinates 321, 322) obtained from GPS 1567 (as an output 1534, 1564 of an interface device described herein, e.g.); in which association module 171 selectively determines that an association 493 exists between the interface devices 1501, 1502 in response to an indication 485 that the devices have the same registered owner or user 250 (as identified at a login, a registration, or similar configuration event, e.g.); in which one or more query builders 161, 162 would otherwise have to facilitate a search task being initiated at the second interface device without the predictive benefit resulting from prior search parameters or from a quantified or categorical awareness of such lateral translation (positional difference 316, e.g.); in which device 460 implements one or more other interface devices described herein; and in which network 1590 is operably coupled with one or more other networks described herein. Alternatively or additionally, such networks 190, 490 may include one or more instances of dialog manager 110.

In light of teachings herein, numerous existing techniques may be applied for configuring special-purpose circuitry or other structures effective for computing a difference between prior locations as described herein without undue experimentation. See, e.g., U.S. Pat. No. 8,044,798 ("Passive microwave speed and intrusion detection system"); U.S. Pat. No. 8,026,850 ("Apparatus and method for computing location of a moving beacon using time difference of arrival and multi-frequencies"); U.S. Pat. No. 7,962,283 ("Deviation-correction system for positioning of moving objects and motion tracking method thereof"); U.S. Pat. No. 7,778,792 ("Systems and methods for location, motion, and contact detection and tracking in a networked audiovisual device"); U.S. Pat. No. 7,775,329 ("Method and detection system for monitoring the speed of an elevator car"); U.S. Pat. No. 7,671,795 ("Wireless communications device with global positioning based on received motion data and method for use therewith"); U.S. Pat. No. 7,647,049 ("Detection of high velocity movement in a telecommunication system"); U.S. Pat. No. 7,460,052 ("Multiple frequency through-the-wall motion detection and ranging using a difference-based estimation technique"); U.S. Pat. No. 7,242,462 ("Speed detection methods and devices"); U.S. Pat. No. 6,985,206 ("Baseball pitch speed measurement and strike zone detection devices"); U.S. Pat. No. 6,400,304 ("Integrated GPS radar speed detection system").

Figure 16:
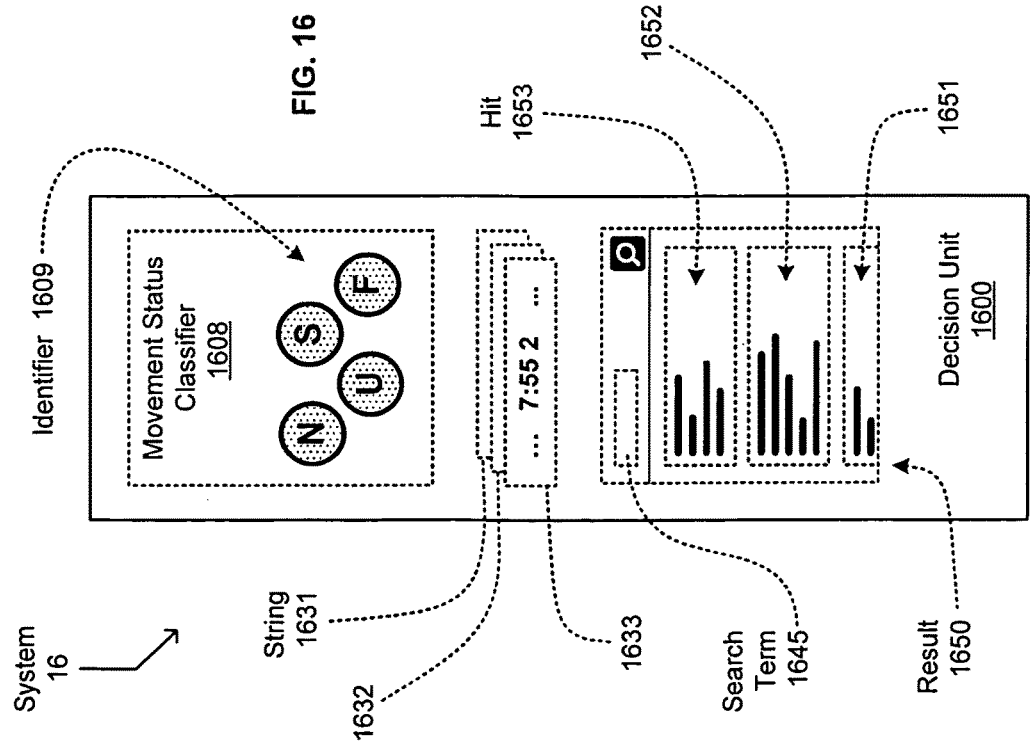
FIG. 16 depicts an exemplary environment featuring a device that may facilitate a search partly based its movement status.

With reference now to FIG. 16, shown is an example of a system 16 (network subsystem, e.g.) in which one or more technologies may be implemented. One or more interface devices implementing dialog manager 110 may, for example, include or otherwise interact with a decision unit 1600 as described herein. In some contexts, decision unit 1600 may include media 605, 705 bearing one or more strings 1631, 1632, 1633; search terms 1645; or search results 1650 (e.g. comprising ranked hits 1651, 1652, 1653) as described below. Alternatively or additionally, decision unit 1600 may include one or more movement status classifiers 108, 1608 each configured to assign one or more identifiers 109, 1609 of device status (responsive to a succession of coordinates from GPS 563, e.g.) to mobile devices 580 as described herein.

Figure 25:
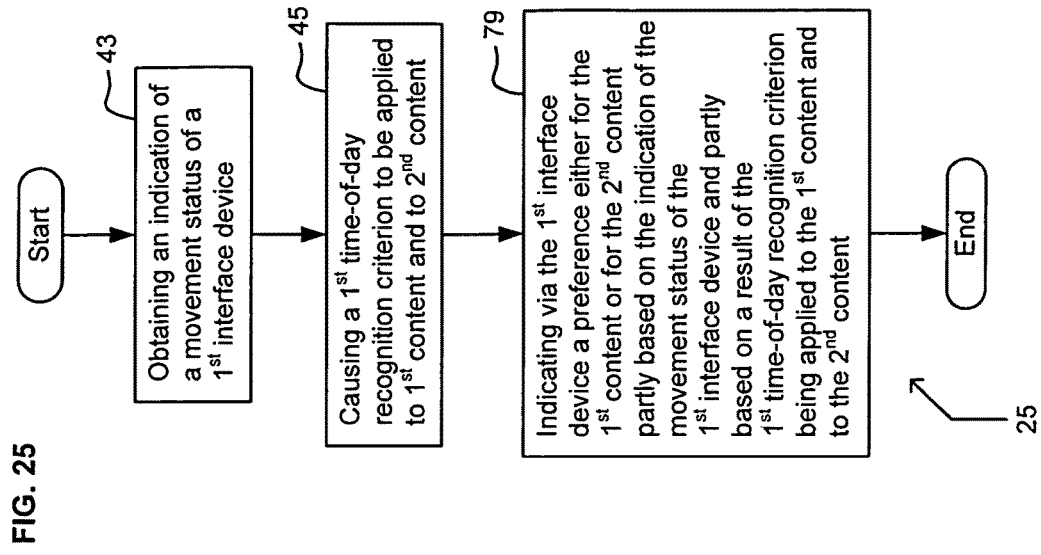
FIG. 25 depicts a high-level logic flow of an operational process described with reference to FIG. 16.

With reference now to FIG. 25, shown is a high-level logic flow 25 of an operational process. Intensive operation 43 describes obtaining an indication of a movement status of a first interface device (e.g. intake module 155 receiving an indication 482 from movement status classifier 1608 that interface device 232 has recently moved at a ground speed characteristic of motorized traffic traveling along a highway). This can occur, for example, in a context in which movement status classifier 1608 computes a vector-valued difference signal 764 between each two successive pairs of coordinates 761, 762 (each indicating a latitude and a longitude received from global positioning system 563, e.g.) whereby difference signal 764 indicates an estimated average ground speed 765; in which movement status classifier 1608 generates a different keyword or other category identifier 1609 for each of several observed behaviors, and in which association module 171 maintains an association between interface device 232 and its current category identifier 1609. In some variants, for example, category "F" may signify that interface device 232 has recently traveled fast (apparently at a speed of at least 10 kilometers per hour within the past five minutes, e.g.). Alternatively or additionally, "S" may signify that interface device 232 has recently moved (according to data from GPS 563, e.g.) but at slower speeds and "N" may signify that positional data 770 indicates that interface device 232 has not moved recently, and "U" may signify that recent positional data 770 for interface device 232 is unavailable.

Intensive operation 45 describes causing a first time-of-day recognition criterion to be applied to first content and to second content (e.g. pattern recognition module 104 determining whether any time-of-day indications 484 result from processing content 370). This can occur, for example, in a context in which content 370 includes a preliminary search result 367 and in which indication 484 signals whichever content 370 contains a text string 1631 matching the pattern "#:%" (in which "#" signifies a digit 0-9 and in which "%" signifies a digit 0-5, e.g.). Alternatively or additionally indication 484 may be configured to signal a result 366 of one or more other time-of-day-related search criteria 331 being applied to content 370 being searched (e.g. searching for an instance of character sequences like "afternoon" or "midnight" therein). Such basic configurations of pattern recognition module 104 may be suitable for implementation locally, for example, being executed on a handheld 340, wearable, or other portable interface 390. This can occur, for example, in a context in which search engine 182 provides interface-type-invariant search results 366 that are then sifted locally (within a vicinity of user 230, e.g.).

In light of teachings herein, numerous existing techniques may be applied for configuring special-purpose circuitry or other structures effective for determining whether text data includes specific strings or semantic patterns as described herein without undue experimentation. See, e.g., U.S. Pat. No. 7,734,562 ("Voice to text conversion with keyword parse and match to semantic and transactional concepts stored in a brain pool state machine using word distance to generate character model interaction in a plurality of dramatic modes"); U.S. Pat. No. 7,689,610 ("Automated grouping of messages provided to an application using string similarity analysis"); U.S. Pat. No. 7,599,831 ("Multi-stage pattern reduction for natural language processing"); U.S. Pat. No. 7,596,568 ("System and method to resolve ambiguity in natural language requests to determine probable intent"); U.S. Pat. No. 7,593,845 ("Method and apparatus for identifying semantic structures from text"); U.S. Pat. No. 7,548,933 ("System and method for exploiting semantic annotations in executing keyword queries over a collection of text documents"); U.S. Pat. No. 7,192,283 ("System and method for visual analysis of word frequency and distribution in a text"); U.S. Pat. No. 7,054,855 ("Method and system for performing a pattern match search for text strings"); U.S. Pat. No. 6,813,616 ("System and method for building a semantic network capable of identifying word patterns in text"); U.S. Pat. No. 6,161,084 ("Information retrieval utilizing semantic representation of text by identifying hypernyms and indexing multiple tokenized semantic structures to a same passage of text").

Extensive operation 79 describes indicating via the first interface device a preference either for the first content or for the second content partly based on the indication of the movement status of the first interface device and partly based on a result of the first time-of-day recognition criterion being applied to the first content and to the second content (e.g. statement module 421 causing the interface device 232 to display a search result 1650 in which two or more hits 1651, 1652, 1653 are ranked according to whether each passes a time-of-day recognition criterion 116 if and only if indication 482 signals that the current category identifier 1609 of interface device 232 is "F" or "S"). This can occur, for example, in a context in which interface device 232 is either device 410 or 460; in which such hits 1651, 1652, 1653 are otherwise ranked without regard to time-of-day recognition criterion 116; in which network 190 includes network 490; in which interface device 310 includes one or more instances of decision unit 1600 configured to interact with media 605, 705 as described herein; and in which a statement module would otherwise have to use content evaluations generated without the predictive benefit of the movement status or without the insight resulting from the application of the time-of-day recognition criterion. Alternatively or additionally, one or more instances of search engine 182 may be configured to include statement module 421 and to apply one or more criteria 116-119 as described herein (favoring content containing time-of-day or geographic indicators, for example) so that an interface device 232 that is moving or has moved recently (with a category "F," e.g.) will preferentially invoke such an instance of search engine 182 but so that stationary interface devices (with a category "T," e.g.) will invoke a conventional search engine 282. Alternatively or additionally, in some variants, a search engine 282 that normally returns a conventionally-sequenced result can include an instance of statement module 421 so that unconventional search results 361 (sequenced or selectively included in a manner that depends upon which hits 1651, 1652, 1653 indicate a time of day, e.g.) can be provided selectively in response to receiving a parameter 383 indicating that the interface device 232 from which a search task 612 originated designates itself as mobile.

In light of teachings herein, numerous existing techniques may be applied for configuring special-purpose circuitry or other structures effective for sorting and screening search results using two or more criteria as described herein without undue experimentation. See, e.g., U.S. Pat. No. 7,873,620 ("Desktop search from mobile device"); U.S. Pat. No. 7,844,581 ("Methods and systems for data management using multiple selection criteria"); U.S. Pat. No. 7,773,812 ("Method and system for performing searches and returning results based on weighted criteria"); U.S. Pat. No. 7,653,878 ("Visually organizing and highlighting a list of items to show how they satisfy multiple criteria selected by a user"); U.S. Pat. No. 6,330,610 ("Multi-stage data filtering system employing multiple filtering criteria"); U.S. Pat. No. 6,047,290 ("Computer implemented planning system and process providing mechanism for grouping and prioritizing consumer objects based on multiple criteria").

With reference now to FIG. 26, shown is an example of a system 2600 comprising one or more additional media 2605, optionally comprising an instance of media 605, 705 described above. Such mass storage or other media may bear data comprising raw photographic images 2630, 2631 and other images 2632, 2633, 2634, 2635, 2636 adapted from raw photographic images by techniques known in the art or described herein. In various components, such images may include digitally-encoded data comprising one or more depictions 2644; color components; rectangular regions 2651, 2652, 2664, annular regions 2653, 2654, 2662, 2663, major regions 2661, 2665 (comprising more than 50% of their respective image, e.g.); corners 2641, 2642 or other points of interest (described with coordinates 463, 464, e.g.); outlines 2648 or other angled or curvilinear segments; or other portions 2671, 2672, 2673, 2674, 2675, 2676, 2677, 2678 of interest.

Figure 27:
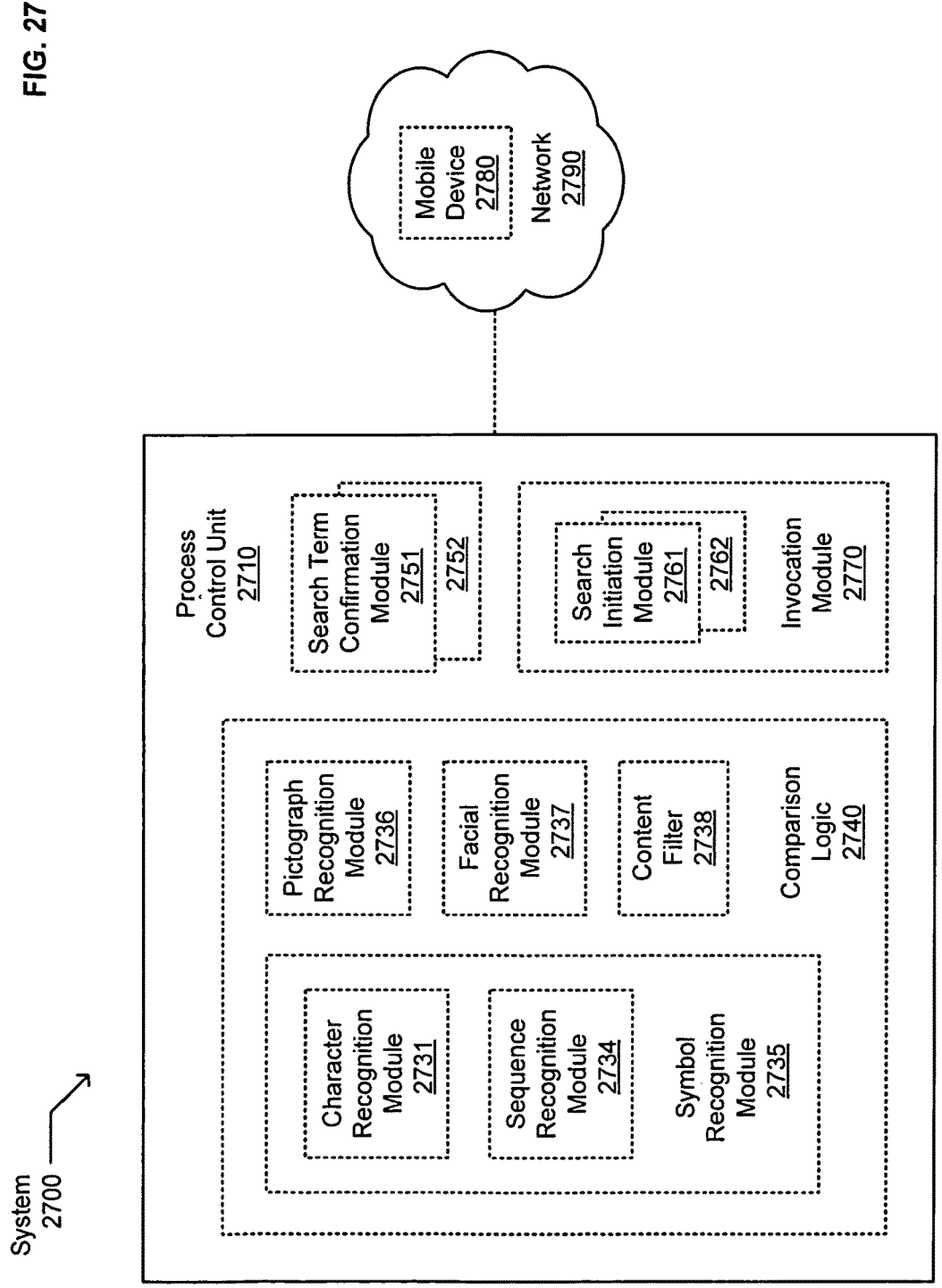
FIG. 27 depicts an exemplary environment featuring a process control unit.

With reference now to FIG. 27, shown is an example of a system 2700 (network subsystem, e.g.) in which one or more technologies may be implemented. One or more mobile devices 2780 or other interface devices as described herein, residing in one or more networks 190, 290, 2790 described herein, may implement or communicate with process control unit 2710. Such process control units may one or more search term confirmation modules 2751, 2752; invocation modules 2770 (e.g. search initiation modules 2761, 2762); or instances of comparison logic 2740. Comparison logic 2740 may include one or more symbol recognition modules 2735 (character recognition modules 2731 or sequence recognition modules 2734, e.g.); pictograph recognition modules 2736; facial recognition modules 2737; or other content filters 2738 as described herein.

Figure 28:
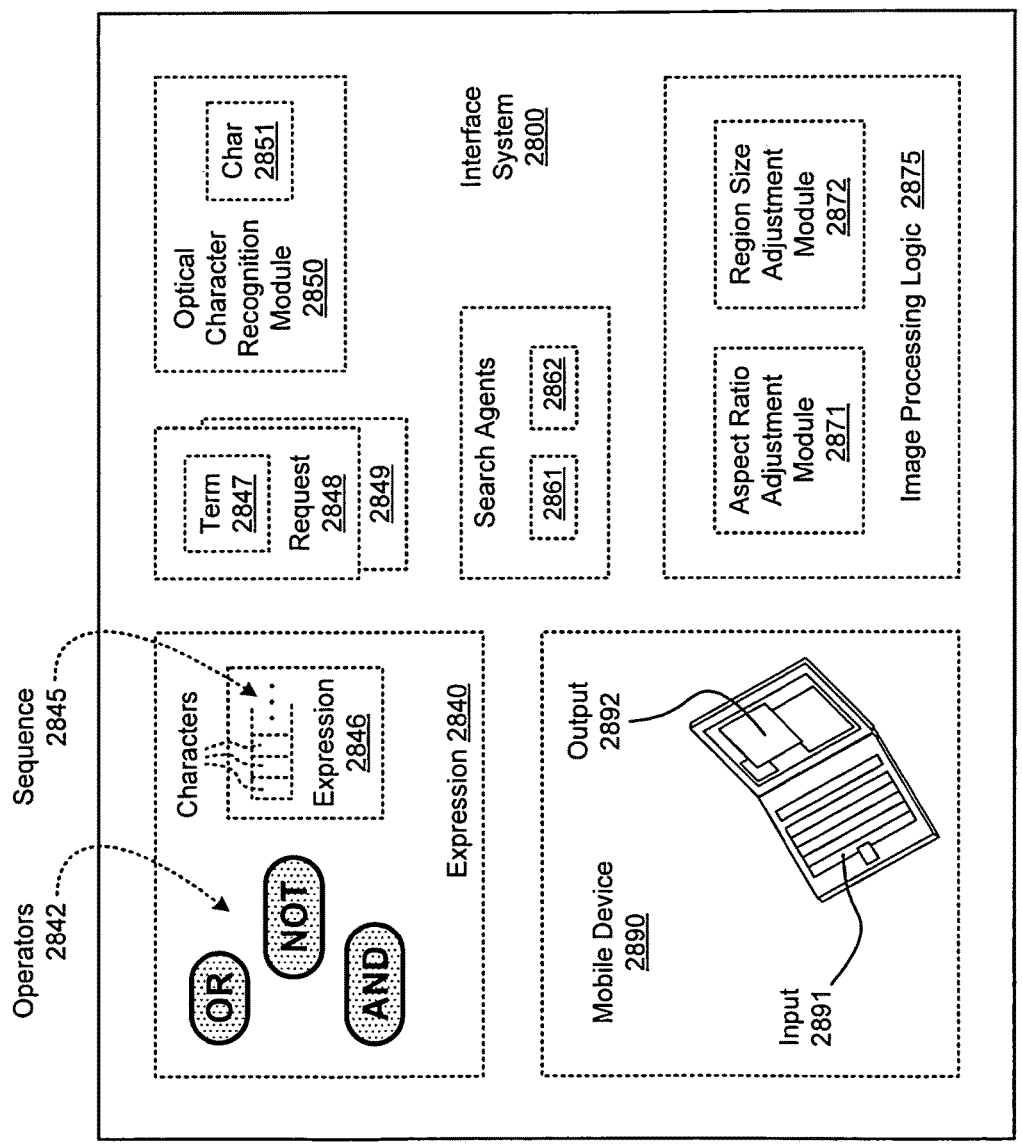
FIG. 28 depicts an exemplary environment featuring a mobile device or other interface system.

With reference now to FIG. 28, shown is an example of an interface system 2800 (configured as a network-connected mobile device 2890 or other subsystem of one or more networks described herein, e.g.) in which one or more technologies may be implemented. One or more media 305, 605, 705, 2605 therein may bear one or more expressions 2846 comprising character sequences 2845 (as a search term, e.g.). Compound expressions 2840 (expressed digitally, e.g.) may also be borne thereon, such as by combining one or more of the above-described expressions with one or more logical operators 2842. In some variants, interface system 2800 may also include one or more requests 2848, 2849 (expressed digitally and including one or more search terms 2847, e.g.), user inputs 2891, or user outputs 2890. Alternatively or additionally, interface system 2800 may include one or more optical character recognition modules 2850 (operable for processing one or more characters 2851, e.g.); browser-implemented or other search agents 2861, 2862; or other instances of image processing logic 2875 (aspect ratio adjustment modules 2871 or region size adjustment modules 2872, e.g.).

Figure 29:
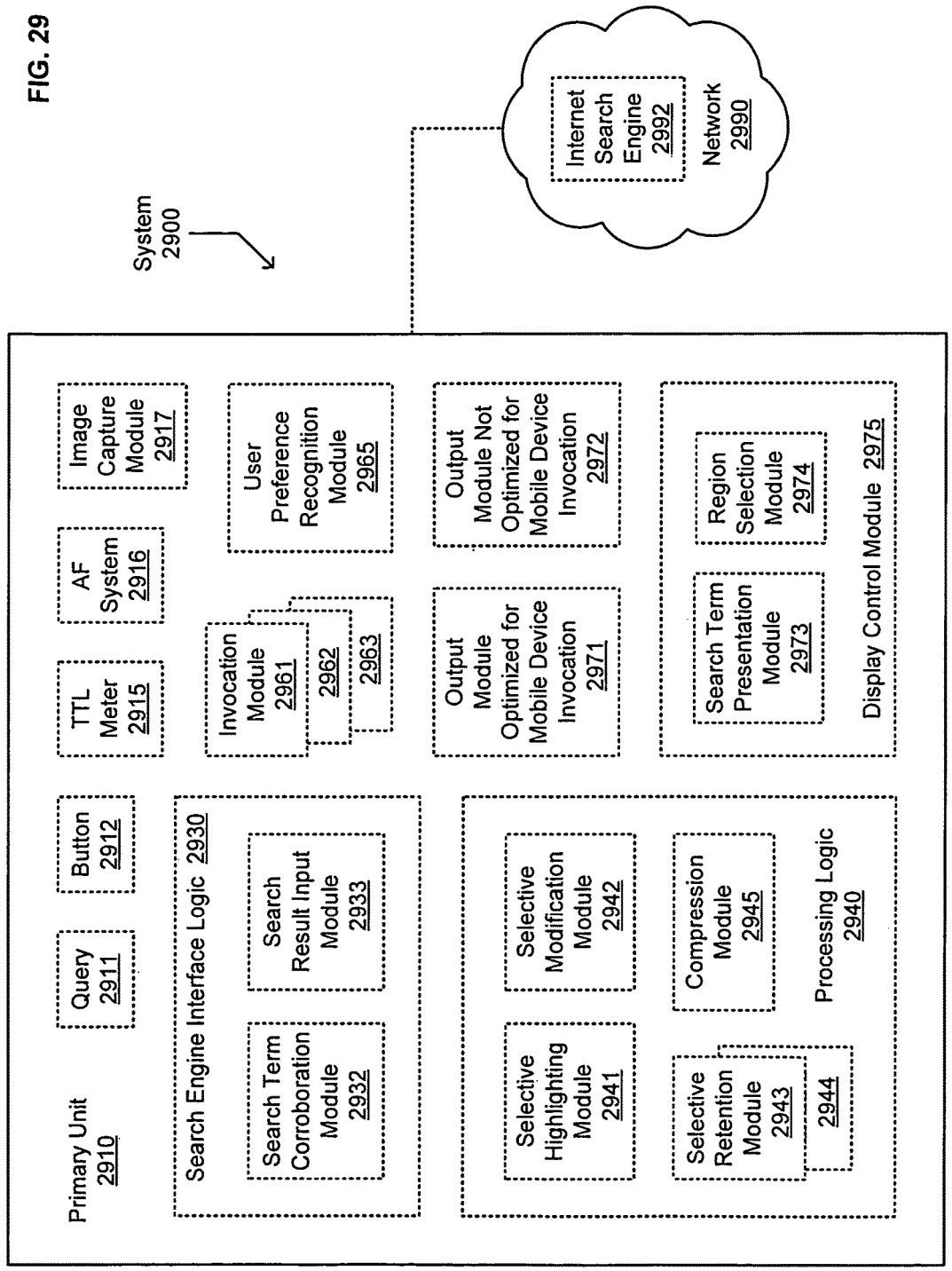
FIG. 29 depicts an exemplary environment featuring a primary unit.

With reference now to FIG. 29, shown is an example of a system 2900 (network subsystem, e.g.) in which one or more technologies may be implemented. Primary unit 2910 implements one or more interface devices operable by a user (depicted in FIG. 2, e.g.), operably coupled with an Internet search engine 2992 or other search engines 182, 282 via one or more networks 190, 290, 2990. In some contexts, primary unit 2910 may implement one or more components configured to function as a digital camera (lenses, buttons 2912 or other controls, through-the-lens meters 2915, autofocus systems 2916, image capture modules 2917, and handling control surfaces, e.g.). In some variants, moreover, primary unit 2910 may implement one or more instances of queries 2911; finvocation modules 2961, 2962, 2963; user preference recognition modules 2965; region selection modules 2974; or other processing logic 2940 configured to facilitate data manipulation (of images 2630-2636 or other optical data 641-643, e.g.). Processing logic 2940 may likewise include one or more instances of selective highlighting modules 2941, selective modification modules 2942, selective retention modules 2943, 2944, or compression modules 2945 as described herein. Alternatively or additionally, primary unit 2910 may implement one or more components configured to facilitate search tasks as described herein: search engine interface logic 2930 (search term corroboration modules 2932 or search result input modules 2933, e.g.); output modules 2971 optimized for mobile device invocation; output modules 2972 not optimized for mobile device invocation; search term presentation modules 2973; or other display control modules 2975 as described below.

Figure 30:
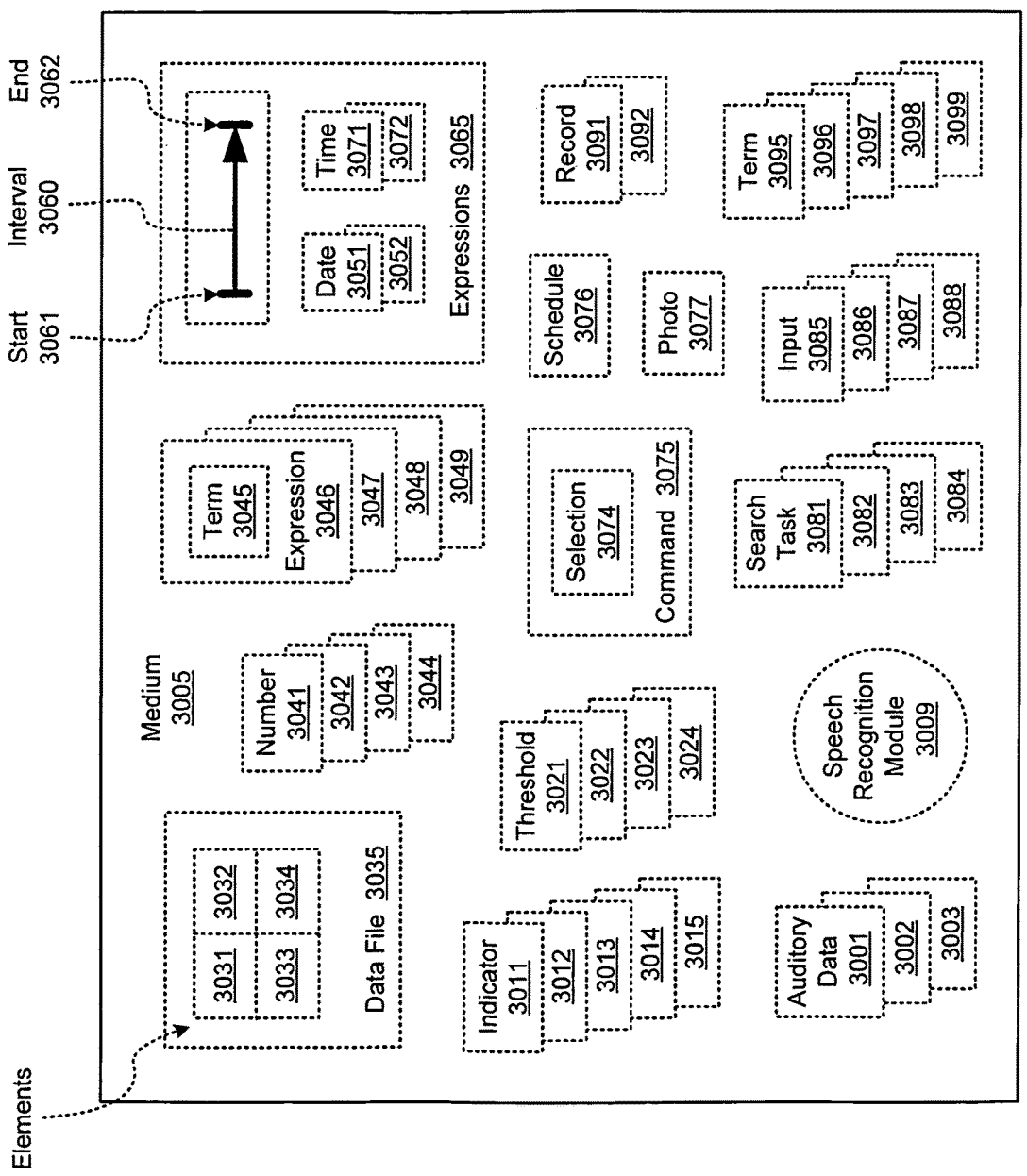
FIG. 30 depicts an exemplary environment featuring data-handling media.

With reference now to FIG. 30, shown is an example of a system 3000 comprising one or more additional media 3005, optionally comprising an instance of media 305, 605, 705, 2605 described above. Such media may bear one or more instances of auditory data 3001, 3002, 3003 (sound clips configured to be processed by one or more software-implemented speech recognition modules 3009, e.g.); data files 3035 (e.g. comprising elements 3031, 3032, 3033, 3034); schedules 3076; photos 3077; records 3091, 3092; inputs 3085, 3086, 3087, 3088; or terms 3095, 3096, 3097, 3098, 3099 as described below. Moreover a memory or application-specific integrated circuit (ASIC) medium 3005 may likewise implement one or more speech recognition modules 3009; search tasks 3081, 3082, 3083, 3084; or other selections 3074 or other commands 3075 configured to be invoked, performed, or executed (e.g. by a processor 285, 395). Alternatively or additionally, such media may contain other search-related data: numbers 3041, 3042, 3043, 3044; search terms 3045 or other expressions 3046, 3047, 3048, 3049, 3065; indicators 3011, 3012, 3013, 3014, 3015; or thresholds 3021, 3022, 3023, 3024 as described below. In some variants, for example, such expressions may include one or more dates 3051, 3052; times 3071, 3072 of day (expressed in relation to a 12- or 24-hour clock, e.g.); or other temporal expressions 3065 (indicating a start 3061 or end 3062 of one or more intervals 3060, e.g.).

Figure 31:
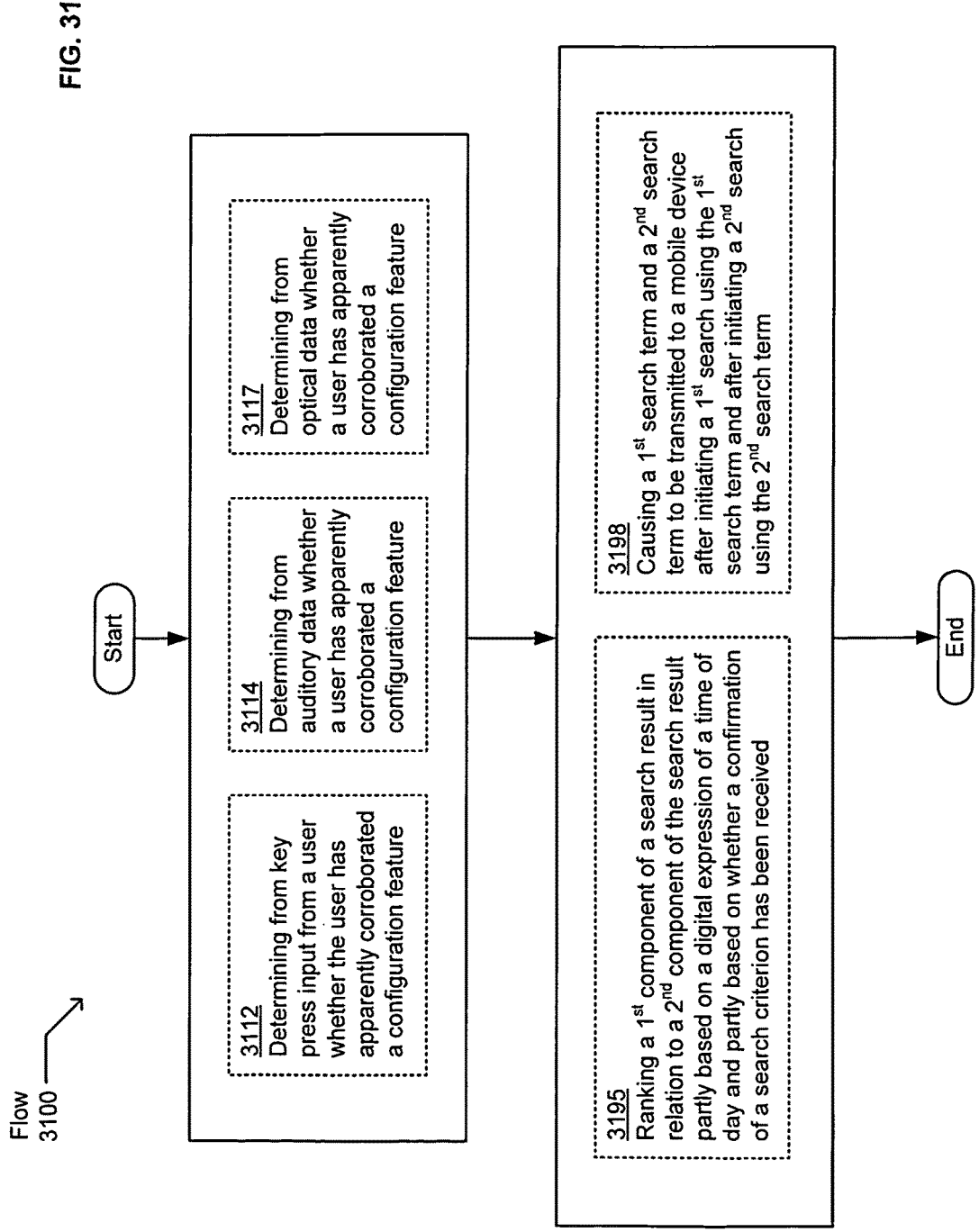

With reference now to flow 3100 of FIG. 31 and to other flows 17-25 described above, in some variants, one or more intensive operations 3112, 3114, 3117 described below may be performed in conjunction with one or more intensive operations 34-45 described above. Alternatively or additionally, one or more extensive operations 3195, 3198 described below may likewise comprise or be performed in conjunction with one or more extensive operations 71-79 described above.

Intensive operation 3112 describes determining from key press input from a user whether the user has apparently corroborated a configuration feature (e.g. key press input detection module 504 detecting whether a user has pressed 'Y' in response to a prompt 703 like "Proceed with search?"). This can occur, for example, in a context in which device 460 implements one or more devices 580 and media 605 as described above; in which the user received one or more proposed search criteria, coordinates, associations, or other such indications described herein (via speaker 671 or display 672, e.g.) as a proposed configuration feature; and in which dialog manager 110 presents such a prompt below or after such proposed feature. Alternatively or additionally, prompt 703 may include a tone or other auditory component. Alternatively or additionally, event/condition detection logic 510 may (optionally) be configured to accept a gesture, utterance, or other such event 512, 513 as acceptable corroboratory input 548 (confirming a preliminary indication 1251, e.g.).

In light of teachings herein, numerous existing techniques may be applied for configuring special-purpose circuitry or other structures effective for facilitating a selection of a default value or other user preference as described herein without undue experimentation. See, e.g., U.S. Pat. No. 7,680,781 ("Automatic search query generation and results set management"); U.S. Pat. No. 7,647,312 ("System and method for automatic generation of suggested inline search terms"); U.S. Pat. No. 7,428,533 ("Automatic generation of taxonomies for categorizing queries and search query processing using taxonomies"); U.S. Pat. No. 7,007,294 ("Method and apparatus for automatic generation of query search terms for a program recommender"); U.S. Pat. No. 6,785,670 ("Automatically initiating an internet-based search from within a displayed document").

Intensive operation 3114 describes determining from auditory data whether a user has apparently corroborated a configuration feature (e.g. spoken expression detection module 503 recognizing one or more patterns in auditory data 3001, 3002 signaling a menu selection 3074 or other command 3075 to activate one or more special purpose modules as described herein). This can occur, for example, in a context in which device 580 includes media 705, 3005; in which a spoken "no" or similar auditory data 3001 follows a prompt 703 like "Proceed with search?"; and in which event/condition detection logic 510 responds to such a negative expression (declining to corroborate, e.g.) by triggering a structured dialog 588. Alternatively or additionally, spoken expression detection module 503 may be configured to respond to a user saying "halt" or "modify criteria" or another such command 3075 signaling a user's intention to halt a task in progress. This can occur, for example, in a context in which a user detects a defect in one or more search expressions 3048 after initiating a search task 611-618 or in which a synchronization or other configuration task 430 is not yielding a desired result (because it is taking too long or was not correctly initiated, e.g.).

In light of teachings herein, numerous existing techniques may be applied for configuring special-purpose circuitry or other structures effective for recognizing auditory data as described herein without undue experimentation. See, e.g., U.S. Pat. No. 7,852,993 ("Speech recognition enhanced caller identification"); U.S. Pat. No. 7,603,273 ("Simultaneous multi-user real-time voice recognition system"); U.S. Pat. No. 7,451,081 ("System and method of performing speech recognition based on a user identifier"); U.S. Pat. No. 7,171,358 ("Compression of language model structures and word identifiers for automated speech recognition systems"); U.S. Pat. No. 6,269,335 ("Apparatus and methods for identifying homophones among words in a speech recognition system"); U.S. Pat. No. 6,029,124 ("Sequential, nonparametric speech recognition and speaker identification"); U.S. Pub. No. 2010/0121638 ("System and method for automatic speech to text conversion"); U.S. Pub. No. 2009/0276216 ("Method and system for robust pattern matching in continuous speech").

Intensive operation 3117 describes determining from optical data whether a user has apparently corroborated a configuration feature (e.g. gesture detection module 502 or optical condition detection module 505 determining whether an event 512, 515 indicative of a user corroborating one or more search terms 1447, 1645 has occurred from a facial expression in an image 627 or from timing data 783 derived from a succession of two or more images). This can occur, for example, in a context in which device 580 includes media 605, 705, in which a user smiles or nods to corroborate the feature, in which such event/condition detection logic 510 is configured to detect these events or conditions, and in which one or more invocation modules 2961-2963 are configured to respond to such detection. Alternatively or additionally, event/condition detection logic 510 may be configured to recognize and respond to a user withdrawing an appendage from a position that indicates a region 902, 903 containing searchable informational elements 931, 1031 or other such configuration features (a virtual representation of a network subsystem or other menu option visible to the user through goggles 551 or a viewfinder, e.g.). This can occur, for example, in a context in which optical condition detection module 505 is configured to recognize a photographic record of such withdrawal as a corroborating indication 1252.

Extensive operation 3195 describes ranking a first component of a search result in relation to a second component of the search result partly based on a digital expression of a time of day and partly based on whether a confirmation of a search criterion has been received (e.g. statement module 132 reflecting a lower ranking 752 associated with a "first" hit and a higher ranking 753 associated with a "second" hit in response to the "first" hit meeting only a criterion 791 that a mobile device user has not confirmed, to the "second" hit meeting a criterion 792 that the mobile device user has confirmed, and to timing data 782 indicating that a time 3071 of day is expressed in both the first and second hits or neither the first and second hits). This can occur, for example, in a context in which an interface 1210 that includes media 705, 3005 is operably coupled with dialog manager 110 and with process control unit 2710 (within or via one or more networks 190, 1290, 2790, 2990 described herein, e.g.); in which the user (as shown in FIG. 2, e.g.) provides a gesture or other corroborating indication 1252 of criterion 792 as input 3088 via mobile device 2780; in which one of search results 361-367 include the "first" hit; in which one of search results 721-724 include the "second" hit; and in which statement module 132 implements an output module optimized for mobile device invocation 2971. Alternatively or additionally, statement module 132 may be configured to award an incrementally higher ranking 753 to search hits 1351, 1352 within a time interval 304 relating to a current time 3071 of day (a 12- or 24-hour expression provided by a working clock within mobile device 2780, e.g.).

In light of teachings herein, numerous existing techniques may be applied for configuring special-purpose circuitry or other structures effective for combining and ranking search results as described herein without undue experimentation. See, e.g., U.S. Pat. No. 8,046,371 ("Scoring local search results based on location prominence"); U.S. Pat. No. 8,046,346 ("System and method for improving integrity of interne search"); U.S. Pat. No. 8,041,715 ("Sponsored search results re-ranking based on linking associations"); U.S. Pat. No. 8,037,071 ("Methods and systems for dynamically rearranging search results into hierarchically organized concept clusters"); U.S. Pat. No. 8,036,937 ("Computer-implemented method and system for enabling the automated selection of keywords for rapid keyword portfolio expansion"); U.S. Pat. No. 8,032,535 ("Personalized web search ranking"); U.S. Pat. No. 8,024,324 ("Information retrieval with unified search using multiple facets"); U.S. Pat. No. 8,010,528 ("Problem isolation through weighted search of knowledge bases"); U.S. Pat. No. 7,974,974 ("Techniques to perform relative ranking for search results"); U.S. Pat. No. 7,984,032 ("Iterators for applying term occurrence-level constraints in natural language searching"); U.S. Pat. No. 7,769,740 ("Systems and methods of ranking attention").

Extensive operation 3198 describes causing a first search term and a second search term to be transmitted to a mobile device after initiating a first search using the first search term and after initiating a second search using the second search term (e.g. search term presentation module 2973 causing search terms 3095, 3096 to be transmitted from interface device 242 to interface device 252 after interface device 242 triggers corresponding search tasks 3081, 3082 to be initiated). This can occur, for example, in a context in which primary unit 2910 and medium 3005 reside in interface device 252 or network 280; in which one or more search engines 182, 282 perform search task 3081 using search term 3095; in which one or more search engines 282 perform another search task using search term 3096; and in which statement module 424 causes one or more rankings 675, 676 or other results 690 from these searches to be displayed via interface device 242. Alternatively or additionally, in some variants, search term presentation module 2973 and statement module 424 may be configured to perform operation 3198 jointly by transmitting both the search terms 3095, 3096 and the search results 690 to the receiving interface device 252 (responsive to a movement status identifier 109, 1609 or other such parameter 387 indicating that interface device 252 is apparently active).

In light of teachings herein, numerous existing techniques may be applied for configuring special-purpose circuitry or other structures effective for caching, archiving, retrieving, or otherwise communicating search terms as described herein without undue experimentation. See, e.g., U.S. Pat. No. 8,032,508 ("System and method for URL based query for retrieving data related to a context"); U.S. Pat. No. 8,024,335 ("System and method for dynamically generating a selectable search extension"); U.S. Pat. No. 8,015,065 ("Systems and methods for assigning monetary values to search terms"); U.S. Pat. No. 7,865,494 ("Personalized indexing and searching for information in a distributed data processing system"); U.S. Pat. No. 7,853,626 ("Computational systems for biomedical data"); U.S. Pat. No. 7,853,586 ("Highlighting occurrences of terms in documents or search results"); U.S. Pat. No. 7,849,090 ("System, method and computer program for faceted classification synthesis"); U.S. Pat. No. 7,844,594 ("Information search, retrieval and distillation into knowledge objects"); U.S. Pat. No. 6,539,353 ("Confidence measures using sub-word-dependent weighting of sub-word confidence scores for robust speech recognition").

Figure 32:
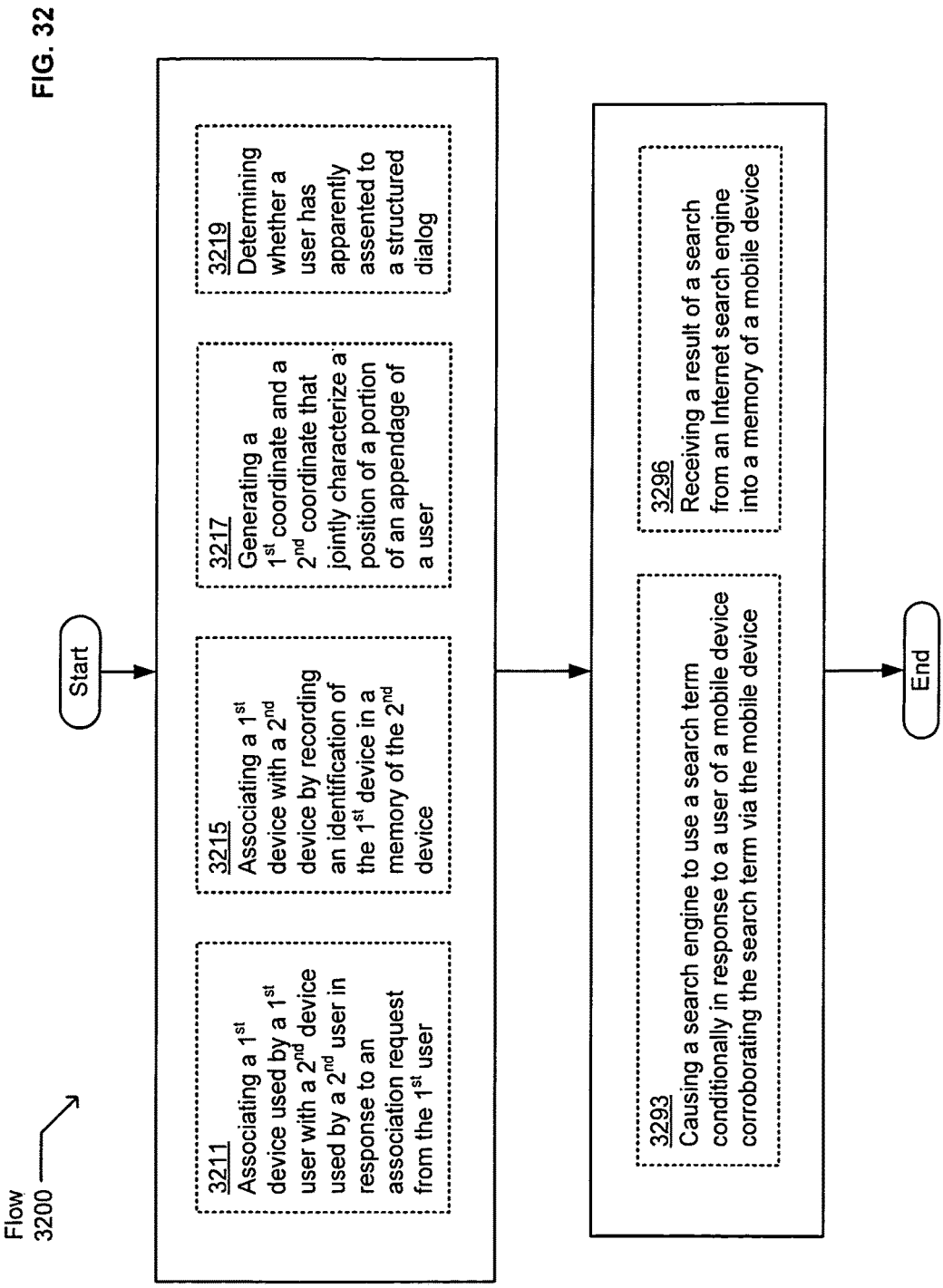

With reference now to flow 3200 of FIG. 32 and to other flows 17-25, 3100 described above, in some variants, one or more intensive operations 3211, 3215, 3217, 3219 described below may be performed in conjunction with one or more intensive operations described above. Alternatively or additionally, one or more extensive operations 3293, 3296 described below may likewise comprise or be performed in conjunction with one or more extensive operations described above.

Intensive operation 3211 describes associating a first device used by a first user with a second device used by a second user in response to an association request from the first user (e.g. association module 175 generating a record 3091 identifying interface device 271 at interface device 261, a record 3092 identifying interface device 261 at interface device 271, or a record identifying both interface device 261 and interface device 271 at interface device 291). This can occur, for example, in a context in which interface device 271 (as the "first" device) is the used by user 270 while interface device 261 is used by someone else (user 260, e.g.); in which the "first" or "second" device implement or access device 460 and medium 3005; and in which user 270 enters a menu selection or other input 3085 identifying at least interface device 261 as the "second" device to which the "first" device is to be associated. In some variants, for example, association module 175 can reside on one or both interface devices or elsewhere in networks 290, 490 described above. Alternatively or additionally, such associations 495 can result as an automatic response to an interaction between the first and second devices (e.g. a telephone call, synch operation, or shared subscription).

In light of teachings herein, numerous existing techniques may be applied for configuring special-purpose circuitry or other structures effective for associating devices with users or other devices as described herein without undue experimentation. See, e.g., U.S. Pat. No. 8,041,035 ("Automatic configuration of devices upon introduction into a networked environment"); U.S. Pat. No. 8,031,596 ("Router associated to a secure device"); U.S. Pat. No. 7,954,137 ("Method and approach for linking of devices within a communication system"); U.S. Pat. No. 7,930,324 ("Information organization and navigation by user-generated associative overlays"); U.S. Pat. No. 7,860,887 ("Cross-media storage coordination"); U.S. Pat. No. 7,685,264 ("System displaying a collection of network settings for a user to adjust and associate the settings with a network profile"); U.S. Pat. No. 7,570,598 ("Communication devices capable of wireless interfacing and methods for associating said devices"); U.S. Pat. No. 7,216,167 ("System allowing user associating user off-line status messages of selectable content with participants on user's authorized access lists"); U.S. Pat. No. 6,970,879 ("Method of constructing and displaying an entity profile constructed utilizing input from entities other than the owner"); U.S. Pat. No. 6,957,229 ("System and method for managing personal information"); U.S. Pat. No. 6,301,609 ("Assignable associate priorities for user-definable instant messaging buddy groups").

Intensive operation 3215 describes associating a first device with a second device by recording an identification of the first device in a memory of the second device (e.g. association module 174 storing a record 679 containing an Internet Protocol address 427 of device 410 in a memory 680 of interface device 272). This can occur, for example, in a context in which one of the interface devices as described herein receives input 546 from one or more device owners or other users 270 (as part of a query/response dialog 587 or other structure dialog 588 as described herein, e.g.) and in which such a configuration manifests an association 494 between device 410 (as the "first" device, e.g.) and device 272 (as the "second" device, e.g.) responsive to such input 546. Alternatively or additionally, association 494 can be manifested by association module 174 storing a telephone number 771, serial number 772, or other such device-specific identifier 775 of device 272 (as the "first" device, e.g.) in a memory 780 of device 410 (as the "second" device, e.g.).

Intensive operation 3217 describes generating a first coordinate and a second coordinate that jointly characterize a position of a portion of an appendage of a user (e.g. estimation module 452 generating a horizontal coordinate 463 and a vertical coordinate 464 of a lateral-most point 628 of the portion of image 623 depicting the user's opposite hand). This can occur, for example, in a context in which the appendage is a hand or finger; in which primary unit 2910 implements device 460; and in which such coordinates are expressed in pixels and can be used to facilitate one or more high level flows 17-25 as described above. In some variants of flows 18-20, for example, such coordinates can constitute or facilitate recognizing the position of the first limb of the person. Alternatively or additionally, such coordinates can be used to estimate a position of a limb or other body part in a 3-dimensional spatial model (expressed as coordinates 465 relative to the device 460 or planet, e.g.). In some contexts, for example, such devices may include a through-the-lens (TTL) meter 2915 or autofocus (AF) system 2916 configured to generate an estimate of a position (of a body part, e.g.) relative to the device.

In light of teachings herein, numerous existing techniques may be applied for configuring special-purpose circuitry or other structures effective for estimating a position or movement of an item as described herein without undue experimentation. See, e.g., U.S. Pat. No. 7,990,550 ("Method and system for determining position and orientation of an object"); U.S. Pat. No. 7,957,555 ("Method and apparatus for localizing an object part in digital image data by updating an initial position estimate based on a displacement of the object part"); U.S. Pat. No. 7,880,608 ("System and method for person or object position location utilizing impulse radio"); U.S. Pat. No. 7,804,981 ("Method and system for tracking position of an object using imaging and non-imaging surveillance devices"); U.S. Pat. No. 7,663,485 ("Apparatus for identifying objects using radio frequency and apparatus and method for tracking position of object using the same"); U.S. Pat. No. 6,894,716 ("Method and apparatus for identifying a position of a predetermined object in free space using a video image"); U.S. Pat. No. 6,730,926 ("Sensing head and apparatus for determining the position and orientation of a target object"); U.S. Pat. No. 6,674,361 ("Method and system for determining the position of a wanted object which is positioned in a row of objects and is provided with a transponder"); U.S. Pat. No. 6,437, 561 ("System for determining the position of an object with respect to a magnetic field sources").

Intensive operation 3219 describes determining whether a user has apparently assented to a structured dialog (e.g. user preference recognition module 2965 detecting input 545 that includes a positive indication 483 in response to a query 2911 asking "Would you like a structured dialog?"). This can occur, for example, in a context in which primary unit 2910 implements device 410 and device 580; in which primary unit 2910 also includes one or more media 605, 705 as described above; and in which such a query is played or displayed to a user or in which the user invokes a "smart features" button 2912 or similar control to trigger structured dialog 588. In some variants, for example, a detection of such input or other events selectively enables event/condition logic 510 or activate other recognition logic by which one or more users (as shown in FIG. 2, e.g.) can specify search criteria or otherwise manifest preferences (in gestures or speech or by other forms of data entry, e.g.) that can initiate or otherwise affect search tasks 611-618 described herein.

In light of teachings herein, numerous existing techniques may be applied for configuring special-purpose circuitry or other structures effective for detecting a user response to a structured query as described herein without undue experimentation. See, e.g., U.S. Pat. No. 8,032,480 ("Interactive computing advice facility with learning based on user feedback"); U.S. Pat. No. 8,001,108 ("Returning a new content based on a person's reaction to at least two instances of previously displayed content"); U.S. Pat. No. 7,774,713 ("Dynamic user experience with semantic rich objects"); U.S. Pat. No. 7,610,346 ("User confirmation for retransmission of compressed e-mail attachments"); U.S. Pat. No. 7,600,015 ("User confirmation in data downloading"); U.S. Pat. No. 7,599,950 ("Systems and methods for collecting user annotations"); U.S. Pat. No. 7,545,917 ("System for accessing data via voice"); U.S. Pat. No. 7,539,656 ("System and method for providing an intelligent multi-step dialog with a user"); U.S. Pat. No. 6,236,885 ("System for correlating in a display stimuli and a test subject's response to the stimuli"); U.S. Pat. No. 6,236,884 ("System for recording stimuli and a plurality of test subject's response to the stimuli").

Extensive operation 3293 describes causing a search engine to use a search term conditionally in response to a user of a mobile device corroborating the search term via the mobile device (e.g. invocation module 2963 initiating a search task 712 using a search criterion 335 that includes the search term 3045 if a user 270 wears or carries a portable article 560 that transmits a corroborating indication 1252 that confirms a preliminary indication 1251 of the search term 3045). This can occur, for example, in a context in which primary unit 2910 implements an interface device 310 that includes transmission or storage media 705, 3005; in which the wearable or other article 560 is the mobile device 2780 via which the corroborating indication 1252 is provided; in which article 560 presents the search term 3045 to user 270 in response to the preliminary indication; and in which search term corroboration module 2932 triggers invocation module 2963 if the corroborating indication 1252 is detected and otherwise generally does not trigger invocation module 2963. In some contexts, for example, user 270 may corroborate the search term 3045 in response to a prompt 702 by validating an expression 3046 manifesting a search criterion 335 having two or more components (combined by "and" or "or," e.g.) of which one is the search term 3045.

Such validation may be expressed with auditory data 656, a control activation, or other forms of user input 547 as described herein.

In light of teachings herein, numerous existing techniques may be applied for configuring special-purpose circuitry or other structures effective for weighting or other conditional use of terms in a search as described herein without undue experimentation. See, e.g., U.S. Pat. No. 8,010,528 ("Problem isolation through weighted search of knowledge bases"); U.S. Pat. No. 7,945,571 ("Application of weights to online search request"); U.S. Pat. No. 7,716,202 ("Determining a weighted relevance value for each search result based on the estimated relevance value when an actual relevance value was not received for the search result from one of the plurality of search engines"); U.S. Pat. No. 7,194,458 ("Weighted preference data search system and method"); U.S. Pat. No. 6,718,365 ("Method, system, and program for ordering search results using an importance weighting"); U.S. Pat. No. 6,714,929 ("Weighted preference data search system and method").

Extensive operation 3296 describes receiving a result of a search from an Internet search engine into a memory of a mobile device (e.g. search result input module 2933 receiving one or more results 724 arising from a search task 711 being performed by or having been performed by Internet search engine 2992). This can occur, for example, in a context in which medium 705 comprises a memory of primary unit 2910, in which one of the interface devices described herein implements primary unit 2910 in a mobile device 2780, and in which at least one of the search results 724 was requested via the mobile device 2780. Alternatively or additionally, the search task 711 may have been initiated by the mobile device 2780 or by an interface device (as shown in FIG. 2, e.g.) associated the mobile device 2780. In some variants, moreover, Internet search engine 2992 can include or otherwise interact with an output module optimized for mobile device invocation 2971 or other modules configured as described herein.

In light of teachings herein, numerous existing techniques may be applied for configuring special-purpose circuitry or other structures effective for caching or otherwise holding search results in a mobile device as described herein without undue experimentation. See, e.g., U.S. Pat. No. 8,018,439 ("Mobile appliance system and method enabling efficient entry"); U.S. Pat. No. 7,996,487 ("Managing searches on mobile devices"); U.S. Pat. No. 7,921,154 ("System and method of live data search on a mobile device"); U.S. Pat. No. 7,873,620 ("Desktop search from mobile device"); U.S. Pat. No. 7,477,909 ("System and method for conducting a search using a wireless mobile device"); U.S. Pat. No. 7,275,049 ("Method for speech-based data retrieval on portable devices"); U.S. Pat. No. 6,901,473 ("Apparatus and method for configuring an external device").

With reference now to flow 3300 of FIG. 33 and to other flows 17-25, 3100, 3200 described above, in some variants, one or more intensive operations 3316, 3317 described below may be performed in conjunction with one or more intensive operations described above. Alternatively or additionally, one or more extensive operations 3392, 3399 described below may likewise comprise or be performed in conjunction with one or more extensive operations described above.

Intensive operation 3316 describes adjusting a rectangular image component aspect ratio in response to an indication of a symbol adjacent an edge of a portion of an image (e.g. aspect ratio adjustment module 2871 adjusting one or more regions 632, 1102 in response to an indicator 3015 that the boundary thereof is next to one or more parts of a character sequence 2845 or other informational element 932). This can occur, for example, in a context in which such a region 632, 2652 is initially square and is expanded or contracted (laterally or vertically, e.g.) by small increments until one or more informational elements 371-376 (a name, word, logo, or license plate, e.g.) that were bisected are either fully included or fully excluded. Alternatively or additionally, one or more annular regions or outlines 2648 derived from a control or limb position or other criteria described herein may establish an initial position of the "portion of the image."

In light of teachings herein, numerous existing techniques may be applied for configuring special-purpose circuitry or other structures effective for locating symbols, faces, or other shapes in an image as described herein without undue experimentation. See, e.g., U.S. Pat. No. 7,986,828 ("People detection in video and image data"); U.S. Pat. No. 7,912,288 ("Object detection and recognition system"); U.S. Pat. No. 7,856,142 ("Methods and systems for detecting character content in a digital image"); U.S. Pat. No. 7,787,692 ("Image processing apparatus, image processing method, shape diagnostic apparatus, shape diagnostic method and program"); U.S. Pat. No. 7,630,544 ("System and method for locating a character set in a digital image"); U.S. Pat. No. 7,590,275 ("Method and system for recognizing a candidate character in a captured image"); U.S. Pat. No. 7,526,123 ("Estimating facial pose from a sparse representation"); U.S. Pat. No. 7,454,067 ("Symbol classification depending on cluster shapes in difference image"); U.S. Pat. No. 7,403,656 ("Method and apparatus for recognition of character string in scene image"); U.S. Pat. No. 6,700,604 ("Image capturing method and apparatus for determining a shape of an object"); U.S. Pat. No. 6,175,664 ("Optical character reader with tangent detection for detecting tilt of image data").

Intensive operation 3317 describes responding to an indication of a symbol adjacent an edge of a region of an image by adjusting a size of the region of the image (e.g. region size adjustment module 2872 responding to an indicator 3015 that one or more outlines 2648 of one or more selection regions 2651-2654 in an image 2630-2636 crosses one or more parts of a character sequence 2845 or other informational element 932 by adjusting their area). This can occur, for example, in a context in which such a region simultaneously or alternatively undergoes operation 3316. Alternatively or additionally, region size adjustment module 2872 may be configured to trigger a capture of an image of a larger field of view (depicting region 1103 or region 1106, e.g.) conditionally in response to determining that informational content is apparently cut off by an outermost edge of the image itself.

Extensive operation 3392 describes triggering a search task by transmitting a search expression to a search engine as a real time response to detecting a component of the search expression in a component of a vocalization (e.g. search agent 2862 transmitting to one or more search engines 182, 282 a command or request 2849 to perform a search task 3084 using at least one search term 3099 extracted from auditory data 3003). This can occur, for example, in a context in which an interface device of FIG. 2 includes one or more media 3005, implements interface system 2800, and resides in one or more networks 890, 990, 1090, 1290 described above; in which interface system 2800 implements one or more devices 580, 1010, 1110 described above; in which event/condition detection logic 510 (speech recognition module 3009, e.g.) monitors auditory data 3001-3003 from one or more microphones 941, 1041, 1141 for recognizable elements; and in which search agent 2862 responds to speech recognition module 3009 recognizing search term 3099 (a spoken word or name, e.g.) by configuring the search expression to include search term 3099 without awaiting a corroborating indication 1252 or other confirmatory indications from a user.

Extensive operation 3399 describes triggering an anticipatory search task by transmitting a search expression to a remote search engine in response to detecting a component of the search expression in a component of a visual image without first detecting a confirmation of the search expression (e.g. search agent 2861 requesting one or more off-site search engines 182, 282 to perform a search task 713 using one or more search criteria 119 that include one or more search terms 3098 generated by OCR module 2850 without search criteria 119 first having been validated by a user of interface system 2800). This can occur, for example, in a context in which dialog manager includes one or more media 705, 3005 described herein; in which interface system 2800 is operably coupled with dialog manager 110 and implements one or more network-connected interface devices (depicted in FIG. 2, e.g.) described herein; in which OCR module 2850 and search agent 2861 perform operation 3399 jointly; and in which search task 713 is performed as a background process. Alternatively or additionally, one or more servers 284 may configured to initiate such anticipatory searching in response to one or more of a system load indicator 3011 being below a threshold 3021; a user status indicator 3012 being above a threshold 3022 (as a premium subscriber, e.g.); an indicator 3013 of informational elements (a count, e.g.) in a region of an image being below a threshold 3023; a rate indicator 3014 (a percent of prior indications, e.g.) of user corroboration being above a threshold 3024; or other such indicia bearing in favor of anticipatory searching.

In light of teachings herein, numerous existing techniques may be applied for configuring special-purpose circuitry or other structures effective for performing an anticipatory search as described herein without undue experimentation. See, e.g., U.S. Pat. No. 8,037,070 ("Background contextual conversational search"); U.S. Pat. No. 8,036,937 ("Computer-implemented method and system for enabling the automated selection of keywords for rapid keyword portfolio expansion"); U.S. Pat. No. 8,027,974 ("Method and system for URL autocompletion using ranked results"); U.S. Pat. No. 8,032,518 ("System and method for enabling website owners to manage crawl rate in a website indexing system"); U.S. Pat. No. 7,987,490 ("System and method to acquire, aggregate, manage, and distribute media"); U.S. Pat. No. 7,987,189 ("Content data indexing and result ranking"); U.S. Pat. No. 7,979,461 ("Extended index searching"); U.S. Pat. No. 7,895,221 ("Internet searching using semantic disambiguation and expansion"); U.S. Pat. No. 7,437,364 ("System and method of accessing a document efficiently through multi-tier web caching").

With reference now to flow 3400 of FIG. 34 and to other flows 17-25, 3100, 3200, 3300 described above, in some variants, one or more intensive operations 3411, 3412, 3415, 3418 described below may be performed in conjunction with one or more intensive operations described above. Alternatively or additionally, one or more extensive operations 3494, 3497 described below may likewise comprise or be performed in conjunction with one or more extensive operations described above.

Intensive operation 3411 describes comparing a local time with temporal data in a first cached document and with temporal data in a second cached document (e.g. one or more pattern recognition modules 104 or other content filters 2738 determining whether any time-of-day indications 484 result from processing content 370). This can occur, for example, in a context in which content 370 includes a preliminary search result 367 and in which indication 484 signals whichever content 370 contains a text string 1631 matching the pattern "#:%" (in which "#" signifies a digit 0-9 and in which "%" signifies a digit 0-5, e.g.). Alternatively or additionally indication 484 may be configured to signal a result 366 of one or more other time-of-day-related search criteria 332 being applied to content 370 being searched (e.g. searching for an instance of character sequences like "afternoon" or "midnight" therein). Such basic configurations of pattern recognition module 104 may be suitable for implementation locally, for example, being executed on a handheld 340, wearable, or other portable interface 390. This can occur, for example, in a context in which search engine 182 provides interface-type-invariant search results 366 that are then sifted locally (within a vicinity of user 230, e.g.). Alternatively or additionally, more complex configurations of pattern recognition module 104 may be suitable for implementation centrally, for example, being executed on a search engine 182 (on server 284, e.g.) that tags each hit according to an outcome of the one or more time-of-day-related search criteria 332.

Intensive operation 3412 describes initiating a search using a character obtained from a photograph (e.g. optical character recognition module 2850 and search initiation module 2761 jointly responding to a pictographic element 1226, name element 932, or other expression 2846 of one or more characters 2851 by including the expression 2846 as a search term 2847 in a search request 2848 submitted to one or more search engines 182, 282). This can occur, for example, in a context in which process control unit 2710 is operably coupled with interface system 2800 and one or more networks 190, 290, 990, 1290 described above; in which optical character recognition module 2850 determines whether one or more images 621-627, 2630-2636 (depicting or comprising one or more photographs 3077, e.g.) include the recognizable character(s) 2851; and in which one or more intensive operations 34-45 described herein incorporate or otherwise trigger operation 3412. Alternatively or additionally, one or more media 605, 705, 2605 may (optionally) be configured to transmit or store such images or character(s) 2851.

In light of teachings herein, numerous existing techniques may be applied for configuring special-purpose circuitry or other structures effective for initiating a search using information obtained from visual or auditory media as described herein without undue experimentation. See, e.g., U.S. Pat. No. 7,962,500 ("Digital image retrieval by aggregating search results based on visual annotations"); U.S. Pat. No. 7,809,722 ("System and method for enabling search and retrieval from image files based on recognized information"); U.S. Pat. No. 7,809,563 ("Speech recognition based on initial sound extraction for navigation and name search"); U.S. Pat. No. 7,684,991 ("Digital audio file search method and apparatus using text-to-speech processing"); U.S. Pat. No. 7,680,324 ("Use of image-derived information as search criteria for internet and other search engines"); U.S. Pat. No. 7,272,558 ("Speech recognition training method for audio and video file indexing on a search engine"); U.S. Pat. No. 6,480,819 ("Automatic search of audio channels by matching viewer-spoken words against closed-caption/audio content for interactive television"); U.S. Pat. No. 6,005,978 ("Robust search for image features across image sequences exhibiting non-uniform changes in brightness").

Intensive operation 3415 describes displaying a search expression that includes a character sequence obtained from a photograph (e.g. search term confirmation module 2751 causing a cathode ray tube, flat screen, or other display 672 to display two or more letters, digits, or other such elements 375 in order as a search term 2847 in response to comparison logic 2740 recognizing such a sequenced expression 2846 of two or more characters in one or more photographic images 623-627, 1121-1122). This can occur, for example, in a context in which display 672 comprises a medium 605 configured as an output 392, 1432, 2892 of a mobile device 2780; in which comparison logic 2740 includes one or more character recognition modules 2731, sequence recognition modules 2734, or other such content filters 2738 that recognize such characters; and in which a user has an opportunity to corroborate one or more portions 2671, 2672 of the resulting (displayed) search expression 2840. In some variants, for example, such elements 375 may (optionally) include ASCII characters or pictographic elements 1226 or similar linguistic graphical expressions in a particular sequence (forming a name, suggestion, or phrase, e.g.). Alternatively or additionally, a display control module 2975 can perform operation 3415 concurrently with an anticipatory search task 3083 initiated upon the same search expression 2840.

In light of teachings herein, numerous existing techniques may be applied for configuring special-purpose circuitry or other structures effective for extracting search terms from visual or auditory media as described herein without undue experimentation. See, e.g., U.S. Pat. No. 7,962,500 ("Digital image retrieval by aggregating search results based on visual annotations"); U.S. Pat. No. 7,809,722 ("System and method for enabling search and retrieval from image files based on recognized information"); U.S. Pat. No. 7,809,563 ("Speech recognition based on initial sound extraction for navigation and name search"); U.S. Pat. No. 7,684,991 ("Digital audio file search method and apparatus using text-to-speech processing"); U.S. Pat. No. 7,680,324 ("Use of image-derived information as search criteria for internet and other search engines"); U.S. Pat. No. 7,272,558 ("Speech recognition training method for audio and video file indexing on a search engine"); U.S. Pat. No. 6,480,819 ("Automatic search of audio channels by matching viewer-spoken words against closed-caption/audio content for interactive television"); U.S. Pat. No. 6,249,603 ("Efficient search for a gray-level pattern in an image"); U.S. Pat. No. 6,005,978 ("Robust search for image features across image sequences exhibiting non-uniform changes in brightness").

Intensive operation 3418 describes expressing a search term at a first interface that includes a character sequence obtained from a second interface (e.g. search term confirmation module 2752 displaying, at interface device 460, an indication 486 (a word, phrase, or other character sequence, e.g.) that was earlier used as a search term 3097 in another search initiated on another device 262). This can occur, for example, in a context in which one or more association modules 171-176 associate both devices 262, 460 with an owner in common (user 260, e.g.) and with each other; in which network 290 includes other networks 190, 490 operably coupled with medium 3005; and in which user 260 has provided input 3087 manifesting an intention to initiate a search task (by selecting a search engine identifier on interface device 460, e.g.). Alternatively or additionally, search term confirmation module 2752 may perform operation 3418 in response to one or more other attributes in common between such devices 262, 460: both being in the same proximity (close enough to provide direct communications therebetween, wireless or otherwise, e.g.); both having the same movement identifier 109, 1609; or both being the same class or model of device.

In light of teachings herein, numerous existing techniques may be applied for configuring special-purpose circuitry or other structures effective for performing searches using terms obtained from a remote interface as described herein without undue experimentation. See, e.g., U.S. Pat. No. 7,493,303 ("Method for remotely searching a local user index"); U.S. Pat. No. 7,480,941 ("System, method and computer program product for performing one or more maintenance tasks on a remotely located computer connected to a server computer via a data network"); U.S. Pat. No. 7,430,555 ("System and method for transacting retrieval of real estate property listings using a remote client interfaced over an information network"); U.S. Pat. No. 7,386,554 ("Remote scoring and aggregating similarity search engine for use with relational databases"); U.S. Pat. No. 7,107,536 ("Remote-agent-object based multilevel browser").

Extensive operation 3494 describes highlighting a first portion of an image without highlighting a remainder of the image, the first portion having a location that depends upon whether the image depicts an appendage of a user (e.g. selective highlighting module 2941 enhancing one or more images 2630-2636 depicted in a display by changing a visible characteristic of one or more elements 931, 932 or regions 2651-2654 that make up a portion 2677 of the image). This can occur, for example, in a context in which primary unit 2910 implements device 962, interacts with dialog manager 110, and includes one or more media 605, 705, 2605; in which the image is adapted from a raw photographic image 2630 depicting a user's hand or arm 968; in which the "first portion" is a region of the image that selective highlighting module 2941 defines in response to pattern recognition module 105 locating a depiction 2644 of the appendage in the image; and in which selective highlighting module 2941 makes the region brighter or generates one or more outlines 2648 circumscribing a perimeter of the region to implement the highlighting. In some contexts, selective highlighting module 2941 may be configured to highlight a region 2651 having an inner lower corner 2641 with a vertical position near a highest point 629 of the depiction 2644 and a horizontal position near a lateral-most point 628 of the depiction 2644, the region extending to the upper corner 2642 of the image 2632 farther from the depiction 2644 (the upper left, for example, for a typical right-handed depiction). Alternatively or additionally, such highlighting can be displayed in alternation with a corresponding non-highlighted image so that the highlighting implements a "blinking" appearance without continuously obscuring original pixel content (of the raw image, e.g.) collocated therewith.

In other variants, the "first portion" can comprise a square region 2652 that intersects the depiction 2644 (by up to 50% of the area of the depiction 2644, e.g.) and extends less than all of the way (55% to 99% of the way, for example, relative to the proximal corner 2641) to the "farther" corner 2642. Alternatively or additionally, a remainder of the image 2630 (e.g. regions 2661, 2662) may undergo image modification or deletion as described below.

In other variants, a perimeter outline or other "second" region or other portion 2674 of the image 2630 (region 2664, e.g.) circumscribes the depiction 2644 of the appendage so that the "first" portion defines the remainder of the image 2630. In some contexts selective highlighting module 2941 may be configured to highlight such a large region 2665 (larger than 50% of the image, e.g.) in which no particular informational element has yet been recognized. Alternatively or additionally, selective highlighting module 2941 may be configured to highlight a more selective region as one or more such elements 931, 932, 1031, 1032, 1226 are identified (such as by identifying one or more square outlines 2648 or other annular shapes are substantially monochromatic. In some contexts, moreover, selective highlighting module 2941 may be configured to select some regions over others in some contexts: a smaller region 2653 that encompasses an element 1226 (detectable as a substantial shade or hue variation within a substantially monochromatic annular boundary, e.g.), for example, may be selected in preference to a larger region 2654 that encompasses the smaller region 2653.

In light of teachings herein, numerous existing techniques may be applied for configuring special-purpose circuitry or other structures effective for highlighting detected features in displays or other visual media as described herein without undue experimentation. See, e.g., U.S. Pat. No. 7,911,482 ("Method and system for efficient annotation of object trajectories in image sequences"); U.S. Pat. No. 7,853,586 ("Highlighting occurrences of terms in documents or search results"); U.S. Pat. No. 7,639,396 ("Editing of digital images, including (but not limited to) highlighting and shadowing of image areas"); U.S. Pat. No. 7,555,159 ("Image highlight correction using illumination specific HSV color coordinate"); U.S. Pat. No. 7,119,814 ("System and method for annotation on a moving image Extensive operation 3497 describes performing an image modification upon a first region of a photographic image without performing the image modification upon a remainder of the photographic image, the first region having a location that depends upon whether the photographic image includes a semblance of an appendage (e.g. selective modification module 2942 invoking a data compression module 2945 selectively upon a portion 2675 of an image 2630, 2631 representing a less-significant region of the image 2630, 2631). This can occur, for example, in a context in which one or images 2630-2636 is the photographic image, in which user 270 has his/her hand or arm 968 within a field of view of an interface device (as described herein, e.g.) so that the photographic image includes a depiction 2644 of the appendage, in which user 270 designates one of regions 2661-2664 as the "less-significant" region by such appendage positioning, and in which significant processing or storage resources are expended upon the "more-significant" remainder (i.e. portion 2676). Such expenditures may include algorithms for reducing granularity or other manifestations of non-informative data (noise, e.g.), for categorizing an element (as a face, pictograph, linguistic character, or other particular shape or type, e.g.), for performing a search, or other such processing-intensive tasks. Such expenditures may likewise include preserving an image of the "more-significant" portion 2676 at a higher-than-typical resolution (more than 10 megapixels in size, e.g.) while discarding some or all of the "less-significant" portion 2675. In some variants, for example, selective modification module 2942 may attenuate such "less-significant" portions by invoking one or more data compression modules 2945, selective retention module 2943, 2944, caching or other archiving modules, or other such components incorporated or otherwise described herein.

In light of teachings herein, numerous existing techniques may be applied for configuring special-purpose circuitry or other structures effective for modifying an image or other visual media as described herein without undue experimentation. See, e.g., U.S. Pat. No. 8,045,822 ("Correction of image distortion"); U.S. Pat. No. 8,044,968 ("Image processing device, color correction table generation device, display device, image processing method, color correction table generation method, color adjustment method for display device, and image processing program"); U.S. Pat. No. 8,041,092 ("Apparatus and method adapted to correct image data acquired by image detector"); U.S. Pat. No. 8,035,600 ("Image contrast correction system and method thereof"); U.S. Pat. No. 8,023,157 ("Image data correcting device for correcting image data to remove back projection without eliminating halftone image"); U.S. Pat. No. 8,023,012 ("Image capture device correcting defective pixel information"); U.S. Pat. No. 8,005,310 ("Method and device for interpolation and correction of an image"); U.S. Pat. No. 7,995,240 ("Image-forming device capable of forming and correcting color image"); U.S. Pat. No. 6,094,510 ("Image processing apparatus and method for predicting a compression rate of image data processed to modify an image").

With reference now to flow 3500 of FIG. 35 and to other flows 17-25, 3100, 3200, 3300, 3400 described above, in some variants, one or more intensive operations 3513, 3516, 3518, 3519 described below may be performed in conjunction with one or more intensive operations described above. Alternatively or additionally, one or more extensive operations 3591, 3595 described below may likewise comprise or be performed in conjunction with one or more extensive operations described above.

Intensive operation 3513 describes highlighting an areal portion of an image selectively in response to a position of a depiction of an appendage in the image (e.g. display control module 2975 invoking one or more region selection modules 2974 that brighten or outline one or more regions 632, 1007, 1008, 1102, 1245 of an image 623, 1021, 1102, 1231 in response to a depiction of a finger, hand, or arm therein). This can occur, for example, in a context in which such regions depict informational elements 371-376, 931, 932, 1226 or other image portions (depicting the appendage, e.g.) conditionally detected in response to such depictions; in which the appendage extending into the lower right corner of the image (typical for a right-handed user, e.g.) has been determined, and in which one or more of the above-described systems 3-16 includes a device that implements primary unit 2910. In a context in which pattern recognition module 521 computes a leftmost point 628 or highest point 629 of a region 633 depicting a hand or arm, for example, a point within the horizontally elongate rectangle therebetween (defined by a lower left point 628 and an upper right point 629, e.g.) may define a lower right corner of a rectangular region 632 in the upper left corner of image 623 so that the rectangular region bounds the "areal portion" of image 623. Alternatively or additionally, such "areal portion" may be enlarged (by up to 5% or 20%, e.g.) in each direction (rightward or downward, e.g.) as a guardband that ensures the inclusion of one or more informational elements 932 near a periphery thereof that might otherwise be truncated. In some variants, a user may then be able to select among or otherwise corroborate one or more of the highlighted element(s) as described herein. Alternatively or additionally, as resource availability permits, such selective highlighting may facilitate favoritism in the handling of the highlighted portion (manifested as one or more of a default selection status, a more comprehensive retention, or anticipatory searching as described herein, for example).

In light of teachings herein, numerous existing techniques may be applied for configuring special-purpose circuitry or other structures effective for recognizing features in an image as described herein without undue experimentation. See, e.g., U.S. Pat. No. 8,045,805 ("Method for determining whether a feature of interest or an anomaly is present in an image"); U.S. Pat. No. 7,903,880 ("Image processing apparatus and method for detecting a feature point in an image"); U.S. Pat. No. 7,715,659 ("Apparatus for and method of feature extraction for image recognition"); U.S. Pat. No. 7,623,707 ("Hierarchically locating a feature in a digital image"); U.S. Pat. No. 7,599,566 ("Image feature identification and motion compensation apparatus systems and methods"); U.S. Pat. No. 7,333,648 ("Feature quantification from multidimensional image data"); U.S. Pat. No. 7,054,476 ("Apparatus for automatically setting measurement reference element and measuring geometric feature of image"); U.S. Pat. No. 7,020,591 ("Partial differential equation model for image feature extraction and identification"); U.S. Pat. No. 6,904,437 ("Date formatting system"); U.S. Pat. No. 6,430,307 ("Feature extraction system and face image recognition system").

Intensive operation 3516 describes recognizing a literal expression of a time signifying when a specific time interval begins (e.g. one or more pattern recognition modules 522, 523 recognizing one or more literal expressions 3047 of a weekday, date 3051, or time 3071 of day). This can occur, for example, in a context in which a web crawler or similar bot implementing pattern recognition module 522 encounters and indexes medium 3005; in which medium 3005 contains an expression of a play or movie start 3061, hours of operation for a store, class times 3072, or other components of an online schedule 3076 that contains expressions 3047 of indicative of specific time intervals 3060. Alternatively or additionally, pattern recognition module 522 may be configured to perform operation 3516 as a part of a search task 618, resulting from a user-initiated search (as an indexing task of data supply 740, e.g.) and not only in preparation for user-initiated search.

In light of teachings herein, numerous existing techniques may be applied for configuring special-purpose circuitry or other structures effective for capturing event onset information selectively as described herein without undue experimentation. See, e.g., U.S. Pat. No. 7,977,103 ("Method for detecting the onset of ovulation"); U.S. Pat. No. 7,917,357 ("Real-time detection and preservation of speech onset in a signal"); U.S. Pat. No. 7,819,823 ("System and method for detecting the onset of an obstructive sleep apnea event"); U.S. Pat. No. 7,774,062 ("Tachyarrhythmia sudden onset detection with hysteresis"); U.S. Pat. No. 7,487,401 ("Method and apparatus for detecting the onset of hard disk failures"); U.S. Pat. No. 7,441,411 ("Method and apparatus to detect onset of combustor hardware damage"); U.S. Pat. No. 7,228,240 ("Device and method for determining and detecting the onset of structural collapse"); U.S. Pat. No. 6,731,984 ("Method for providing a therapy to a patient involving modifying the therapy after detecting an onset of sleep in the patient and implantable medical device embodying same"); U.S. Pat. No. 6,704,671 ("System and method of identifying the onset of a sonic event"); U.S. Pat. No. 6,061,593 ("EEG d-c voltage shift as a means for detecting the onset of a neurological event").

Intensive operation 3518 describes obtaining a boolean expression indicative of whether content includes a literal expression of a time of day (e.g. invocation module 2961 obtaining a logic high or a logic low from pattern recognition module 523 indicative of whether content 443 includes textual content 741 or other search terms 3045 that identify a specific time of day). This can occur, for example, in a context in which primary unit 2910 implements dialog manager 110; in which one or more pattern recognition modules 103 use text string search terms like "morning" or "midnight" or an instance of timing data 781, 782 that matches with pattern terms like "6 pm" or "4:57"; and in which cache 124 includes media 705, 3005. Alternatively or additionally, pattern recognition module 523 may be configured to perform operation 3518 as a part of search task 618, resulting from a user-initiated search, not only in preparation for user-initiated search.

In light of teachings herein, numerous existing techniques may be applied for configuring special-purpose circuitry or other structures effective for evaluating temporal data in content as described herein without undue experimentation. See, e.g., U.S. Pat. No. 8,037,046 ("Collecting and presenting temporal-based action information"); U.S. Pat. No. 8,037,010 ("Spatio-temporal learning algorithms in hierarchical temporal networks"); U.S. Pat. No. 8,005,666 ("Automatic system for temporal alignment of music audio signal with lyrics"); U.S. Pat. No. 7,974,849 ("Detecting and modeling temporal computer activity patterns"); U.S. Pat. No. 7,917,458 ("Temporal-influenced geospatial modeling system and method"); U.S. Pat. No. 7,865,516 ("Associative temporal search of electronic files"); U.S. Pat. No. 7,853,420 ("Performing temporal checking"); U.S. Pat. No. 7,849,079 ("Temporal ranking of search results"); U.S. Pat. No. 7,680,340 ("Method of using temporal context for image classification").

Intensive operation 3519 describes obtaining a boolean expression indicative of whether content includes a geographic identifier (e.g. one or more pattern recognition modules 106, 107 generating a yes-or-no indication 484 of whether textual content 741 includes a location identifier 743 expressed as a place name, GPS coordinates, ZIP code, or other such expression 3049 indicative of at most a few specific geographic localities). This can occur, for example, in a context in which the generated indication 484 is a one or zero; in which expression 3049 is compared against a comprehensive list 745 or the like as described above; and in which device 460 implements one or more dialog managers 110 and media 705, 3005 as described herein. In some variants, for example, expression 3049 can be (or be compared against) one or more building numbers 3041, block numbers 3042, precinct numbers 3043, or other numbers 3044 (area codes, e.g.) indicative of one or more geographic locations. Alternatively or additionally, indication 484 may be expressed as a natural language term ("true" or "present" or an opposite of one of these, e.g.) selected between two opposite values. More generally, a boolean expression may include 1, 0, on, off, heads, tails, hit, go, yes, or other such expressions having an direct and nominally complementary opposite (as a result of an operation reciting "whether," e.g.).

In light of teachings herein, numerous existing techniques may be applied for configuring special-purpose circuitry or other structures effective for evaluating geolocation data in content as described herein without undue experimentation. See, e.g., U.S. Pat. No. 7,978,139 ("Direction finding and geolocation of wireless devices"); U.S. Pat. No. 7,804,786 ("Method and apparatus for determining path loss by combining geolocation with interference suppression"); U.S. Pat. No. 7,720,436 ("Displaying network objects in mobile devices based on geolocation"); U.S. Pat. No. 7,610,166 ("Geolocation system and method for determining mammal locomotion movement"); U.S. Pat. No. 7,072,963 ("Method and system to modify geolocation activities based on logged query information"); U.S. Pat. No. 6,750,818 ("Method and apparatus to compute the geolocation of a communication device using orthogonal projections"); U.S. Pat. No. 6,542,813 ("System and method for automatic managing geolocation information and associated references for geographic information systems"); U.S. Pat. No. 6,393,293 ("Method for rectangular parameterization of a geographic area using a geolocation algorithm").

Extensive operation 3591 describes responding to a detection of a depiction of an appendage by discarding a major portion of a photographic image without discarding a remainder of the photographic image, the remainder of the photographic image having a rectangular shape, the major portion of the photographic image encompassing more than 50% of an area of the depiction of the appendage and more than 50% of an area of the photographic image (e.g. selective retention module 2943 responding to one or more parameters 384 indicating that pattern recognition module 105 has recognized a depiction 2644 of a hand or arm 968 in image 2630, 2631 by selectively discarding a major region 2661-2663 while keeping a square region 2653, 2654 or other rectangular region 2651, 2652 of the image 2630, 2631). This can occur, for example, in a context in which the "major" portion 2673 is a majority of the photographic image (a digital file, e.g.) in terms of their sizes expressed in bytes or blocks; in which interface device 310 includes processing logic 2940 configured to perform one or more extensive operations 71-79 as described above; in which the major region 2661-2663 encompasses most or all of the depiction 2644 and most or all of the respective image 2632, 2633, 2634; in which dialog manager 110 resides in network 2990 and retains the "remainder" locally (in a memory cache 122 or other random-access medium 2605, e.g.); in which an inner corner 2641 of the remainder is derived from reference points within a raw image 2630 containing the depiction 2644 as referenced and described above; and in which maintaining a high enough resolution (to recognize a license plate in region 1102, e.g.) would otherwise not be feasible. Alternatively or additionally, in some variants, selective retention module 2943 may be configured to discard the "major" portion 2678 from a primary image 2631 in response to pattern recognition module 105 locating a depiction 2644 of the appendage in a comparable image 2630. This can occur, for example, in a context in which a region-indicative hand or arm moves quickly between image capture events (appearing or disappearing between respective images 2630, 2631, e.g.); and in which the device 962 remains stationary enough therebetween so that pattern recognition module 105 can effectively crop or otherwise compensate for any offset between "comparable" images 2630, 2631 so that the same elements 1226 are portrayed in each except for any apparently obscured by the hand or arm. Alternatively or additionally, selective retention module 2943 may perform operation 3591 by invoking a data compression module 2945 or otherwise consolidating data corresponding to such a major region, such as by discarding color information, consolidating pixels, or other such techniques by which a small minority of data for such major region may be selectively retained even as the "major" portion 2673 of data is discarded.

In light of teachings herein, numerous existing techniques may be applied for configuring special-purpose circuitry or other structures effective for retaining components of a photographic or other image selectively as described herein without undue experimentation. See, e.g., U.S. Pat. No. 7,873,620 ("Desktop search from mobile device"); U.S. Pat. No. 7,515,197 ("Digital camera capable of obtaining crop image"); U.S. Pat. No. 7,415,458 ("Computer systems and methods for operating a computer system"); U.S. Pat. No. 6,965,698 ("Image composition for use in lossy compression"); U.S. Pat. No. 6,330,369 ("Method and apparatus for limiting data rate and image quality loss in lossy compression of sequences of digital images"); U.S. Pat. No. 6,215,825 ("Stereographic image compression with image difference generation and lossy compression").

Extensive operation 3595 describes responding to a depiction of an appendage in a data file representative of a graphic image by discarding a first informational element in the data file without discarding a second informational element in the data file (e.g. selective retention module 2944 discarding element 3031 and keeping element 3032 in response to an element 3033 depicting a hand or arm 968). This can occur, for example, in a context in which device 460 implements primary unit 2910 and includes a cache 123 comprising media 2605, 3005 as described herein; in which data file 3035 includes two or more such informational elements 3031-3034 in a graphic image 2630-2636 as described above; in which element 3033 includes one or more of a negative indication 488 (a deselection, e.g.) of element 3031 or a positive indication 489 (a selection, e.g.) of element 3032; and in which a user can thus select or deselect informational elements by a hand or arm position detectable by device 460. In some variants, for example, intake module 156 can detect a real time position of the hand or arm (via a camera or other image capture module 2917, e.g.) triggering a display 672 of device 460 to present element 3033 artificially superimposed (by image processing module 142, e.g.) onto a displayed image of other elements 3031, 3032, 3034 so that the hand or arm position can be used as a high precision pointing device (for search term selection or deselection, e.g.). In some contexts, for example, such an input 3086 can be used in real time with a mobile device 2780 configured to combine these features, to adapt and finalize one or more search criteria 118, and to initiate a search task 617 thereon (via a search engine, e.g.) without requiring a stylus or mouse.

In light of teachings herein, numerous existing techniques may be applied for configuring special-purpose circuitry or other structures effective for evaluating detected features in an image or other visual media as described herein without undue experimentation. See, e.g., U.S. Pat. No. 8,040,361 ("Systems and methods for combining virtual and real-time physical environments"); U.S. Pat. No. 8,019,132 ("System for recognizing fingerprint image method and program for the same"); U.S. Pat. No. 8,013,890 ("Image processing apparatus and image processing method for recognizing an object with color"); U.S. Pat. No. 8,009,928 ("Method and system for detecting and recognizing text in images"); U.S. Pat. No. 8,005,263 ("Hand sign recognition using label assignment"); U.S. Pat. No. 7,974,493 ("Personalizing a video"); U.S. Pat. No. 7,945,099 ("System and method for use of images with recognition analysis"); U.S. Pat. No. 7,734,062 ("Action recognition apparatus and apparatus for recognizing attitude of object"); U.S. Pat. No. 7,602,942 ("Infrared and visible fusion face recognition system").

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

With respect to the numbered clauses and claims expressed below, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise. Also in the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Clauses 1. (Independent) A system comprising:
circuitry for obtaining a first parameter from a first search task initiated at a first interface device;
circuitry for obtaining a second parameter from a second interface device; and
circuitry for causing the second interface device to indicate the first parameter from the first search task initiated at the first interface device partly based on an association between the second interface device and the first interface device and partly based on the second parameter from the second interface device.

2. The system of any of the above SYSTEM CLAUSES, further comprising:
a wearable device supporting the circuitry for obtaining the first parameter from the first search task initiated at the first interface device and supporting the circuitry for obtaining the second parameter from the second interface device and supporting the circuitry for causing the second interface device to indicate the first parameter from the first search task initiated at the first interface device partly based on the association between the second interface device and the first interface device and partly based on the second parameter from the second interface device.

3. The system of any of the above SYSTEM CLAUSES, further comprising:
the first interface device including the circuitry for obtaining the first parameter from the first search task initiated at the first interface device and including the circuitry for obtaining the second parameter from the second interface device and including the circuitry for causing the second interface device to indicate the first parameter from the first search task initiated at the first interface device partly based on the association between the second interface device and the first interface device and partly based on the second parameter from the second interface device.

4. The system of any of the above SYSTEM CLAUSES, further comprising:
circuitry for determining from key press input from a user whether the user has apparently corroborated a configuration feature.

5. The system of any of the above SYSTEM CLAUSES, further comprising:
circuitry for determining from auditory data whether a user has apparently corroborated a configuration feature.

6. The system of any of the above SYSTEM CLAUSES, further comprising:
circuitry for determining from optical data whether a user has apparently corroborated a configuration feature.

7. The system of any of the above SYSTEM CLAUSES, further comprising:
circuitry for associating a first device used by a first user with a second device used by a second user in response to an association request from the first user.

8. The system of any of the above SYSTEM CLAUSES, further comprising:
circuitry for associating a first device with a second device by recording an identification of the first device in a memory of the second device.

9. The system of any of the above SYSTEM CLAUSES, further comprising:
circuitry for generating a first coordinate and a second coordinate that jointly characterize a position of a portion of an appendage of a user.

10. The system of any of the above SYSTEM CLAUSES, further comprising:
circuitry for determining whether a user has apparently assented to a structured dialog.

11. The system of any of the above SYSTEM CLAUSES, further comprising:
circuitry for adjusting a rectangular image component aspect ratio in response to an indication of a symbol adjacent an edge of a portion of an image.

12. The system of any of the above SYSTEM CLAUSES, further comprising:
circuitry for responding to an indication of a symbol adjacent an edge of a region of an image by adjusting a size of the region of the image.

13. The system of any of the above SYSTEM CLAUSES, further comprising:
circuitry for comparing a local time with temporal data in a first cached document and with temporal data in a second cached document.

14. The system of any of the above SYSTEM CLAUSES, further comprising:
circuitry for initiating a search using a character obtained from a photograph.

15. The system of any of the above SYSTEM CLAUSES, further comprising:
circuitry for displaying a search expression that includes a character sequence obtained from a photograph.

16. The system of any of the above SYSTEM CLAUSES, further comprising:
circuitry for expressing a search term at a first interface that includes a character sequence obtained from a second interface.

17. The system of any of the above SYSTEM CLAUSES, further comprising:
circuitry for highlighting an areal portion of an image selectively in response to a position of a depiction of an appendage in the image.

18. The system of any of the above SYSTEM CLAUSES, further comprising:
circuitry for recognizing a literal expression of a time signifying when a specific time interval begins.
19. The system of any of the above SYSTEM CLAUSES, further comprising:
circuitry for obtaining a boolean expression indicative of whether content includes a literal expression of a time of day.
20. The system of any of the above SYSTEM CLAUSES, further comprising:
circuitry for obtaining a boolean expression indicative of whether content includes a geographic identifier.
21. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for ranking a first component of a search result in relation to a second component of the search result partly based on a digital expression of a time of day and partly based on whether a confirmation of a search criterion has been received.
22. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for causing a first search term and a second search term to be transmitted to a mobile device after initiating a first search using the first search term and after initiating a second search using the second search term.
23. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for causing a search engine to use a search term conditionally in response to a user of a mobile device corroborating the search term via the mobile device.
24. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for receiving a result of a search from an Internet search engine into a memory of a mobile device.
25. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for triggering a search task by transmitting a search expression to a search engine as a real time response to detecting a component of the search expression in a component of a vocalization.
26. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for triggering an anticipatory search task by transmitting a search expression to a remote search engine in response to detecting a component of the search expression in a component of a visual image without first detecting a confirmation of the search expression.
27. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for highlighting a first portion of an image without highlighting a remainder of the image, the first portion having a location that depends upon whether the image depicts an appendage of a user.
28. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for performing an image modification upon a first region of a photographic image without performing the image modification upon a remainder of the photographic image, the first region having a location that depends upon whether the photographic image includes a semblance of an appendage.
29. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:
circuitry for responding to a detection of a depiction of an appendage by discarding a major portion of a photographic image without discarding a remainder of the photographic image, the remainder of the photographic image having a rectangular shape, the major portion of the photographic image encompassing more than 50% of an area of the depiction of the appendage and more than 50% of an area of the photographic image.
30. The system of any of the above SYSTEM CLAUSES in which the circuitry for causing the second interface device to indicate the first parameter from the first search task initiated at the first interface device partly based on an association between the second interface device and the first interface device and partly based on the second parameter from the second interface device comprises:

circuitry for responding to a depiction of an appendage in a data file representative of a graphic image by discarding a first informational element in the data file without discarding a second informational element in the data file.

31. (Independent) A method comprising:

obtaining a first parameter from a first search task initiated at a first interface device;

obtaining a second parameter from a second interface device; and causing the second interface device to indicate the first parameter from the first search task initiated at the first interface device partly based on an association between the second interface device and the first interface device and partly based on the second parameter from the second interface device.

32. The method of any of the above METHOD CLAUSES, further including:

determining from key press input from a user whether the user has apparently corroborated a configuration feature.

33. The method of any of the above METHOD CLAUSES, further including:

determining from auditory data whether a user has apparently corroborated a configuration feature.

34. The method of any of the above METHOD CLAUSES, further including:

determining from optical data whether a user has apparently corroborated a configuration feature.

35. The method of any of the above METHOD CLAUSES, further including:

associating a first device used by a first user with a second device used by a second user in response to an association request from the first user.

36. The method of any of the above METHOD CLAUSES, further including:

associating a first device with a second device by recording an identification of the first device in a memory of the second device.

37. The method of any of the above METHOD CLAUSES, further including:

generating a first coordinate and a second coordinate that jointly characterize a position of a portion of an appendage of a user.

38. The method of any of the above METHOD CLAUSES, further including:

determining whether a user has apparently assented to a structured dialog.

39. The method of any of the above METHOD CLAUSES, further including:

adjusting a rectangular image component aspect ratio in response to an indication of a symbol adjacent an edge of a portion of an image.

40. The method of any of the above METHOD CLAUSES, further including:

responding to an indication of a symbol adjacent an edge of a region of an image by adjusting a size of the region of the image.

41. The method of any of the above METHOD CLAUSES, further including:

comparing a local time with temporal data in a first cached document and with temporal data in a second cached document.

42. The method of any of the above METHOD CLAUSES, further including:

initiating a search using a character obtained from a photograph.

43. The method of any of the above METHOD CLAUSES, further including:

displaying a search expression that includes a character sequence obtained from a photograph.

44. The method of any of the above METHOD CLAUSES, further including:

expressing a search term at a first interface that includes a character sequence obtained from a second interface.

45. The method of any of the above METHOD CLAUSES, further including:

highlighting an areal portion of an image selectively in response to a position of a depiction of an appendage in the image.

46. The method of any of the above METHOD CLAUSES, further including:

recognizing a literal expression of a time signifying when a specific time interval begins.

47. The method of any of the above METHOD CLAUSES, further including:

obtaining a boolean expression indicative of whether content includes a literal expression of a time of day.

48. The method of any of the above METHOD CLAUSES, further including:

obtaining a boolean expression indicative of whether content includes a geographic identifier.

49. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

ranking a first component of a search result in relation to a second component of the search result partly based on a digital expression of a time of day and partly based on whether a confirmation of a search criterion has been received.

50. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

causing a first search term and a second search term to be transmitted to a mobile device after initiating a first search using the first search term and after initiating a second search using the second search term.

51. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

causing a search engine to use a search term conditionally in response to a user of a mobile device corroborating the search term via the mobile device.

52. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

receiving a result of a search from an Internet search engine into a memory of a mobile device.

53. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

triggering a search task by transmitting a search expression to a search engine as a real time response to detecting a component of the search expression in a component of a vocalization.

54. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

triggering an anticipatory search task by transmitting a search expression to a remote search engine in response to detecting a component of the search expression in a component of a visual image without first detecting a confirmation of the search expression.

55. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

highlighting a first portion of an image without highlighting a remainder of the image, the first portion having a location that depends upon whether the image depicts an appendage of a user.

56. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

performing an image modification upon a first region of a photographic image without performing the image modification upon a remainder of the photographic image, the first region having a location that depends upon whether the photographic image includes a semblance of an appendage.

57. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

responding to a detection of a depiction of an appendage by discarding a major portion of a photographic image without discarding a remainder of the photographic image, the remainder of the photographic image having a rectangular shape, the major portion of the photographic image encompassing more than 50% of an area of the depiction of the appendage and more than 50% of an area of the photographic image.

58. The method of any of the above METHOD CLAUSES in which the causing the second interface device to indicate the first parameter from the first search task initiated at the first interface device partly based on an association between the second interface device and the first interface device and partly based on the second parameter from the second interface device comprises:

responding to a depiction of an appendage in a data file representative of a graphic image by discarding a first informational element in the data file without discarding a second informational element in the data file.

59. (Independent) A method comprising:

obtaining a first parameter from a first search task initiated at a first interface device; and causing a second interface device to indicate the first parameter from the first search task initiated at the first interface device partly based on an association between the second interface device and the first interface device and partly based on a second parameter from the first search task initiated at the first interface device.

60. The method of CLAUSE 59 further comprising:

performing the operation(s) of any one or more of the above METHOD CLAUSES that depend from METHOD CLAUSE 31.

61. (Independent) A method comprising:

recognizing a position of a first limb of a person in relation to a facial region of the person and to a three-dimensional region indicated by the first limb of the person, the three-dimensional region including a first informational element; and transmitting a search result relating to the first informational element and partly based on first auditory data from a vicinity of the person and partly based on the position of the first limb of the person in relation to the facial region of the person and to the three-dimensional region indicated by the first limb of the person.

62. The method of CLAUSE 61 further comprising:

performing the operation(s) of any one or more of the above METHOD CLAUSES that depend from METHOD CLAUSE 31.

63. (Independent) A method comprising:

recognizing a position of a first limb of a person in relation to a facial region of the person and to a three-dimensional region indicated by the first limb of the person, the three-dimensional region including a first informational element; and transmitting a search result partly based on the person corroborating the first informational element as a component of a search criterion and partly based on the position of the first limb of the person in relation to the facial region of the person and to the three-dimensional region indicated by the first limb of the person, the search result having arisen from a usage of the first informational element as a component of the search criterion.

64. The method of CLAUSE 63 further comprising:
performing the operation(s) of any one or more of the above METHOD CLAUSES that depend from METHOD CLAUSE 31.

65. (Independent) A method comprising:
recognizing a position of a first limb of a person in relation to a first interface device input configured to be supported by the person and to a three-dimensional region indicated by the first limb of the person, the three-dimensional region including a first informational element; and
transmitting a search result relating to the first informational element and partly based on first auditory data from a vicinity of the person and partly based on the position of the first limb of the person in relation to the three-dimensional region indicated by the first limb of the person.

66. The method of CLAUSE 65 further comprising:
performing the operation(s) of any one or more of the above METHOD CLAUSES that depend from METHOD CLAUSE 31.

67. (Independent) A method comprising:
recognizing a position of a first limb of a person in relation to a three-dimensional region indicated by the first limb of the person and to a first interface device input configured to be supported by the person, the three-dimensional region including a first informational element; and
transmitting a search result partly based on the person corroborating the first informational element as a component of a search criterion and partly based on the position of the first limb of the person in relation to the three-dimensional region indicated by the first limb of the person and to the first interface device input configured to be supported by the person, the search result having arisen from a usage of the first informational element as a component of the search criterion.

68. The method of CLAUSE 67 further comprising:
performing the operation(s) of any one or more of the above METHOD CLAUSES that depend from METHOD CLAUSE 31.

69. (Independent) A method comprising:
causing a first geographic identifier recognition criterion to be applied to first content and to second content; and
indicating via a first interface device a preference either for the first content or for the second content, the preference being partly based on a movement status of the first interface device and partly based on a result of the first geographic identifier recognition criterion being applied to the first content and to the second content.

70. The method of CLAUSE 69 further comprising:
performing the operation(s) of any one or more of the above METHOD CLAUSES that depend from METHOD CLAUSE 31.

71. (Independent) A method comprising:
obtaining a first parameter from a first search task initiated at a first interface device; and
causing a second interface device to indicate the first parameter from the first search task initiated at the first interface device partly based on an association between the second interface device and the first interface device and partly based on a difference between a first prior location of the second interface device and a second prior location of the second interface device.

72. The method of CLAUSE 71 further comprising:
performing the operation(s) of any one or more of the above METHOD CLAUSES that depend from METHOD CLAUSE 31.

73. (Independent) A method comprising:
obtaining an indication of a movement status of a first interface device;
causing a first time-of-day recognition criterion to be applied to first content and to second content; and
indicating via the first interface device a preference either for the first content or for the second content partly based on the indication of the movement status of the first interface device and partly based on a result of the first time-of-day recognition criterion being applied to the first content and to the second content.

74. The method of CLAUSE 73 further comprising:
performing the operation(s) of any one or more of the above METHOD CLAUSES that depend from METHOD CLAUSE 31.

75. (Independent) A system comprising:
means for performing the operation(s) of any one or more of the above METHOD CLAUSES.

76. (Independent) An article of manufacture comprising:
one or more physical media configured to bear a device-detectable implementation of a method including at least
obtaining a first parameter from a first search task initiated at a first interface device; and
causing the second interface device to indicate the first parameter from the first search task initiated at the first interface device partly based on an association between the second interface device and the first interface device and partly based on the second parameter from the second interface device.

77. The article of manufacture of CLAUSE 76 in which a portion of the one or more physical media comprises:
one or more signal-bearing media configured to transmit one or more instructions for performing the operation(s) of any one or more of the above METHOD CLAUSES.

78. (Independent) An article of manufacture comprising:
one or more physical media bearing a device-detectable output indicating an occurrence of
obtaining a first parameter from a first search task initiated at a first interface device; and
causing the second interface device to indicate the first parameter from the first search task initiated at the first interface device partly based on an association between the second interface device and the first interface device and partly based on the second parameter from the second interface device.

79. The article of manufacture of CLAUSE 78 in which a portion of the one or more physical media comprises:
one or more signal-bearing media configured to transmit one or more instructions for performing the operation(s) of any one or more of the above METHOD CLAUSES.

80. The article of manufacture of CLAUSE 78 in which at least one of the one or more physical media comprises:
one or more signal-bearing media bearing at least one signal from an implementation having at least circuitry for causing the second interface device to indicate the first parameter from the first search task initiated at the first interface device partly based on an association between the second interface device and the first interface device and partly based on the second parameter from the second interface device.

All of the patents and other publications referred to above are incorporated herein by reference generally—including those identified in relation to particular new applications of existing techniques—to the extent not inconsistent herewith. While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

What is claimed is:

1. A system comprising:
    circuitry for establishing an association between a first interface device and a second interface device;
    circuitry for generating recognition data based at least in part on position of one or more portions of a person relative to one or more object portions;
    circuitry for obtaining a second parameter from the second interface device based at least in part upon the recognition data;
    circuitry for obtaining a first parameter from a first search task initiated at the first interface device;
    circuitry for causing the second interface device to display the first parameter from the first search task initiated at the first interface device responsive to the obtaining the second parameter from the second interface device; and
    circuitry for triggering a search task including at least transmitting a search expression to a search engine as a real time response to detecting a component of the search expression in a component of a vocalization, including at least circuitry for recognizing at least one search term of the search expression within the component of the vocalization without awaiting a corroborating indication or other confirmatory indication from a user.

2. The system of claim 1, further comprising:
    circuitry for obtaining optical data, via the second interface device, indicating whether a user has apparently corroborated a second parameter including a configuration feature.

3. The system of claim 1, further comprising:
    circuitry for associating the first interface device used by a first user with the second interface device used by a second user including at least:
    circuitry for responding to an association request from at least one of the first user or the second user and;
    circuitry for recording an identification of the first interface device in a memory of the second interface device.

4. The system of claim 1, wherein the circuitry for obtaining a second parameter from the second interface device includes:
    at least one of:
    circuitry for obtaining, via an input to the second interface device from a user, an indication whether the user has corroborated a second parameter including a configuration feature;
    circuitry for obtaining auditory data, via the second interface device, indicating whether a user has apparently corroborated a second parameter including a configuration feature; or
    circuitry for generating a first coordinate and a second coordinate that jointly characterize a position of a portion of an appendage of the user relative to one or more facial portions of the user as one or more object portions.

5. The system of claim 1, further comprising:
    circuitry for determining whether a user has apparently assented to a structured dialog including the second interface device indicating the first parameter from the first search task initiated at the first interface device.

6. The system of claim 1, wherein the circuitry for obtaining a second parameter from the second interface device includes:
    at least one of:
    circuitry for responding to an indication of a symbol adjacent an edge of a region of an image by adjusting a size of the region of the image, the second parameter including the symbol adjacent the edge of the region of the image;
    circuitry for comparing a local time with temporal data in a first cached document and with temporal data in a second cached document, the first cached document and the second cached document residing in the second interface device, the local time being the second parameter from the second interface device;
    circuitry for recognizing a literal expression of a time signifying when a specific time interval begins; or
    circuitry for obtaining an indication of whether content includes a geographic identifier.

7. The system of claim 1, further comprising:
    circuitry for initiating a search using an informational element based at least in part on the recognition data obtained via an image captured at the second interface device, the second parameter from the second interface device being the informational element.

8. The system of claim 1, further comprising:
    circuitry for displaying a search expression that includes a character sequence obtained from a photograph captured via the first interface device, the character sequence obtained from the photograph being the first parameter from the first search task initiated at the first interface device, the search expression including the second parameter from the second interface device.

9. The system of claim 1, further comprising:
    circuitry for expressing a search term at the second interface device that includes a character sequence obtained from the first interface device the character sequence obtained from the first interface device being the first parameter from the first search task initiated at the first interface device.

10. The system of claim 1, wherein the circuitry for obtaining a second parameter from the second interface device includes:
    circuitry for highlighting an areal portion of an image captured via the second interface device selectively in response to a position of a depiction of an appendage relative to one or more portions of the second interface device as one or more object portions in the image, areal portion of the image including the second parameter from the second interface device.

11. The system of claim 1, further comprising:
    circuitry for ranking a first component of a search result in relation to a second component of the search result partly based on a digital expression of a time of day and partly based on whether a confirmation of a search criterion has been received, the confirmation of the search criterion being the second parameter.

12. The system of claim 1, further comprising:
circuitry for causing the first parameter including a first search term to be transmitted to the second interface device after initiating the first search task using the first search term.

13. The system of claim 1, further comprising:
circuitry for receiving a result of the search task initiated at the first interface device from an Internet search engine into a memory of the second interface device.

14. The system of claim 1, wherein the circuitry for obtaining a first parameter from a first search task initiated at the first interface device includes:
circuitry for triggering an anticipatory first search task by transmitting a search expression to a remote search engine in response to detecting a component of the search expression in a component of a visual image captured by the first interface device without first detecting a confirmation of the search expression.

15. The system of claim 14, wherein the circuitry for triggering an anticipatory first search task by transmitting a search expression to a remote search engine in response to detecting a component of the search expression in a component of a visual image captured by the first interface device without first detecting a confirmation of the search expression includes:
circuitry for initiating an anticipatory search in response to a system load indicator being below a threshold.

16. The system of claim 14, wherein the circuitry for triggering an anticipatory first search task by transmitting a search expression to a remote search engine in response to detecting a component of the search expression in a component of a visual image captured by the first interface device without first detecting a confirmation of the search expression includes:
circuitry for detecting a user status indicator being above a threshold.

17. The system of claim 1, wherein the circuitry for obtaining a second parameter from the second interface device includes:
circuitry for highlighting a portion of an image captured by the second interface device without highlighting a remainder of the image, the portion having a location that depends upon whether the image depicts an appendage of a user relative to one or more object portions.

18. The system of claim 17, wherein the circuitry for highlighting a portion of an image captured by the second interface device without highlighting a remainder of the image includes:
circuitry for modifying a size of the highlighted portion of an image.

19. The system of claim 18, wherein the circuitry for modifying a size of a highlighted portion of an image, includes:
circuitry for modifying that is responsive to one or more movements of a thumb and a forefinger of the person.

20. The system of claim 1, wherein the circuitry for establishing an association between a first interface device and a second interface device includes:
circuitry for establishing an association between a first interface device and a second interface device responsive to at least one common interaction by both the first interface device and the second interface device.

21. The system of claim 20, wherein the circuitry for establishing an association between a first interface device and a second interface device responsive to at least one common interaction by both the first interface device and the second interface device includes:
circuitry for establishing an association between a first interface device and a second interface device responsive to at least one of: a sync operation between the first interface device and the second interface device, a login to a common account via both the first interface device and the second interface device, sharing at least one common peripheral device by both the first interface device and the second interface device, common registration of the first interface device and the second interface device to a registration database, an interpersonal communication between the first interface device and the second interface device, subscription shared by the first interface device and the second interface device.

22. The system of claim 1, wherein the circuitry for establishing an association between a first interface device and a second interface device includes:
circuitry for establishing an association between a first interface device and a second interface device responsive to at least one of ownership or use of the first interface device and the second interface device by at least one common user.

23. The system of claim 1, wherein the position of one or more portions of a person relative to one or more object portions is determined on a real-time basis.

24. The system of claim 1, wherein the component of the vocalization is detected by one of the first or second interface devices and the search expression transmitted to the search engine was previously used by the other of the first or second interface devices.

25. A method comprising:
establishing an association between a first interface device and a second interface device;
generating recognition data based at least in part on position of one or more portions of a person relative to one or more object portions;
obtaining a second parameter from the second interface device based at least in part upon the recognition data;
obtaining a first parameter from a first search task initiated at the first interface device;
causing the second interface device to display the first parameter from the first search task initiated at the first interface device responsive to the obtaining the second parameter from the second interface device; and
triggering a search task including at least transmitting a search expression to a search engine as a real time response to detecting a component of the search expression in a component of a vocalization, including at least recognizing at least one search term of the search expression within the component of the vocalization without awaiting a corroborating indication or other confirmatory indication from a user.

26. A system comprising:
means for establishing an association between a first interface device and a second interface device;
means for generating recognition data based at least in part on position of one or more portions of a person relative to one or more object portions;
means for obtaining a second parameter from the second interface device based at least in part upon the recognition data;
means for obtaining a first parameter from a first search task initiated at the first interface device;
means for causing the second interface device to display the first parameter from the first search task initiated at the first interface device responsive to the obtaining the second parameter from the second interface device; and means for triggering a search task including at least transmitting a search expression to a search engine as a real time response to detecting a component of the search expression in a component of a vocalization, including at least means for recognizing at least one search term of the search expression within the component of the vocalization without awaiting a corroborating indication or other confirmatory indication from a user.

* * * * *